US007702726B1

(12) United States Patent
Grabelsky et al.

(10) Patent No.: US 7,702,726 B1
(45) Date of Patent: Apr. 20, 2010

(54) SYSTEM AND METHODS FOR PROVIDING PRESENCE SERVICES IN IP NETWORK

(75) Inventors: David Grabelsky, Skokie, IL (US); Anoop Tripathi, Mt. Prospect, IL (US); Michael Homeier, Elmhurst, IL (US); Guanglu Wang, Buffalo Grove, IL (US)

(73) Assignee: 3Com Corporation, Marlborough, MA (US)

( * ) Notice: Subject to any disclaimer, the term of this patent is extended or adjusted under 35 U.S.C. 154(b) by 760 days.

(21) Appl. No.: 10/120,152

(22) Filed: Apr. 10, 2002

(51) Int. Cl.
*G06F 15/16* (2006.01)
*G06F 15/173* (2006.01)
*G06F 7/04* (2006.01)

(52) U.S. Cl. .................. 709/204; 709/225; 709/227; 726/3

(58) Field of Classification Search .......... 709/204–207, 709/227–229, 224, 225
See application file for complete search history.

(56) References Cited

U.S. PATENT DOCUMENTS

| | | | | | |
|---|---|---|---|---|---|
| 6,112,228 | A | * | 8/2000 | Earl et al. .................. | 709/205 |
| 6,175,873 | B1 | * | 1/2001 | Yamane et al. .............. | 709/237 |
| 6,412,007 | B1 | * | 6/2002 | Bui et al. .................... | 709/227 |
| 6,442,608 | B1 | * | 8/2002 | Knight et al. ............... | 709/225 |
| 6,658,095 | B1 | * | 12/2003 | Yoakum et al. ........... | 379/93.01 |
| 2001/0044893 | A1 | * | 11/2001 | Skemer ...................... | 713/153 |
| 2002/0126701 | A1 | * | 9/2002 | Requena .................... | 370/469 |
| 2003/0028798 | A1 | * | 2/2003 | Burnett ....................... | 713/200 |
| 2003/0065788 | A1 | * | 4/2003 | Salomaki .................... | 709/227 |
| 2003/0212800 | A1 | * | 11/2003 | Jones et al. ................. | 709/228 |

OTHER PUBLICATIONS

"SIP Extensions for Presence", Rosenberg et al., Internet Engineering Task Force, Internet Draft , draft-ietf-simple-presence-01.txt, Feb. 2002.*
Rosenberg et al., *SIP Extensions for Presence*, Internet Engineering Task Force, Internet Draft, draft-ietf-simple-presence-00.txt, Mar. 30, 2001, pp. 1-39.
Rosenberg, J., *A SIP Event Template-Package for Watcher Information*, Internet Engineering Task Force, Internet Draft, draft-ietf-simple-winfo-package-01.txt, Mar. 1, 2002, pp. 1-17.
Campbell, B. et al., *SIP Instant Message Sessions*, Internet Engineering Task Force, Internet Draft, draft-ietf-simple-im-session-00, Jul. 13, 2001, pp. 1-12.
Day, M. et al., *A Model for Presence and Instant Messaging*, Request for Comments 2778, Feb. 2000, pp. 1-17.
Bennett, Russell et al., *Integrating Presence with Multi-Media Communications*, White Paper, dynamicsoft.com, pp. 1-17.

* cited by examiner

*Primary Examiner*—Aaron Strange
(74) *Attorney, Agent, or Firm*—McDonnell Boehnen Hulbert & Berghoff LLP

(57) ABSTRACT

A system and methods are shown for providing presence state services in an Internet Protocol network. One exemplary system includes a central presence element configured to track and provide user presence state information, and a local presence element in communication with the central presence element and further in communication with a signaling entity. According to one embodiment, the local presence element is configured to create and manage local presence state authorization data generated based on user presence state information being received from the central presence element. Further, the local presence element is configured to authorize a user service request using the local presence authorization data before providing access to a service requested by the user in the user service request.

17 Claims, 28 Drawing Sheets

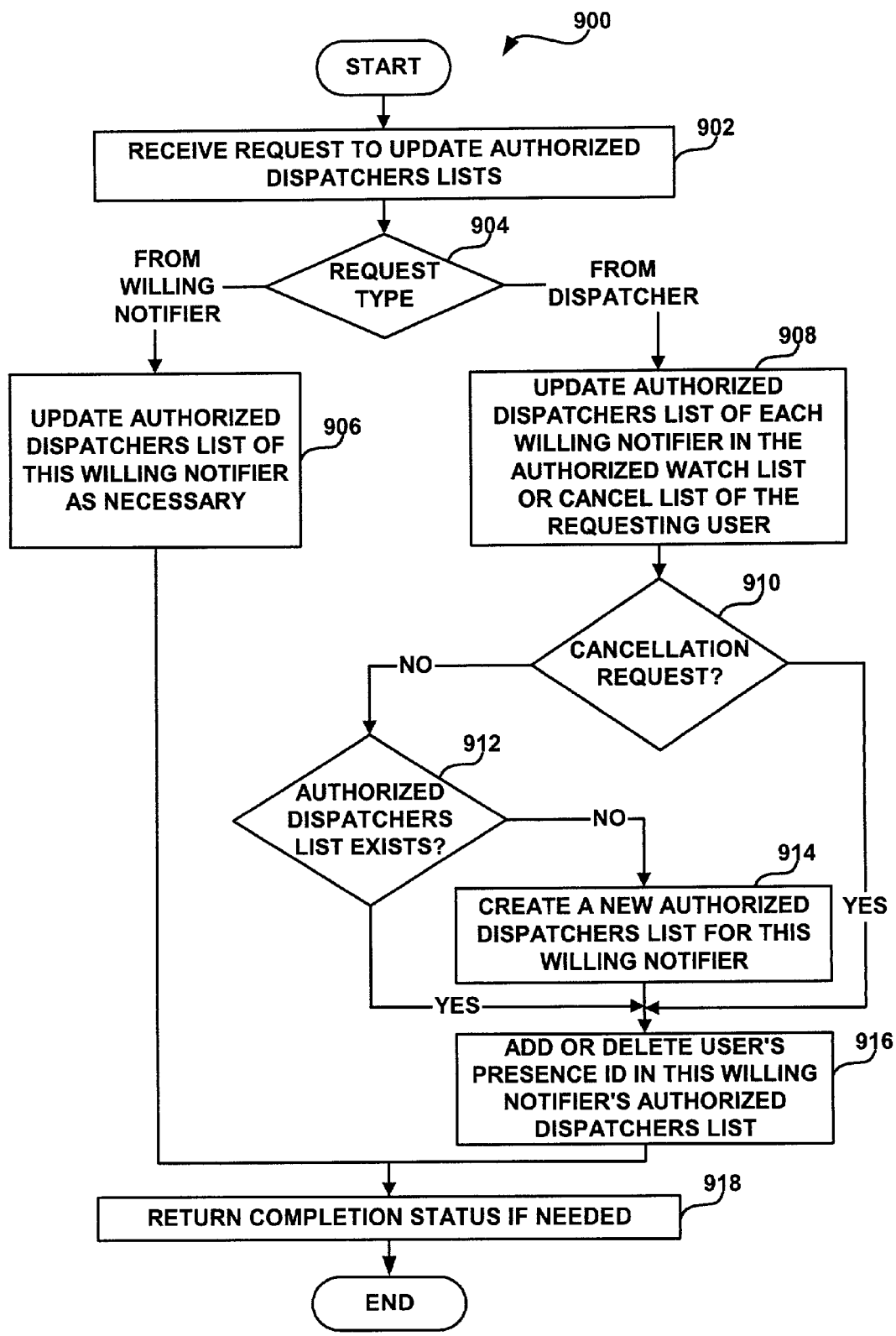

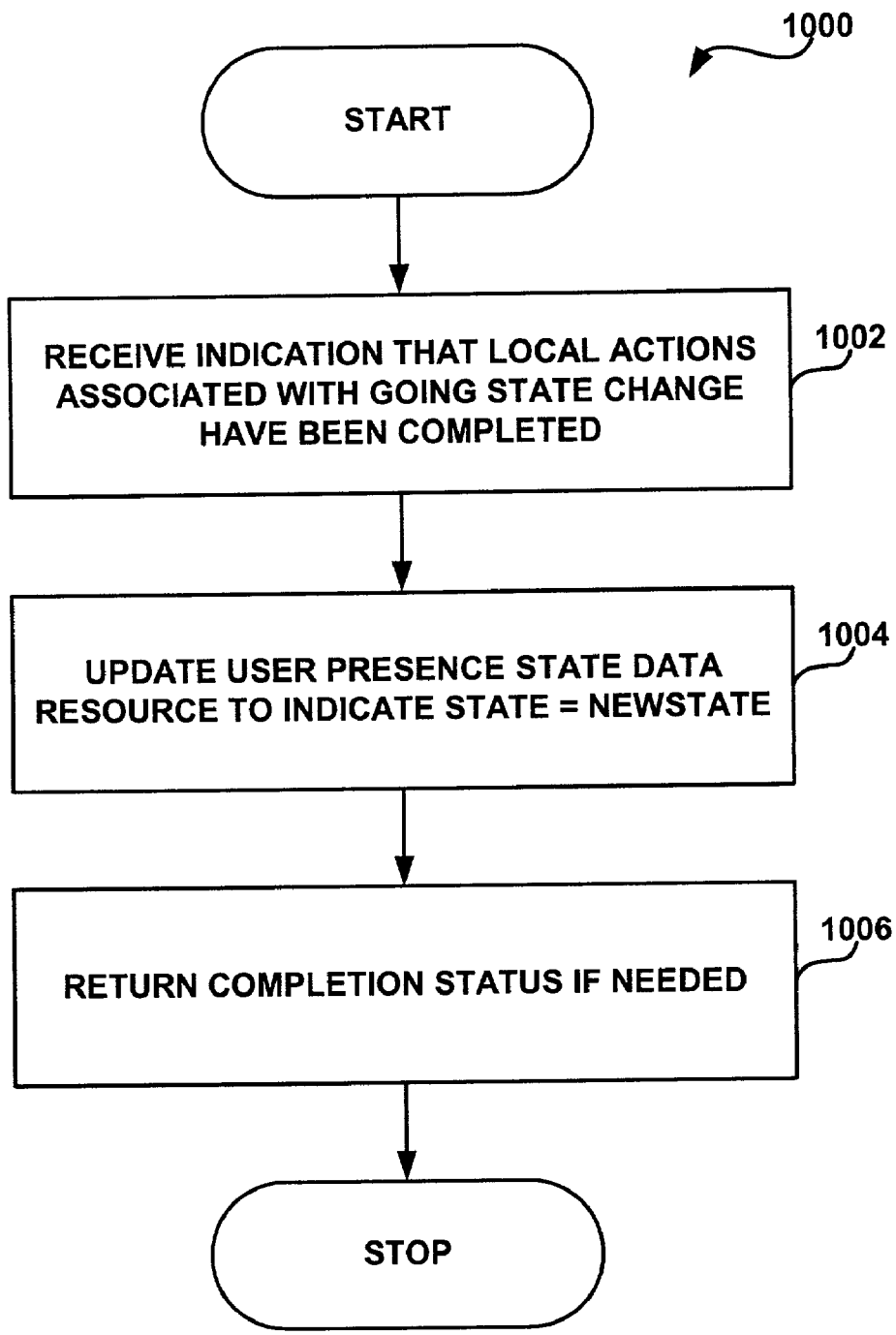

SYSTEM AND METHODS FOR PROVIDING PRESENCE SERVICES IN IP NETWORK

FIELD OF THE INVENTION

The present invention relates to communications in mobile Internet Protocol ("IP") networks. In one aspect of a preferred embodiment, it relates to providing IP-based presence services.

BACKGROUND OF THE INVENTION

With the rapidly growing interest in wireless communications and Internet connectivity, wireless service providers are competing to capture the market share by offering their customers access to applications that take advantage of both technologies.

In a mobile Internet Protocol network, a mobile communication device (a mobile node), such as a mobile host or router that changes its point of attachment from one network to another, communicates with a target host on an Internet Protocol ("IP") network by means of two devices, a "foreign agent" and a "home agent." Typically, the foreign agent's functionality is incorporated into a router on a mobile node's visited network. The foreign agent provides routing services for the mobile node while it is registered with the home agent. For example, the foreign agent de-tunnels and delivers data packets that were tunneled by the mobile node's home agent to the mobile node.

A home agent is typically incorporated into a router on a mobile node's home network. The home agent maintains current location information for the mobile node. When one or more home agents are handling calls for multiple mobile nodes simultaneously, the home agents are providing, in essence, a service analogous to a virtual private network service.

Mobile Internet Protocol requires the link layer connectivity between a mobile node (a mobile entity) and a foreign agent. However, in some systems the link layer from the mobile node may terminate at a point distant from the foreign agent. Such networks are commonly referred to as third-generation (3G) wireless networks. A 3G network delivers much greater network capacity than many currently existing circuit-switched digital mobile networks. The increased availability of bandwidth in 3G networks opens up a new generation of applications to wireless subscribers such as collaborative and multimedia services.

One of the goals of the architecture of next generation IP networks is a framework for the introduction of new multimedia services and features at the Internet speed, using IP-based applications and protocols. This has led to a differentiation of the functional and operational aspects of multimedia networks within three layers or planes, defined broadly as media processing, control and service creation. The service creation plane is sometimes further subdivided into an application plane and a data plane. The initial next generation IP networks have been aimed at building the infrastructure that realizes the architectural framework. At the same time, the list of IP-based multimedia services ready for deployment has grown steadily ahead of what may eventually be a great multiplicity of new services and features. Thus, the successful introduction of the next-generation services depends not only on how useful the services are to end users, but also on how intelligently they integrate capabilities of the underlying network system.

Many next-generation services, such as an instant messaging service, require that a user knows the state of other users with respect to connectivity and availability and their willingness to communicate, i.e., presence information, that is provided by a presence service. A presence service is the implementation of the methods and protocols to realize the practical use of network presence in real services, which require presence-related information. An example of a presence-based service is an instant text messaging service, where one user may detect the presence of another user and then send an immediate text message to that user.

SUMMARY OF THE INVENTION

The system and method described herein are for providing presence state services in an Internet Protocol network.

One exemplary system includes a central presence element configured to track and provide user presence state information, and a local presence element in communication with the central presence element and further in communication with a signaling entity. According to one embodiment, the local presence element is configured to create and manage local presence state authorization data generated based on user presence state information being received from the central presence element. Further, the local presence element is configured to authorize a user service request using the local presence authorization data before providing access to a service requested by the user in the user service request.

These as well as other aspects and advantages of the present invention will become more apparent to those of ordinary skill in the art by reading the following detailed description, with reference to the accompanying drawings.

BRIEF DESCRIPTION OF THE DRAWINGS

Exemplary embodiments of the present invention are described with reference to the following drawings, in which:

FIG. 9 is a flow chart illustrating a method for updating local authorized dispatcher lists according to one exemplary embodiment;

FIG. 10 is a flow chart illustrating a method for completing a state change request according to an exemplary embodiment;

THE DETAILED DESCRIPTION OF THE PREFERRED EMBODIMENT(S)

Figure 1:
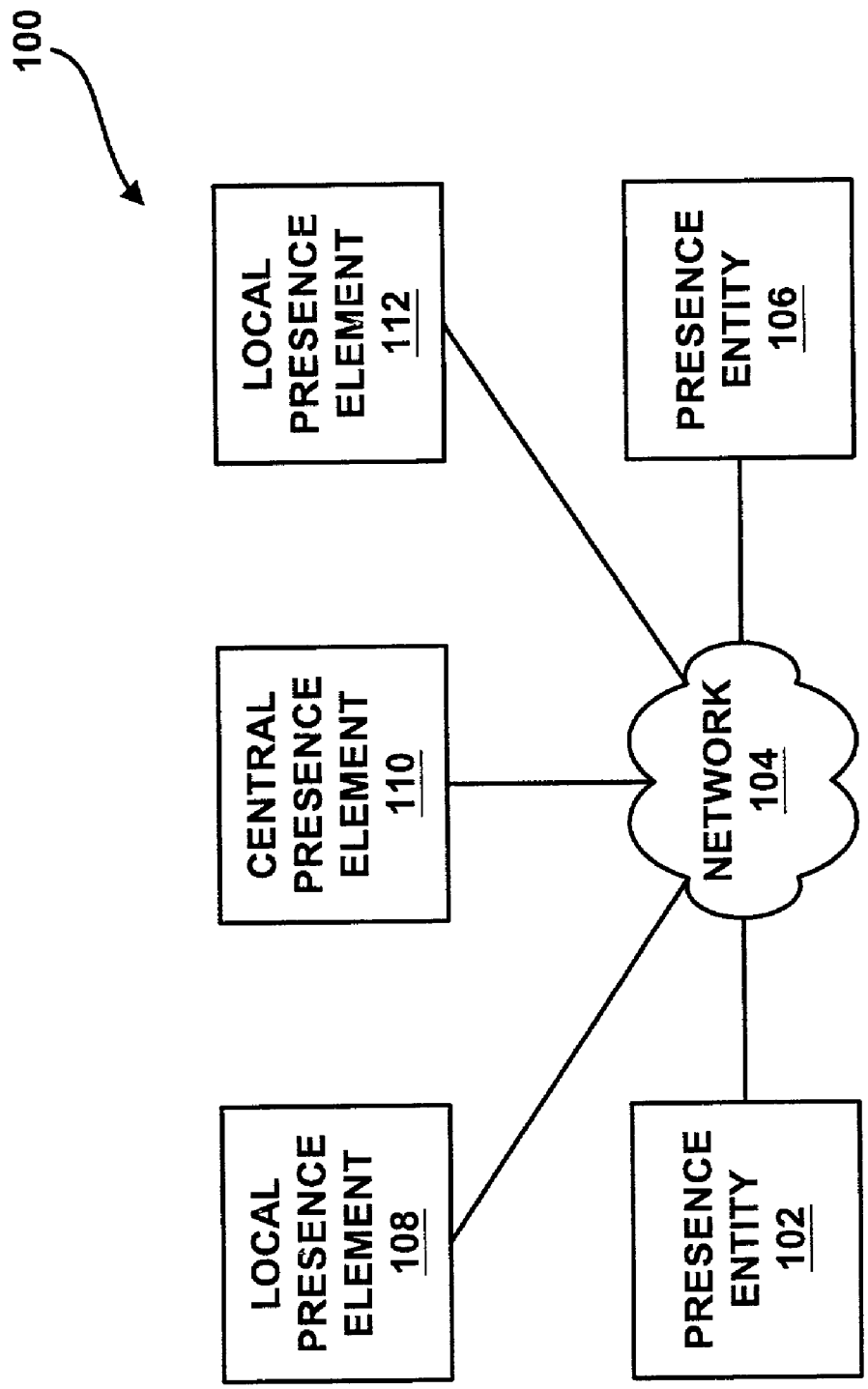
FIG. 1 is a functional block diagram illustrating an embodiment of a network architecture suitable for application in the present invention for providing presence services in an EP network according to an exemplary embodiment.

FIG. 1 is a functional block diagram illustrating an embodiment of a network architecture 100 suitable for application in the present invention for providing distributed presence services in an IP network. The network architecture includes a network 104 such as a world wide web or a public network that provides a communication path between a presence entity 102 and a presence entity 106. According to an exemplary embodiment, a presence entity is an entity possessing a presence state and able to participate in presence-based services. It should be understood that the presence entity may represent a user's client device, or a software entity, such as a service. The presence entities 102 and 106 may take any suitable form such as, for example, a telephone, a computer, or a personal digital assistant ("PDA"). The presence entities 102 and 106 are connected to the network 104 via communication links 116 and 126 that may include a wireless communication link, a wireline communication link, or a combination thereof.

The network 100 for providing distributed presence services includes a local element illustrated with two local presence elements 108 and 112, and a centralized presence element 110. According to an exemplary embodiment, the distributed presence architecture is based on dividing presence-related network traffic into two categories: low-volume messages associated with global data, and high-volume messages associated with local data. In one embodiment, the low-volume messages are associated, for example, with user presence state information and tracking, e.g., going online or offline, or requesting to subscribe to another user's presence, etc. The high-volume messages are associated with sending of user-data between users, i.e., the actions users take based upon the underlying global information. According to the embodiment illustrated in FIG. 1, the local presence elements are configured to process the high-volume messages, and the central presence element 110 is configured to process the low-volume messages.

The local presence element 108 and 112 may be implemented in communication with signaling entities such as SIP proxy servers, and, in one embodiment, the local presence element 108 and 112 may be implemented on the signaling entities. Further, when the local presence elements 108 and 112 are implemented on SIP proxy servers, the SIP proxy servers may act as intermediaries for presence-related messages being sent between users at client devices and the centralized elements of the presence service, such as the central presence element 110, as will be described in greater detail below.

In the embodiment, in which the local presence elements 108 and 112 are implemented on SIP proxy servers, the presence entities 102 and 106, such as client devices, may include SIP user agents that represent users at the client devices to SIP protocol elements of the network 100. Alternatively, if a client device does not have an internal SIP user agent, the client device may communicate with a SIP virtual user agent that may be implemented in the network 100 and may act on behalf of that client device. In such an embodiment, the client device may be preprogrammed with an additional protocol that is used for remote communications between the client device and the SIP virtual user agent. More information on the SIP virtual user agent can be found in the U.S. patent application Ser. No. 10/021,171, entitled "System and Method for Providing Instant Services in Internet Protocol Network," filed on Dec. 12, 2001, fully incorporated herein by reference.

Further, in one embodiment, the central presence element 110 may be implemented on an authorization/authentication/accounting ("AAA") server. In such an embodiment, in addition to providing centralized presence services, the AAA server also provides typical services related to authenticating and authorizing users to access specific services of the system. Network entities in the network 100 may communicate with the AAA server using any standard or proprietary protocols, such as RADIUS or 3Q, for example.

The exemplary embodiments that will be described hereinafter will be described in reference to presence entities including users at client devices. However, as mentioned in earlier paragraphs, a presence entity may also represent a service that requires presence state information. For example, a user may subscribe to a messaging service that sends a message to a user when a predetermined state change occurs, such as a change in a certain stock price, etc. In such an embodiment, the presence entity may determine subscribers who subscribed to that service, and then, based on their presence state information in the system (such as an online state and availability to receive messages), the presence entity may send messages to those entities. A different embodiment of a service may involve tracking locations of one or more subscribers. In such an embodiment, when a presence entity determines that a user is at a predetermined location, the presence entity may send a notification message to subscribers that are subscribed to that location and that user. Different embodiments are possible as well.

Further, according to an exemplary embodiment, the network 100 may include a media/message proxy (not shown) in communication with a signaling entity such as a SIP proxy server. The media/message proxy may be used as a virtual switch for connecting a media/message path between presence entities, i.e, an entity, such as a user's client device or a software entity (e.g., a service), possessing a presence state and able to participate in presence-based services. In a network, in which a media/message proxy is used, SIP user agents on the client devices are connected via the media/message proxy. A media/message proxy may be used for security and privacy purposes to prevent unauthorized users from accessing services since users would first communicate with the media/message proxy before being able to access any service. The privacy provided by the media/message proxy allows users to communicate with each other without ever having to reveal their actual IP contact information. An example of a media/message proxy is a conference server that enables users to send instant voice messages depending on presence states of the users in the network. The conference server is fully described in the U.S. patent application Ser. No. 10/021,171, entitled "System and Method for Providing Instant Services in Internet Protocol Network," filed on Dec. 12, 2001, fully incorporated herein by reference.

According to an exemplary embodiment, a signaling entity communicating with a media/message proxy may receive a request to set up a media path between a presence entity and the media/message proxy. Alternatively, the request may specify a predetermined service identifier, and signaling entity may be configured to set up a media path upon detecting such an identifier in a request. Thus, according to an exemplary embodiment, a signaling entity (a server or a SIP proxy server) may be configured to receive from a presence entity a request to establish a media pathway. Responsively, the signaling entity may authorize the request using information specified in the request and local presence data available to the signaling entity. Then, if the request is authorized, the signaling entity may establish the media path. As will be describe in greater detail below, the signaling entity may access a message dispatch facility that is configured to authorize requests, and the message dispatch facility may authorize the request. Further, the request to establish the media path may include a request to interconnect a plurality of pre-established data paths between a plurality of presence entities and a media proxy such as the conference server described in greater detail in the U.S. patent application Ser. No. 10/021,171, herein incorporated by reference. Alternatively, the signaling server may pre-establish the media path between the presence entity and the conference server.

In such an embodiment, upon receiving such a request, the signaling entity may authorize the request using local authorization presence state data available at the signaling entity, and then send the request to establish the media path. Alternatively, in the case, where media paths are pre-established between two presence entities and the media-message proxy, the signaling entity, upon authorizing a request from one of the entities, may request the media/message proxy to bridge the media paths between the two presence entities.

The media/message proxy provides an additional benefit when SIP user agents are configured behind Network Address Translators (NATs). NATs are used to either hide a client's IP address from the global IP network, or provide global connectivity to a client device which is configured with only a local IP address behind a router; e.g. in a Local Area Network. This would be a typical configuration for SIP UAs in an IP-based PBX system, for example. Another application is where a service provider uses NATs to hide the IP addresses of SIP UAs in order to help prevent the theft of service. When two SIP UAs are each behind different NATs, signaling for call setup can become cumbersome since two NATs must be traversed. This leads to numerous possible configuration scenarios that must be handled by the end-to-end protocols. By locating the media/message proxy in the service provider's network, any given SIP UA need only traverse a single NAT (if present). The bridge between SIP UAs for media and messages is provided by the media/message proxy, thus, eliminating the complications of double-NAT traversal.

In the proposed architecture, two classes of user presence states are defined: user-specified and facility-specified. User-specified states are the states to which a user (or a presence entity acting on behalf of a user) may request to be put in. For example, the user-specified states may include: an offline state, an online/available state, an online/unavailable_announce, and an online/unavailable_hide, for example. It should be understood that additional user-specified states are also possible, including those states that may be part of other descriptions of network presence. Facility-specified states include states that may be associated with state-machine aspects of presence function implementation. For example, a generic state, such as a pending state, may be introduced to help indicate where a user-specified state-change request is being processed, but not yet completed. The actual number of states that may be regarded as pending is dependent upon the implementation. Other facility-specified states are also possible.

The presence elements maintain user presence states in the user presence state data resource, which is managed by the user presence state facility that will be described in greater detail below. Additional user presence states beyond the given examples may be added to the user presence state data resource. Service requests to the presence entities include identifying information about the user that places the request (the requester). The identifying information, among other possible parameters, may include a user's Presence ID, and may also include the user's User Account ID.

Any service request that applies to information about any other user besides the requester may depend upon the other user's (or users') Presence ID(s) only so that the requester is not required to have knowledge of other users' User Account IDs (and may be prevented from having such knowledge for security/privacy reasons).

Signaling and call control functions may typically require more information than simply a Presence ID. The presence elements may be able to obtain such information, e.g., from an Authorization/Authentication database, the embodiments of which will be described in greater detail below. For example, one or more presence elements may be configured to translate a Presence ID into sufficient routing information to contact a SIP Proxy Server responsible for the user associated with the Presence ID. At the same time, end users may communicate using Presence IDs only, with no knowledge of the routing information.

According to exemplary embodiments, a Presence ID may support a multiplicity attribute that specifies how many users are associated with the ID. The multiplicity attribute may be defined using two values: an individual or a group. An individual Presence ID is associated with a single user, and all functions and operations that use or depend on an individual Presence ID apply to that single user. For example, sending a voice message to a user associated with a Presence ID. A group Presence ID allows more than one user to be associated with the ID. All users associated with a given group Presence ID may be referred to as the presence user group, and all functions and operations that use or depend on the group Presence ID may apply to all users belonging to the presence user group. It should be understood that some functions may only allow one active user from the presence user group at a time; e.g., a sender of a voice message. Others may allow multiple simultaneous users; e.g., receivers of a voice message.

Management of individual Presence IDs, group Presence IDs, and presence user groups may be accomplished through a provisioning system that may also be used for provisioning and updating other aspects of user profiles.

Before describing specific implementations of presence services within the context of the proposed architecture that will be later described in greater detail, basic functions and services of the presence functions are briefly described in Table 1.

TABLE 1

| Function or Service | Description |
| --- | --- |
| Register | SIP Registration of a user agent with a SIP proxy server<br>Access of Authorization/Authentication<br>Database retrieves presence-related information from user profiles |
| Change State to Online/Available | Go online with a presence service<br>Allow subscriptions to a presence state (via a Presence ID)<br>Enable subscribers to send messages to the Presence ID<br>Notify presence to authorized subscribers<br>Notify availability to receive messages from authorized dispatchers (users authorized to send messages to the Presence ID) |
| Change State to Online/Unavailable_Announce | Go online with a presence service<br>Allow subscriptions to you a presence state (via a Presence ID)<br>Do not enable subscribers to send messages to the Presence ID<br>Notify presence to authorized subscribers<br>Notify unavailability to receive messages from authorized dispatchers |
| Change State to Online/Unavailable_Hide | Go online with a presence service<br>Do not allow subscriptions to a presence state (via a Presence ID)<br>Do not enable subscribers to send messages to a Presence ID<br>Do not notify presence to authorized subscribers<br>Do not notify availability to receive messages from authorized dispatchers |
| Change State to Offline | Go offline with presence service<br>Disable subscribers from sending messages to Presence ID<br>Notify any subscribers |
| Subscribe | Request to subscribe to one or more users' presence state via their Presence IDs |
| Solicit | Request the current presence states of one or more users via their Presence IDs<br>Optionally request a subscription to presence states of the same users |
| Unsubscribe | Cancel subscription to presence state of one or more users via their Presence IDs |
| Deregister | Cancel SIP registration of user agent with a SIP proxy<br>possible update of accounting information for presence-based services in a user profile |
| Change Subscriber Authorization | Change the permission of a user's or users' subscription(s) to a presence state; e.g., services that those users can use to contact your Presence ID, deauthorizing would-be dispatchers |
| Dispatch Message | Dispatch a message to one or more users using their Presence ID |

TABLE 1-continued

| Function or Service | Description |
| --- | --- |
| Initialize Presence-based Service | Service-specific actions for initialization/start-up of presence-based services |
| Authorization request from another user | Presence function directs a request to a Presence ID from another user for authorization related presence-based services, e.g., permission to subscriber to the Presence ID, permission to send messages to the Presence ID, permission to learn a current state of the Presence ID, request to modify permissions associated with a subscription to the Presence ID. |

According to one exemplary embodiment, presence services are implemented using five data resources and three presence function facilities. It should be understood that decomposition of the presence functionality is only exemplary and different embodiments are possible as well. A data resource refers to a logical grouping of data that is used by some presence function facility in order to carry out a specific task or tasks. Multiple data resources might represent different views or subsets of a single database, each data resource existing only as a logical entity. Alternatively, each data resource might be implemented as a distinct database, or as a data structure within the context of the facility that uses it.

Further, data resources refer to user-related information accessed by the three presence function facilities in order to do their jobs. The data resources may be maintained as part of the authorization database, or as application-specific data structures. Much of the static and semi-static information contained may duplicate information already contained in the authorization database, so extending the authorization database for the presence function could be a reasonable approach. However, performance considerations may favor memory-resident, application-specific data structures.

In addition to the data resources, there are also transient resources. These are created and consumed by the functional facilities as needed, and may be derived from the data resources and/or other information in the user profiles.

The five data resources include, but are not limited to, user presence state data resources, authorized subscribers lists, current subscriber lists, authorized dispatchers lists, and desired watch lists. In one embodiment, data resources may be organized on a per-presence entity basis, so that each presence entity is said to "own," or be the "owner" of, a persistent instance of one of each of the data resources, with the exception of the authorized dispatchers list, i.e, a list owned by one presence entity that contains other presence entities that are authorized to dispatch messages to the list owner. A given presence entity at a given time may own zero, one, or multiple authorized dispatchers lists, depending upon whether or not any authorized dispatchers exist for the given presence entity, and at which SIP Proxies they are registered, the embodiments of which will be described in greater detail below.

It should be understood that the term "list" is a logical description of the data resource, and does not imply any requirement regarding implementation. Similarly, the distinction of five data resources is a logical organization made to accommodate the functionality of the three presence function facilities. To the extent that specific information is duplicated across categories, the actual implementation of the data resources may combine databases and/or data structures so long as the required functionality is supported and performance requirements are met.

As described below, some of the data resources include global data that are maintained centrally, while others comprise local data that are maintained locally (and are distributed). In the exemplary embodiments described in greater detail below, the data resources are assumed to be associated with specific network components. However, it should be understood that other implementations are also possible. That is, the distinction between global/central and local/distributed is logical, and not intended to limit the actual implementation of the data resources. For example, a centrally maintained, global data resource may actually be implemented in a distributed database architecture using multiple servers and database replication/synchronization.

In addition to these resources, there are other list-like resources that are transient, may be created and consumed as needed by the functional facilities. These may include an authorized watch list, i.e., a presence entity's list of willing notifiers (presence entities who are subscribed to by one or more subscribers and agreed to be notifiers and send notifications to subscribers) and a cancellation list, i.e, a list of subscriptions that a subscriber would like to cancel, where the subscriber is a presence entity who currently has subscriptions (where a subscription is a persistent request by one presence entity to be notified of changes in presence state of another presence entity) to the presence entities in the list.

As mentioned above, the exemplary system for distributed presence services uses three functions including a user presence state facility, a notification request facility, and a message dispatch function. As described in greater detail below, these facilities provide combinations of global/central functionality and local/distributed functionality. In the exemplary descriptions below, they are assumed to be associated with specific network components. As with the data resources, it should be understood that other implementations are possible. Further, distinctions between global/central and local/distributed are logical, and not intended to limit the actual implementation of the functional facilities.

Figure 2:
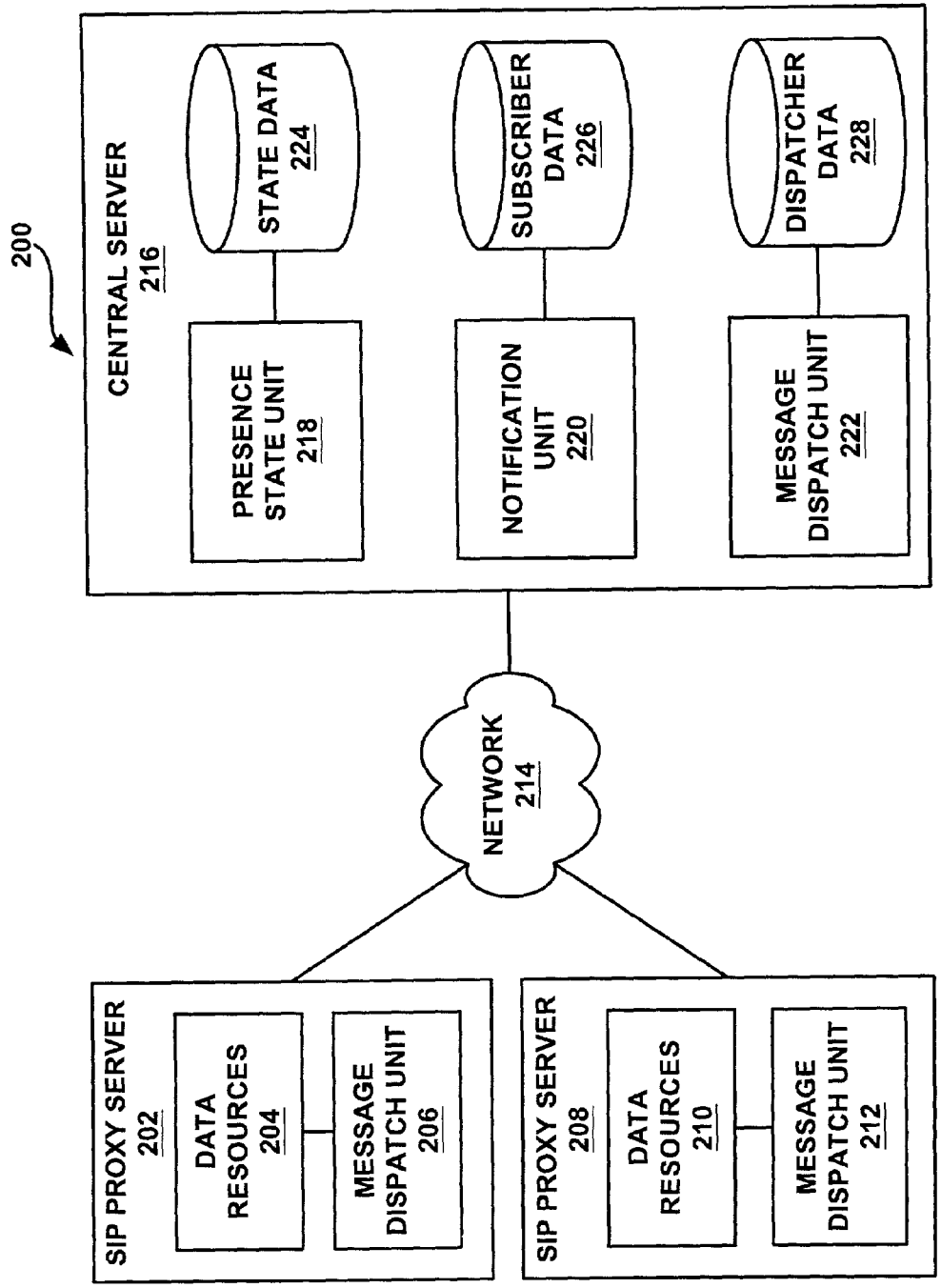
FIG. 2 is a block diagram illustrating a network architecture illustrating data resources, functional facilities and network components according to an exemplary embodiment.

FIG. 2 is a block diagram illustrating a reference architecture 200 showing the relationship between data resources, functional facilities and network components. The functional facilities are represented as rectangles and labeled appropriately. FIG. 2 illustrates local presence elements illustrated with two SIP proxy servers 202 and 208 communicating via a network 214 with a centralized presence element illustrated with a central server 216. The central server 216 may be an AAA server; however, different embodiments are possible as well. The central server 216 includes a user presence state unit 218, a notification request unit 220 and a message dispatch unit 222. Each of these units includes or has an access to data resources represented with databases: a state database 224, a subscriber database 226, and a dispatcher database 228.

According to an exemplary embodiment, the global data resources include user a presence state list that may be stored in the user state database 224, a desired watch list, an authorized subscriber list, and a current subscriber list that may be stored in the subscriber database 226. FIG. 2 illustrates an instance of distributed elements, the message dispatch unit 222 with the dispatcher database 228 at the central server 216. However, it should be understood that the message dispatch facility is a distributed and local facility, and placing the message dispatch unit 222 at the central server 216 may accommodate an embodiment, in which one or more SIP proxy servers do not have their own dispatcher elements.

FIG. 2 illustrates the distributed facility of message dispatchers at the two SEP proxy servers 202 and 208 including message dispatch units 206 and 212 having access to databases 204 and 210 including authorized dispatchers list, where an authorized dispatcher is a presence entity authorized to dispatch (or send) messages to another presence entity. In the network architecture 200, the centralized elements of the presence services are associated directly with the central server 216 or an authorization server, while the distributed elements are associated with the SIP proxy servers 202 and 208.

According to exemplary embodiments, the centralized elements at the central server 216 manage and use data resources that are global in scope, and provide centralized services. The information contained in the global data resources is closely related to that in an authorization database, so that an AAA Server may host these presence function elements. However, it should be understood that the centralized elements could also be implemented in a distinct central server. Similarly, the local data and distributed functionality of the presence function are tied to the point of SIP registration of the user agent that represents the user to the network; i.e., the SIP proxy server. For this reason, as well as others detailed below, each SIP proxy server is associated with an instance of the distributed component of the presence services. However, it should be understood that the actual implementation in terms of hardware platforms and detailed software decomposition of the distributed presence services and SIP proxy server functions is not meant to be limited by this logical construction, and different or equivalent embodiments are possible as well.

Figure 3:
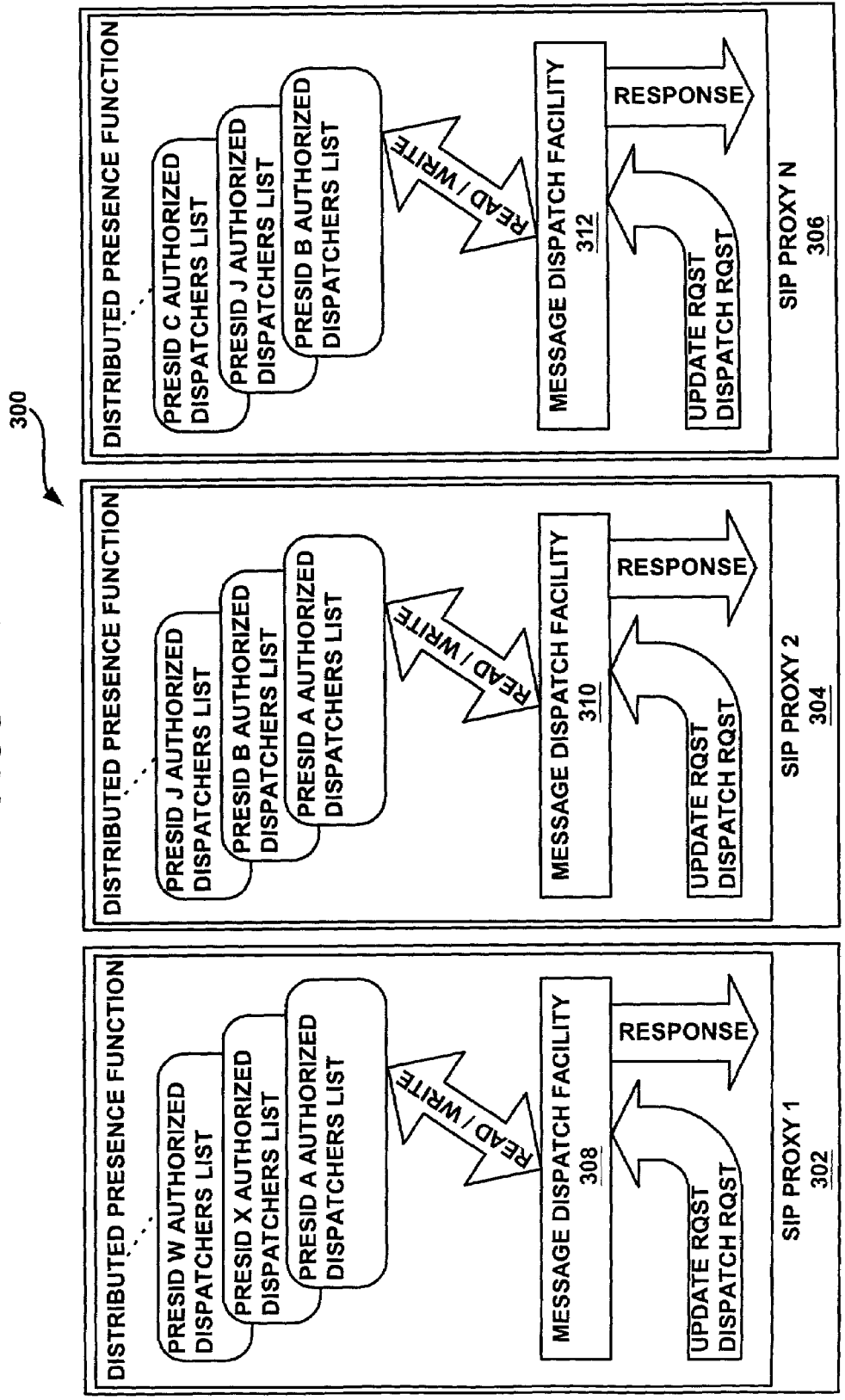
FIG. 3 is a block diagram illustrating a network architecture for a distributed presence service element according to an exemplary embodiment.

FIG. 3 is a block diagram illustrating distributed presence service functionality at three distinct SIP proxy servers. FIG. 3 illustrates three SIP proxy servers, labeled as a SIP proxy 1 302, a SIP proxy 2 304 and a SIP proxy N 306. In the exemplary diagram, data resources are illustrated as rectangles with curved sides or corners, and also labeled according to the terminology introduced above. The arrows labeled "Read/Write" or "Read" in FIG. 3 indicate a relationship between the facilities and data resources. The arrows labeled with "Rqst" and "Response" represent pseudo-APIs associated with the facilities. It should be understood that FIG. 3 is intended to illustrate services of the facilities in a generic sense, without implying any limitations to actual implementation. Further, these pseudo-APIs do not imply anything about the underlying data transport.

As described above, each presence entity is the "owner" of instances of the data resources. Individual owners are identified by Presence IDs (an identity of a presence entity that is used for the purpose of presence-based services), which, in FIG. 3, are labeled as PresID A, PresID B, etc., where A, B, . . . , is intended to designate a globally unique identifier. It should be understood that depending upon network configuration, global uniqueness may require inclusion, e.g., of domain names in the identifiers. Each SIP proxy server includes a message dispatch facility illustrated as 308, 310 and 312 that have access to distributed data resources including authorized dispatcher lists.

While for global or centralized data resources, a presence entity owns a single instance of a user presence state, such as in an authorized subscribers list, a desired watch list, and a current subscribers list, the same presence entity may be associated with multiple authorized dispatchers lists, as illustrated in reference to PresID A, for example. In FIG. 3, PresID A has two authorized dispatchers lists: one on the SIP Proxy 302, and another on the SIP Proxy 304. The PresID A may also have a third authorized dispatcher list associated with a centralized instance of the message dispatch facility, where the PresID A has authorized dispatchers who are registered at a SIP proxy servers 1 and 2, as well as some SIP proxy server which has no message dispatch function. The absence of an authorized dispatchers list for PresID A at the SIP proxy server 306 implies that there are no authorized dispatchers for PresID A registered at that SIP proxy. That is, the existence of a local authorized dispatchers list at a particular SIP proxy for some online user is dependent upon authorized dispatchers for that user being registered at that SIP proxy, and the user does not have to be registered at that SIP proxy. Similarly, PresID B has authorized dispatchers lists at the SIP proxy 304 and the SIP proxy 306.

Communications between a message dispatch element and its associated SIP proxy may be achieved using pseudo-APIs or other methods. The SIP proxy servers 302, 304 and 306 provide communication links to the centralized server, such as an authorization server, using standard or proprietary protocols, such as RADIUS or 3Q, for instance. This link is used for communications between the message dispatch units and the centralized facilities, as well as any required access to the authorization server and its database.

The message dispatch facility instance, together with its associated authorized dispatchers lists, at each SIP Proxy is independent from that at any other SIP Proxy. Further, each authorized dispatchers list is constructed from information available to either the centralized piece of the presence function or the authorization server. Therefore, it is possible to replace a failed SIP Proxy with a redundant backup without the need to communicate any related information or notices to any of the other SIP Proxies or their associated media data functions units, or to request any related information from them. Thus, if a SIP Proxy fails, all information required to recover its registration information and its authorized dispatchers lists can be obtained from the authorization server and the centralized components of the presence services. A backup can be activated and made operational with minimal impact on the overall system performance. None of the other SIP Proxies or message dispatch elements need to be aware that any failure event occurred, thus, simplifying failure recovery.

According to an exemplary embodiment, an authorized dispatchers list is a per-presence entity list of current subscribers who are authorized to dispatch messages to the owner of the list. The list also contains current contact information for the owner of the list. Lists may exist for owners who are currently online and for whom one or more online current subscribers exist. Subscribers in the list are referred to as authorized dispatchers, or just dispatchers. Although each list has an owner, list creation and maintenance is invoked to facilitate message dispatch by dispatchers to the owner of the list. As a result, an online presence entity may be the owner of multiple authorized dispatchers lists if dispatchers to the multi-list owner are registered at different SIP Proxy servers, as illustrated in reference to PresID A in FIG. 3, i.e., the lists are co-located with the message dispatch facility that support would-be dispatchers, and not necessarily with the message dispatch facility that supports the owner of the lists. Therefore, the scope of authorized dispatchers resource is local, and the list existence supports the message dispatch facility associated with SIP Proxy server of current subscribers who are authorized to dispatch messages (i.e., authorized dispatchers) to the owner of the list.

Further, each authorized dispatcher entry is identified using Presence IDs that identify both the owner and list entries (authorized dispatchers to the owner). For each online presence entity (Presence ID), zero or more lists may be maintained of all authorized dispatchers. An authorized dispatcher is a presence entity (Presence ID) other than the owner of the list who is a current subscriber to the owner of the list and is authorized to dispatch messages to the owner of the list. If no authorized dispatchers currently exist for a given presence entity, then there may be zero authorized dispatchers lists for that presence entity (existence of one or more lists even if no dispatchers exist may be possible if there is a delay between dispatchers logging off and deletion of the lists).

There may be additional restrictions and/or conditions that apply to attributes of the message dispatching function for each authorized Dispatcher's Presence ID in a given list. For example, the restrictions may specify what service(s) may dispatch messages to the owner of the list, etc. The restrictions/conditions associated with a given dispatcher may be the same as those in the current subscribers list.

In addition, each list contains contact information for the owner of the list. This information may include the owner's URI, IP address, and SIP Proxy server. Which contact information is included will depend upon the service(s) that is (are) supported. For example, for IP Intercom service, the contact information is an IP address and port on a conference server to which the owner of the list is connected (has an RTP connection).

According to an exemplary embodiment, message dispatch facility elements may access the authorized dispatchers lists to read and write to the lists. Further, each instance of message dispatch from one online presence entity to another is first authorized by the message dispatch facility unit. The authorized dispatchers list is intended to streamline the authorization process by providing a local subset of the information required for authorization. Locality refers to the message dispatch facility unit that services the sender's dispatch request. The list is also intended to facilitate the distributed instances of message dispatch facility units by providing the required information to the possibly multiple (distributed) message dispatch facilities that span multiple dispatchers who are registered at multiple SIP Proxy servers.

In this distributed architecture, a message dispatch facility instance is placed in each SIP Proxy server, and dispatch requests are processed by the message dispatch facility local to the SIP Proxy at which a dispatcher is registered. Since different dispatchers associated with the same given presence entity may be registered at different SIP Proxy servers, the different local message dispatch facility may have an authorized dispatchers list for that same given presence entity. Only message dispatch facilities with at least one dispatcher for a given presence entity will maintain an authorized dispatchers list for the given presence entity. As new dispatchers for a given presence entity come online at a specific message dispatch facility, they will either be added to a newly-created list for the given presence entity (if they are the first dispatcher for the presence entity at the message dispatch facility), or will be added to an existing list at the message dispatch facility. Once all dispatchers associated with a given presence entity and registered at the same SIP Proxy go offline, the local message dispatch facility serving those dispatchers may delete the given presence entity's authorized dispatchers list. Note that implementation considerations may favor a (configurable) delay before deleting the list.

An instance of a distributed message dispatch facility may also be included in the centralized presence function. Its purpose is to allow participation of SIP Proxy servers, which do not implement a distributed message dispatch facility. Such SIP Proxy servers would be required to forward dispatch requests to the centrally located message dispatch facility. Implementation of the central message dispatch facility in the hybrid model need not be a copy of the distributed implementation used on the SIP Proxy servers. However, different embodiments are possible as well.

According to an exemplary embodiment, message dispatch facilities 308, 310, 312 dispatch messages from one user to one or more other users, and manage the authorized dispatchers lists. As mentioned above, the message dispatch facility is the distributed part of the presence function and is used to distribute the traffic-intensive part of Presence-based services among the SIP proxy servers to which presence users register. That is, in contrast to subscription requests and state change notifications, which are relatively infrequent, requests for message dispatches will be quite frequent. Since each and every message dispatch request should be authorized, enabling the SIP Proxy servers of the requester to service the dispatch requests eliminates the potential load and bottleneck from the centralized piece of the presence function.

The message dispatch facility is a facility that is local to each SIP Proxy server. At each SIP Proxy server, a message dispatch facility instance manages a local set of authorized dispatchers lists: a set of dynamic data resources which contain contact information for would-be message recipients, and which associate each would-be recipient list of authorized dispatchers who are registered with the local SIP Proxy server. That is, a given would-be recipient owns an authorized dispatchers list at each SIP Proxy, which has registered users who are authorized dispatchers for that would-be recipient. Each authorized dispatchers list at a given SIP Proxy server is dynamic in the sense that list entries (i.e. authorized dispatchers) are added and deleted as a result of a subscription cancellation by an authorized dispatcher, an authorized dispatcher going Offline and/or deregistering with the SIP Proxy, or a notifier request to de-authorize a given authorized dispatcher, for instance.

In addition, a given message dispatch facility may have no authorized dispatchers list for a given notifier if no authorized dispatchers for that notifier registered at the local SIP Proxy. An authorized dispatchers list for a given notifier may be created at a particular MDF when at least one user registered at the local SIP Proxy becomes an authorized dispatcher to that notifier. The list may be deleted when all previously existing authorized dispatchers to that notifier are deleted from that notifier's list. (Depending upon implementation considerations, there may be a delay between the time the list becomes empty and deletion of the list). Similarly, when a user goes Offline, all message dispatch facilities, which were maintaining an authorized dispatchers list for that user, are notified and may delete their respective lists.

Some Dispatch requests may comprise start/stop pairs (not to be confused with the Rqst/Rsp transaction pair) if the actual message data are sent as a media stream (e.g., using RTP). This is the case, for example, with IP Intercom (U.S. patent application Ser. No. 10/021,171, incorporated herein by reference), which uses one Dispatch request to set a media channel active prior to the start of media flow, and another to set the media channel to inactivate once the media flow has ended. These paired Dispatch messages use an optional Start parameter in the initial request, and a Stop parameter in the closing request; the Stop is required if the request used the optional Start.

The message dispatch facility may have actions and tasks associated with initialization of Presence-based services. The message dispatch facility may include a generic service initialization parameter to accommodate such operations. The pseudo-API of the message dispatch facility supports two request-response pairs: Update_Rqst and Update_Rsp; and Dispatch_Rqst and Dispatch_Rsp. Update_Rqst is used to request an update to the local authorized dispatchers lists, as well as requesting service initialization; and Dispatch_Rqst is used to dispatch a message. Table 2 lists pseudo-APIs that may be used on each message dispatch facility.

As with the introduction of the functional facilities, these pseudo-APIs help organize the description of the information and actions required in order for a given facility to deliver a service. Again, there are no implied requirements regarding implementation of actual APIs other than support of the functionality and information exchanged between entities. Additional APIs may be added, and the ones listed may be modified as necessary for achieving required functionality. Further, no assumptions or restrictions are placed upon external interfaces or transport protocols, which interconnect infrastructure components that implement the presence function; e.g., the authorization server and the SIP Proxy servers. In the case of the centralized portions of the presence function, different facilities may communicate with each other internally by way of the pseudo-APIs without ever encountering any external interfaces.

It should be understood that by illustrating an exemplary set of APIs, no requirement is implied on the number or format of parameters used in the actual implementation, and additional APIs may be added. The descriptive names given for the inputs and outputs are suggestive of their purpose only. Additional parameters, which may be related to implementation, such as sequence numbers for matching responses to requests, are not considered in this document.

TABLE 2

| Name | Description | Use | Related UPSF Actions |
|---|---|---|---|
| | | Update Inputs | |
| fromPres_ID | Presence ID of requester or would-be sender if request is not initiated by fromPres_ID | Used on all requests | Identifies the requester for Subscription setup and cancellation; identifies would-be sender for other types of requests |
| toPres_ID | Presence ID of would-be recipient; may be a list | Used on all requests | Presence ID of user who owns Authorized Dispatchers List to which this request applies; if this is a Subscription setup, then fromPres_ID is added as an Authorized Dispatcher to the list (a new list is created if |

TABLE 2-continued

| Name | Description | Use | Related UPSF Actions |
|---|---|---|---|
| | | | fromPres_ID is the first Authorized Dispatcher at this MDF); if this is Subscription cancellation, then fromPres_ID is deleted from the list; if this is toPres_ID going Offline, then toPres_ID identifies the list owner, and the list may be deleted; if this is toPres_ID deauthorizing a previously Authorized Dispatcher, then toPres_ID identifies the list owner and fromPres_ID is removed from the list. |
| P_srvc_ID | Presence-based service associated with this request | Used on all requests | Controls any service-specific aspects of request to the MDF |
| DspchList_update | Indicates request for update of Authorized Dispatchers List for toPres_ID | Used on all requests for updates to the Authorized Dispatchers List of user identified in toPres_ID. | Some actions include: Add fromPres_ID to Authorized Dispatchers List of toPres_ID; remove fromPres_ID from list; update contact information for toPres ID. |
| P_srvc_init | Service initialization parameter | Used to indicate that MDF needs to perform some service-related initialization tasks | Specific actions depend upon the service |
| Update Outputs | | | |
| fromPres_ID | Presence ID of original requester or would-be sender | Used on all responses | Identifies the requester for Subscription setup and cancellation; identifies would-be sender for other types of requests |
| toPres_ID | Presence ID of would-be recipient; may be a list | Used on all responses | Presence ID of user who owns Authorized Dispatchers List to which this request applied |
| P_srvc_ID | Presence-based service associated with this request | Used on all responses | Provides service-specific return information for service initialization |
| Status | Generic status parameter | As needed | Various, depending on details |
| init_complete | Indicates service-related initialization is complete; specific init actions depend on service | Used to indicate that MDF actions for service initialization are complete | Specific actions depend upon the service. |
| Dispatch Inputs | | | |
| fromPres_ID | Presence ID of requester | Used on all requests | Identifies the user who wants to send a message |
| toPres_ID | Presence ID of intended message recipient(s); may be a list | Used on all requests | The MDF checks to see if fromPres_ID is an Authorized Dispatcher to toPres_ID by checking the Authorized Dispatchers List of toPres_ID; if toPres_ID is a list, then the MDF checks for each list entry. |
| msg | Presence-based service associated with this request | Used on all requests | Message to be sent. Interpretation may depend upon specific Presence-based service. |
| [start] | Optional start parameter | Used on requests which | Depends upon specific service. Actions for start of |

TABLE 2-continued

| Name | Description | Use | Related UPSF Actions |
|---|---|---|---|
| [stop] | Optional stop parameter | must be paired with a stop Used on requests which must be paired with start | sending begin with start parameter Depends upon specific service. Actions for stop of sending begin with stop parameter |
| | | Dispatch Outputs | |
| fromPres_ID | Presence ID of original requester | Used on all responses | Identifies the original requester |
| toPres_ID | Presence ID of message recipient(s); may be a list | Used on all responses | Identifies Presence ID(s) to whom dispatch actions were applied. |
| Status | Status of request | | |

Figure 4:
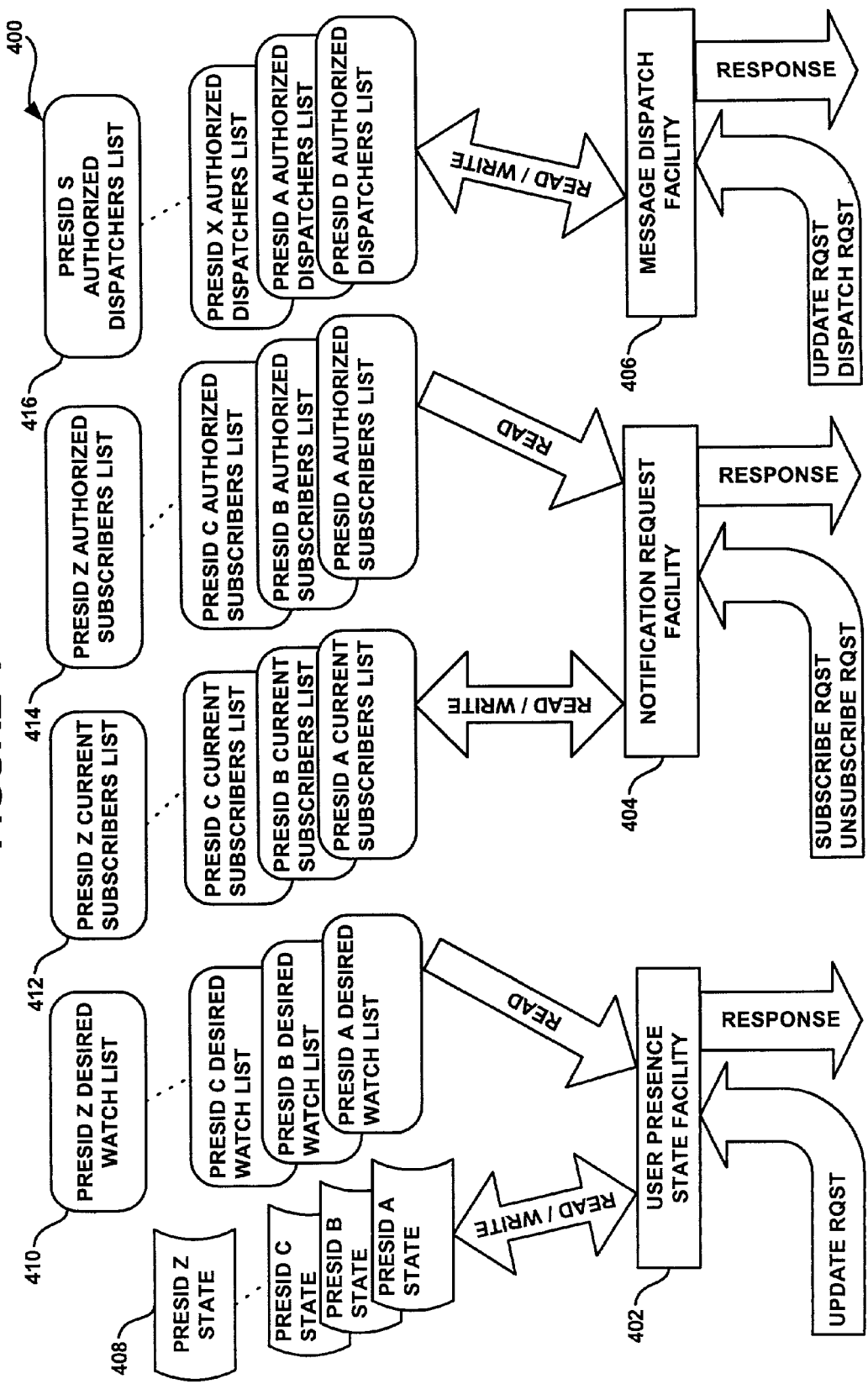
FIG. 4 is a block diagram illustrating a network architecture for a centralized presence service element according to an exemplary embodiment.

FIG. 4 is a block diagram illustrating an exemplary architecture of centralized elements of the presence services. According to an exemplary embodiment, centralized facilities, which may be implemented on the Auth Server or a distinct server, include a user presence state facility ("UPSF") 402, a notification request facility ("NRF") 404, and a message dispatch facility ("MDF") 408. It should be understood that the intercommunication between those facilities may be handled internally using pseudo-APIs or other methods. Some or all of the data that comprises the various data resources may be stored as part of the authorization database. For example, the authorized subscribers list may be part of a user profile. Thus, methods may exist to interface software that constructs the data resources and the authorization database, and an SQL could be used, for example. If the centralized facilities are implemented on a distinct server, access to the authorization database may be done using additional standard or proprietary protocols, such as RADIUS, which is an example of a standard protocol, or 3Q, which is an example of a proprietary protocol.

According to an exemplary embodiment, the UPSF 402 provides user presence state tracking. The UPSF manages the user presence state data resource. It has read/write access to a user presence state data resource 408, and acts in response to changes in state and requests to report state. The UPSF 408 also has read access to a desired watch list data resource 410 including desired watch lists, i.e., a presence entity's list of desired notifiers (presence entities to which the presence entity would like to subscribe to).

The UPSF 402 tracks the presence state of each user through management of the user presence state data resource 408, and makes that information available to other functions as required. The pseudo-API of the UPSF 402 supports a single request-response pair: Update_Rqst and Update_Rsp. Update_Rqst is used either to inform the UPSF 402 of a change of presence state for a specific user, or to request the current presence state of a specific user. Inputs passed in Update_Rqst will be used by the UPSF 402 to determine its specific actions. Update_Rsp is used to inform the requester of the results of the request, as well as to pass any required output. Table 3 illustrates a set of pseudo-APIs that may be used on the UPSF 402. It should be understood, as explained in reference to Table 1, that the illustrated APIs are only exemplary, and different embodiments are possible as well.

TABLE 3

| Name | Description | Use | Related UPSF Actions |
|---|---|---|---|
| | | Inputs | |
| fromPres_ID | Presence ID of requester | Used on all requests | Identifies the requester |
| toPres_ID; or DesiredWatch_list | Presence ID(s) that is target of request; may be a list (Desired Watch List) | Used on Pull requests; or else, used to override default Desired Watch List | For Pull request, retrieve UPS associated with this Presence ID; or else, pass to NRF as Desired Watch List |
| newState | User-specified state requested | Used on all state-change requests | request Current Subscribers List from NRF Request Authorized Watch List from NRF for Offline-to-Online requests update UPS to newState or Pending depending upon request and inputs |
| P_srvc_ID | Presence-based service associated with this request | Used on all requests | Controls service-specific aspects of request; may be passed to NRF in NRF service request if applicable |
| Pull | Indicates request for immediate | Indicates a Soliciter | If request is granted by the NRF, the UPSF retrieves |

TABLE 3-continued

| Name | Description | Use | Related UPSF Actions |
|---|---|---|---|
| | status on state(s) of all Desired Notifiers | Subscription request; i.e., when requester doesn't want to wait for change in status of Desired Notifier(s) | the current state of the Notifier(s) |
| init_complete | Indicates service-related initialization is complete; specific init actions depend on service | Used for requests that result in Pending state until initialization is complete; signals that conditions for newState are valid | UPSF updates requester's from Pending to newState once it receives indication that initializations related to newState are complete. |

Outputs

| Name | Description | Use | Related UPSF Actions |
|---|---|---|---|
| fromPres_ID | Presence ID of original requester | Used on all responses | Identifies the original requester |
| Cur_Subscriber | Current Subscribers List | Informs the requester of which users must be notified of state changes | Passed to UPSF from NRF; passed to requester in UPSF response to requester |
| Auth Watch_list; or toPres_ID | Authorized Watch List; or single Willing Notifier | Provides the requester's Authorized Watch List; or single Willing Notifier | Passed to UPSF from NRF; passed in UPSF response to requester; single Notifier in case of request for single Subscription |
| P_srvc_ID | Presence-based service associated with this request | Used on all state-change requests | Matches service of input request; may include parameters from the system |
| Status | Current state of Notifier(s) | Returns current state of Notifier(s) to requester | Used by UPSF to pass current state of Notifiers |

The user presence state resources 408 managed by UPSF 402 are used to store the current presence state of each user. The scope of the presence state resources is global, i.e., data for all users are maintained centrally and is global in scope. According to an exemplary embodiment, for each presence entity, identified by a Presence ID, this resource records the current presence state. The presence state of any presence entity may be both read (read access) and updated (write access) by the UPSF 402, as illustrated in FIG. 4. All presence entities are represented in this resource as long as they are in one of the allowed user presence states (which includes Offline).

As mentioned above, the UPSF 402 also manages the desired watch list data resources 410. A desired watch list data resource is a per-presence entity list that specifies which other presence entities the owner of the list would like to subscribe to; i.e., which other presence entities the owner of the list desires to watch for presence state changes. List entries are referred to as desired notifiers. Further, list entries identify both the owner of the list and list entries (desired notifiers of the list owner). The lists may be stored as part of the user profile, and used by default if a request does not supply a list explicitly. That is, if a service request to the NRF 404 from the UPSF 402 requires the desired watch list, and the list has not been explicitly supplied in the upstream request to the UPSF 402, then the UPSF 402 may access the user profile to obtain a default list.

For each presence entity, identified by Presence ID, the desired watch list is used when the presence entity first requests to go Online to indicate to the NRF 404 to which presence entities the requester would like to subscribe. The list is filtered according to the authorized subscribers list of each desired notifier in order to generate an authorized watch list. The requester may explicitly send a desired watch list to the presence function, or omit it and let the UPSF 402 access the presence entity's default list. The owner of the default list may modify the default list contents in user profile through the provisioning server. All presence entities may have an associated desired watch list regardless of their current user presence state.

The NRF 404 provides subscription and notification functions. The NRF 404 manages current subscribers lists data resource 412. The NRF 404 also has a read access to authorized subscribers lists 414 associated with each user. Write access to each user's authorized subscribers lists is made available to the respective user via the provisioning server.

Subscription requests are accompanied by the Presence IDs of one or more desired notifiers. The requesting user may supply the Presence IDs, or the UPSF 402 may retrieve the requester's desired watch list on behalf of the requester. The NRF 404 may filter requests using the authorized subscribers lists of the desired notifiers in the subscription request to determine the authorized watch list. Granted subscription requests cause the NRF 404 to insert the requester's Presence ID in the current subscribers lists of all willing notifiers. The NRF 404 also returns the requester's current subscribers list for requests that correspond to changes in user presence state.

Subscription requests can come directly from a user (or user's agent), or from the UPSF 402 as part of state-change request. For example, when a user first goes Online, a request for subscription to all of the user's desired notifiers is sent to the NRF 404. There are two types of subscription request: a watcher request and a solicitor request. Watcher requests are those, for which a requester would like to be alerted upon future changes in state of the notifier(s). Solicitor requests are those, for which a requester would like an immediate report of the current state of the notifier(s).

The pseudo-API of the NRF 404 supports two request-response pairs: Subscribe_Rqst and Subscribe_Rsp; and Unsubscribe_Rqst and Unsubscribe_Rsp. Subscribe_Rqst is used to request a Subscription, and Unsubscribe_Rqst is used to cancel a Subscription. Table 4 lists an exemplary set of pseudo-APIs that may be used on the NRF 404.

TABLE 4

| Name | Description | Use | Related UPSF Actions |
|---|---|---|---|
| Subscribe Inputs | | | |
| fromPres_ID | Presence ID of requester | Used on all requests | Identifies the requester |
| toPres_ID or DesiredWatch_list | Presence ID that is target of request; if list, then more than one Subscription is requested | Used on all requests for Watcher and Solicitor Subscriptions | Filter request against Authorized Subscribers Lists of all Desired Notifiers to identify all Willing Notifiers; insert requester's Presence ID into Current Subscribers Lists of all Willing Notifiers; generate Authorized Watch List as a from list of Willing Notifiers |
| newState | User-specified state requested | Used on all state-change requests; signals that the NRF accesses the requester's Current Subscribers List | Access and return the requester's Current Subscribers List; may be other actions depending upon the new and old states. |
| P_srvc_ID | Presence-based service associated with this request | Used on all requests | Controls any service-specific aspects of request to the NRF |
| Pull | Indicates request for immediate status on state(s) of all Desired Notifiers | Indicates a Solicitor Subscription request; i.e., when requester doesn't want to wait for change in status of Desired Notifier(s) | Same as for Watcher Subscription request; passed to UPSF by NRF when Solicitior request comes directly to NRF from user (or user's agent). a granted Soliciter may also become a Watcher by default |
| Subscribe Outputs | | | |
| fromPres_ID | Presence ID of original requester | Used on all responses | Identifies the original requester |
| Cur_Subscribers | Current Subscribers List | Informs the requester of which users must be notified of state change | Passed to UPSF from NRF; passed to requester in UPSF response to requester |
| AuthWatch_list ; or toPres_ID | Authorized Watch List; or single Willing Notifier | Provides the requester's Authorized Watch List; or single Willing Notifier | Passed to UPSF from NRF after generation of the List; single Notifier in response to single Subscription request |
| P_srvc_ID | Presence-based service associated with this request | Used on all requests | Controls service-specific aspects of request |
| Status | Current state of Notifier(s) | Returns current state of Notifier(s) to requester | Used by NRF to pass current state of Notifier(s) directly to user when user has made direct Solicitor request to NRF. |

TABLE 4-continued

| Name | Description | Use | Related UPSF Actions |
|---|---|---|---|
| *Unsubscribe Inputs* | | | |
| fromPres_ID | Presence ID of original requester | Used on all requests | Identifies the original requester |
| toPres_ID or AuthWatch_list | Presence ID that is target of request; if list, then more than one cancellation is requested | Used on all requests for cancellation of Watcher and Soliciter Subscriptions | NRF removes the requester's Presence ID from the Current Subscribers Lists of all Notifiers identified in input Authorized Watch List. This request can only follow successful Subscription request(s); therefore, the Authorized Watch list is known to the user upon input |
| P_srvc_ID | Presence-based service associated with this request | Used on all requests | Controls any service-specific aspects of request to the NRF |
| *Unsubscribe Outputs* | | | |
| fromPres_ID | Presence ID of original requester | Used on all responses | Identifies the original requester |
| toPres_ID or AuthWatch_list | Presence ID that is target input of request; if list, then more than one cancellation was requested | Used on all responses | Identifies Presence IDs that were subjects of Subscription cancellation |
| Status | Status_of request | | |

According to an exemplary embodiment, when the UPSF 402 accesses the requester's desired watch list, the UPSF 402 may pass this list to the NRF 404 as part of a service request, for instance. For each entry in the desired watch list, the UPSF 402 accesses the corresponding authorized subscribers list. If the requester (owner of the desired watch list) is found as an entry in the authorized subscribers list, then that desired notifier is identified as a willing notifier (with possible conditions/restrictions). If the requester is not in an authorized subscribers list, then that desired notifier is not identified as a willing notifier. The authorized watch list is then constructed from the list of all identified willing notifiers.

In the case when the requester is not an authorized subscriber of the desired notifier and the notifier is Online, a dynamic request may be sent to the desired notifier. If the desired notifier grants permission, then the desired notifier may be identified as a willing notifier and added to the requester's authorized watch list. The dynamic request may also include options for the desired notifier to add the requester to his/her authorized subscribers list, or just make a onetime grant of permission.

An authorized watch list is a per-presence entity list that specifies which other presence entities the owner of the list may subscribe to; i.e., which other presence entities the owner of the list is authorized to watch for presence state changes. List entries are referred to as willing notifiers. The authorized watch list may be a temporary list, in that it is created by the NRF 404 upon request from the UPSF 402 and consumed by other functional facilities and/or clients of the presence function. Presence IDs in the authorized watch lists identify both the owner of the list and list entries (Willing Notifiers of the owner).

For a given Presence Entity (Presence ID), the list contains all other Presence Entities (Presence IDs) who have granted permission to the owner of the list to subscribe to their presence (permission may be granted on behalf of a Notifier by an agent who has access to Notifier's profile information; e.g., the NRF 404 accessing the authorized subscribers list). List entries are referred to as willing notifiers because permitting the owner of the list to subscribe to them means willingness to notify the owner upon changes to their presence state. Associated with each willing notifier's presence ID in a given list there may additionally be restrictions and/or conditions that apply to the subscriptions to notifiers. For a given willing notifier, these conditions/restrictions are derived from the authorized subscribers list associated with the Presence ID of the notifier.

The current subscriber list resources 412 may include a per-presence entity list that specifies which other presence entities are currently subscribed to the owner of the list. List entries are referred to as current subscribers. Only authorized subscribers to the owner of the list who are currently online may be included in this list. According to one embodiment, Presence ID in each list identifies both the owner and list entries (online, authorized Subscribers to the owner). Further, for each presence entity (Presence ID), a list is maintained of all current subscribers. A current subscriber is a presence entity (Presence ID) other than the owner of the list who is online, authorized to subscribe to the owner of the list (i.e. an authorized subscriber), and has been granted a request to subscribe to the owner of the list.

There may be additional restrictions and/or conditions associated with each Subscriber ID, as described in reference to authorized subscribers lists. The restrictions/conditions associated with a given current subscriber may be copied from the corresponding authorized subscriber entry in the authorized subscribers list. The different restrictions/conditions applied to a given authorized subscriber by different presence entities also apply to the same current subscriber of those presence entities.

For each presence entity, identified by a Presence ID, the current subscribers lists define which online presence entities to notify when the owner of the list changes user presence state. Notification of such state changes to any given presence entity in the list may be subject to restrictions/conditions associated with that user in the list. All presence entities have an associated authorized subscribers list regardless of their current user presence state, although the list may be empty if no other presence entities have subscribed to the owner of the list.

As described below, the NRF 404 updates (writes access) the list on behalf of a list's owner, as well as retrieves (read access) the list in order to support facilities for notification to subscribers in the list of state changes of the owner of the list.

The authorized subscribers resources 414, also managed by the NRF 404, include per-presence entity lists that specify which other presence entities may subscribe to the owners of the lists. The authorized subscriber list may comprise part of the user profile information, and a Presence ID in a list identifies both the owner of the list and list entries (authorized subscribers to the owner).

According to an exemplary embodiment, for each presence entity (Presence ID), a list is maintained of all other presence entities (Presence IDs) that are authorized to subscribe to the owner of the list, and the list entries are referred to as authorized subscribers. Associated with each authorized subscriber's Presence ID in a given list there may additionally be restrictions and/or conditions that apply to the subscription. These may include, but are not limited to time of day, specific service to which an allowed Subscription applies, list-owner state-related filters (i.e., user-owner's states acts as a filter to authorized subscribers privileges with respect to the owner). The restrictions/conditions associated with a given subscriber are determined by the owner of the list. That is, different users may apply different restrictions/conditions to the same Authorized Subscriber. According to an exemplary embodiment, a provisioning server may have read/write access capabilities to the authorized subscribers resources 414.

Further, in one embodiment, the information in the authorized subscribers list may be part of the user profile data in the authorization database in order to support access from the provisioning server. If the NRF 404 reads that database directly for its required functionality, then no synchronization may be used. If, instead, the NRF 404 maintains its own copy of the data, e.g., in memory-resident data structures, then the user profile data in the authorization database may be synchronized.

Further, as described in greater detail above, the centralized presence function element 400 may also include the message dispatch facility 406 having a read/write access to authorized dispatcher resources 416 including authorized dispatcher lists. The message dispatch facility 406 on the centralized entity may be used to serve dispatch request from SIP proxy servers that do not have dispatch functionality.

Functional Description

In this section a selected set of functions and services, presented in the form of logic flowcharts and service call flows, will be used to illustrate the functional description of presence services according to exemplary embodiments. The set of functions and services is not intended to describe the full range of presence services, and only represents fundamental capabilities, and exemplifies different aspects of the architectural approach.

The logic flowcharts define actions and decisions that are taken by the presence function and associated network components in order to service a specific request or accomplish a related subtask. It should be understood that the flow charts should not be viewed as to imply anything about implementation other than which component is involved. The presence function is decomposed only into a "centralized component" and a "distributed component," with no reference to the three facilities described above. At various steps, input and output data are identified, including the data resources and items labeled with descriptive names. These are meant only to indicate information that is key to a particular step or steps, and are not inclusive of all the data that might be relevant to that step.

The service call flows provide examples of how the selected functions and services could be embodied among the specific network components and presence functions elements, now including the three facilities.

For each of six services of presence service described below, one or more logic flowcharts are first shown, followed by a service call flow. The six services presented are: a request to register and go online (specific case of state change request), a request to change a presence state (generalization of request to go Online), a request to subscribe as a watcher, a request to subscribe as a solicitor, a request to dispatch a message, and a request to cancel a subscription.

The logic flowcharts and service call flows included here are not intended to represent a complete set of cases required for an actual implementation of presence service. For example, error cases are not accounted for.

User Request to Register and go Online

The request to Register may be a usual SIP Registration request, and it establishes the SIP Proxy Server to which a user agent at a client device registers. All subsequent service requests from the user agent to the system, including presence-related services, are made through the SIP Proxy. Therefore, part of the initial processing is an authentication and authorization step. The request to go online with presence service is a special case of a general request by the user to change user presence state. Since presence service is the basis for some high-layer service, such as instant messaging, the high-layer service may be identified in the request.

Figure 5:
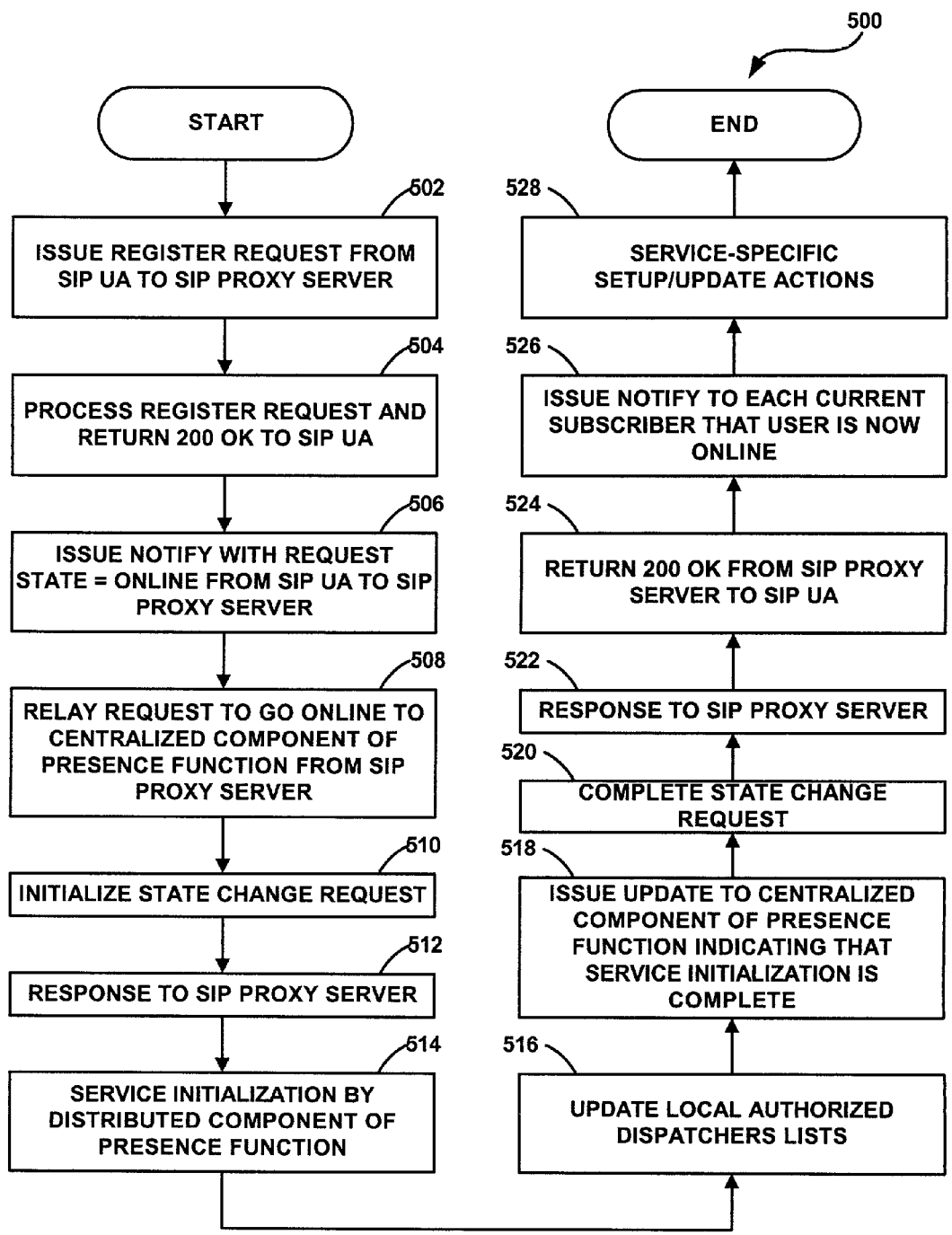
FIG. 5 is a flow chart illustrating a method for user processing a user's request to register and go online according to an exemplary embodiment.

FIG. 5 is a flow chart illustrating a method for requesting to register and go online. At step 502, a user agent at a client device issues a registration request that is sent to a SIP proxy server. The registration request may include an Account ID of the user. At step 504, the SIP proxy server receives the registration request, processes the request, and replies with a registration confirmation, such as a 200 OK message, to the user agent at the client device. In one embodiment, the SIP proxy server may communicate with an AAA server to authenticate the user. The SIP proxy server may relay the received request including the Account ID to the AAA server, and the AAA server may authenticate the request and determine if the user is authorized to access presence state services.

When the SIP user agent at the client device receives the 200 OK message, at step 506, the SIP user agent sends a NOTIFY message to the SIP proxy server, and the NOTIFY message includes a request to change the state of the user to an ONLINE state. It should be understood that before the SIP proxy server generates and sends the NOTIFY message, the SIP user agent first subscribes to the SIP user agent by sending a SUBSCRIBE message to the SIP user agent. Responsively, the SIP proxy server may recognize requests originating from the SIP user agent. According to an exemplary embodiment, the NOTIFY message may include a Presence ID of the user, a request for the presence service, and a request to change the state to ONLINE. Additionally, the NOTIFY message may include a desired watch list.

At step 508, when the SIP Proxy server receives the request, the SIP proxy server relays the request to the centralized component of the presence services. In one embodiment, the request may be relayed via the AAA server.

At step 510, the centralized component of the presence services receives the request and initializes the state change request, the embodiment of which will be described in greater detail in reference to a flow chart in FIG. 6. Once the state change request is initialized, at step 512, the centralized component of the presence services sends a response message to the SIP proxy server. According to an exemplary embodiment, the response may be relied to the SIP user agent via the AAA server, and the response message, among other parameters, may include the Presence ID specified in the request, an authorized watch list, a current subscriber list, and any other service-related information.

At step 514, a distributed component of the presence function initializes services for the user associated with the Presence ID. The step of service initialization may depend on specific presence-based service being requested. For example, the service initialization may involve setting up RTP connections between the SIP user agent and another entity.

At step 516, the distributed component of the presence services updates local authorized dispatcher lists, the embodiment of which will be described in greater detail below in reference to a flow chart illustrated in FIG. 9. The step of updating local authorized dispatcher lists may include adding or deleting dispatchers, or creating and deleting dispatcher lists. It should be understood that authorized dispatchers can be added to a list at the dispatcher's request, providing authorization has been received first. Deleting an authorized dispatcher from a given list is done either at the dispatcher's request as part of a subscription cancellation, or at the list owner's request as part of some sort of de-authorization action.

At step 518, the SIP proxy server generates and sends an update message to the centralized components of presence functions via the AAA server, for example. The update message may include the Presence ID, service-related information, and a parameter indicating the completion of the initialization process. At step 520, the centralized components of presence services complete the state change request process, the embodiment of which will be described in greater detail in reference to a flow chart illustrated in FIG. 10. According to an exemplary embodiment, the centralized component may mark the requesting user's state to the new state.

At step 522, the centralized presence component sends a response to the SIP proxy server via the AAA server, and the response includes the Presence ID. Responsively, at step 524, the SIP proxy server generates a 200 OK message and sends it to the user agent ("SIP UA") at the client device. According to an exemplary embodiment, the 200 OK message may include a watch list. At step 526, the SIP proxy server generates a notification message to each current subscriber, and the notification message conveys that the user associated with the Presence ID is now online. Additionally, notification messages may be sent to each SIP proxy server that servers current subscribers. It should be understood that the notification messages include the Presence ID of the user.

At step 528, the SIP user agent may perform service-specific setup/update actions. The types of steps involved may include updating user interfaces to display updated information regarding the service, e.g., display current contacts who are online, etc.

Figure 6:
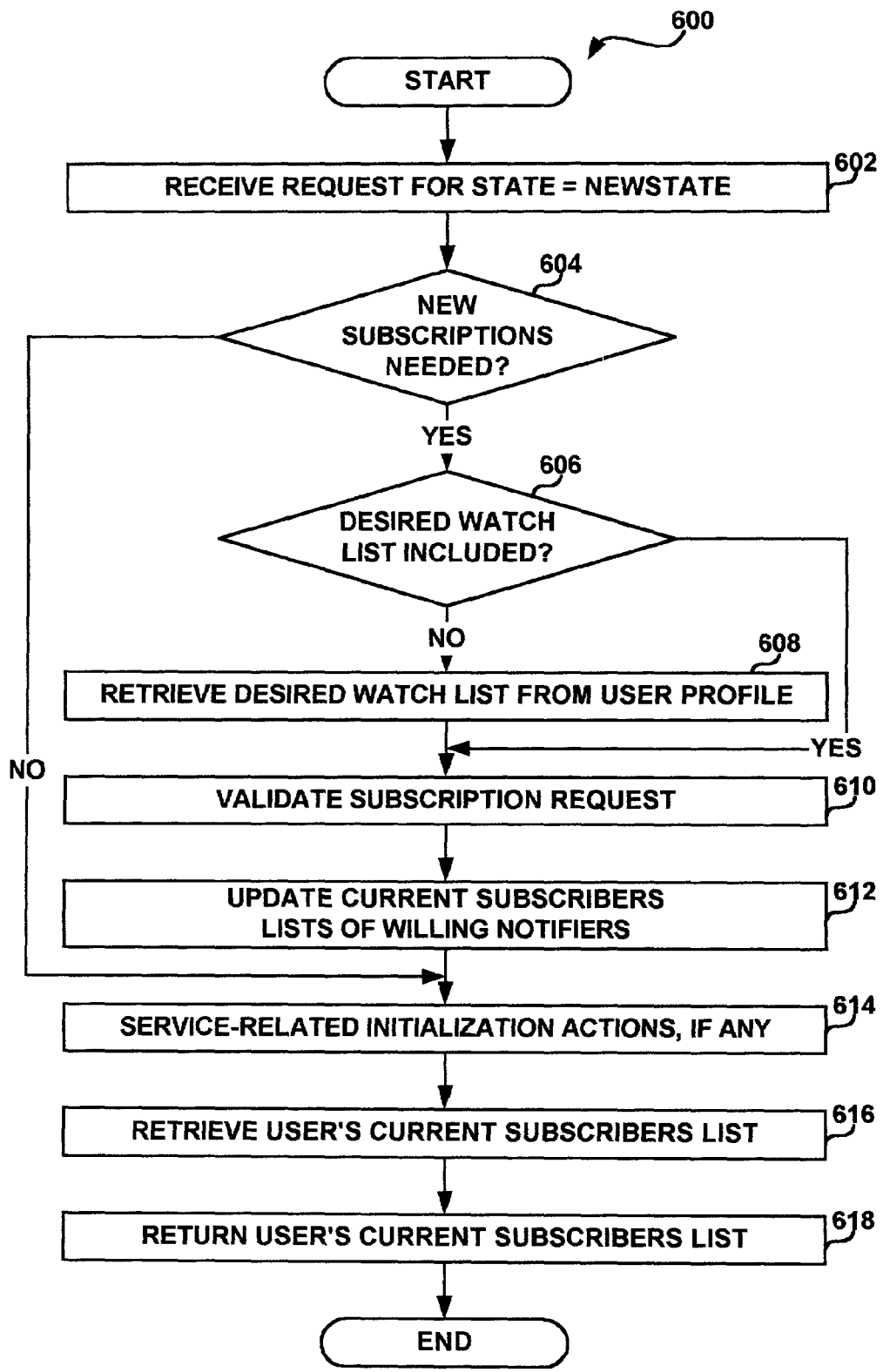
FIG. 6 is a flow chart illustrating a method for initializing a state change request according to an exemplary embodiment.

FIG. 6 is a flow chart illustrating a method 600 for initializing a state change request on the centralized component of the presence services. Specifically, the method 600 provides a detailed description for step 510 in FIG. 5. At step 602, the centralized component of the presence services receives a state change request for a user having a predetermined Presence ID. The state change request includes the Presence ID of the user, defines the requested presence services, and specifies a new requested state. Additionally, the state change request may include a desired watch list.

At step 604, the centralized presence component determines if a new subscription is needed. If so, at step 606, the centralized presence component determines if a desired watch list is included in the request. If the desired watch list is not included, at step 608, the centralized component may retrieve a desired watch list from a user profile, for instance. At step 610, the centralized presence component validates the subscription request, the method of which will be described in greater detail below in reference to a flow chart in FIG. 7. Upon the validation, at step 612, the centralized presence component updates the current subscribers lists of willing notifiers, the method of which will be described below in reference to a flow chart illustrated in FIG. 8.

At step 614, service-related initialization actions may be performed, and, at step 616, the centralized presence component may retrieve a user's current subscribers list. In one embodiment, the authorization server may include a centralized-located user's current subscriber list, and, in such an embodiment, the centralized presence component may access the authorization server to retrieve the list. At step 618, the centralized presence component sends the user's current subscribers list to a SIP proxy server associated with the subscriber, and the method 600 terminates.

Figure 7:
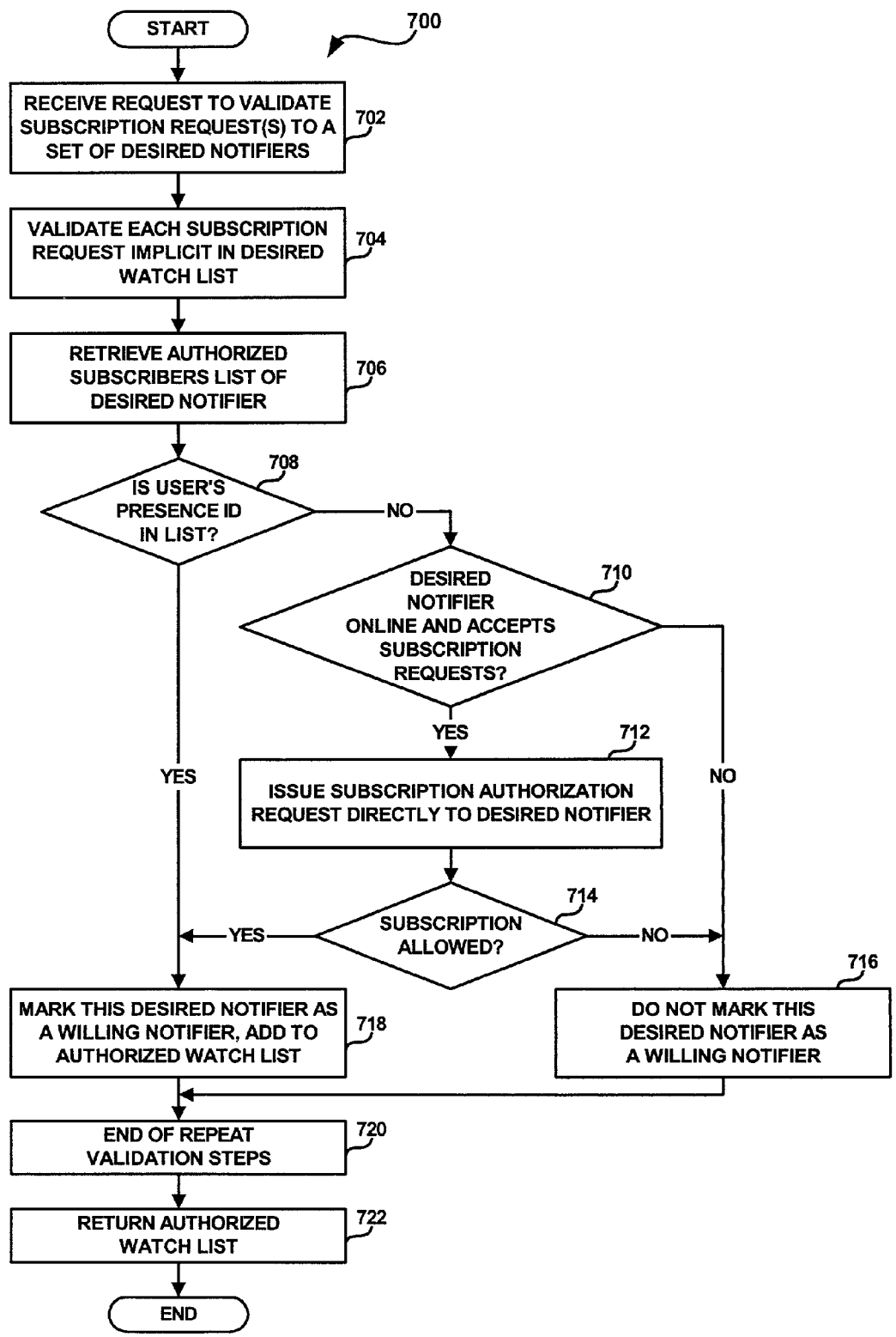
FIG. 7 is a flow chart illustrating a method for validating subscription requests according to an exemplary embodiment.

FIG. 7 is a flow chart illustrating a method 700 for validating subscription requests on the centralized component of the presence services. Specifically, the method 700 provides a detailed description for the step 610 in FIG. 6. At step 702, the centralized component of the presence services receives a request to validate a subscription request or subscription requests to one or more of desired notifiers. According to an exemplary embodiment, the request includes a desired watch list. At step 704, the centralized component validates each subscription request in the desired watch list, and the validation steps are repeated for each desired notifier in the desired watch list.

To validate each subscription, at step 706, the centralized component retrieves an authorized subscribers list of desired notifiers of each specified watcher. At step 708, the centralized presence component determines if the Presence ID of the user requesting the desired watch list is specified in the authorized subscriber lists of the watchers. If the user's Presence ID is not in a retrieved list, at step 710, the centralized presence component determines if a desired notifier is online and if the notifier accepts subscription requests. If the desired notifier is not online or does not accept active queries, at step 716, the centralized presence component does not mark the desired notifier as a willing notifier. However, if a desired notifier is online and accepts dynamic queries, at step 712, the centralized presence entity generates and sends to the desired notifier a subscription authorization request. At step 714, the centralized presence component determines if the notifier allows the requested subscription. If the desired notifier does not accept the subscription, the method 700 continues at step 716.

If the desired notifier accepts the subscription, at step 718, the centralized component marks the notifier as a willing notifier and adds that notifier to an authorized watch list for the Presence ID. At step 720, when the centralized presence entity completes validation steps for each desired notifier, the validation process terminates. Further, at step 722, the centralized presence component returns an authorization watch list to the SIP proxy server, and the method 700 terminates.

Figure 8:
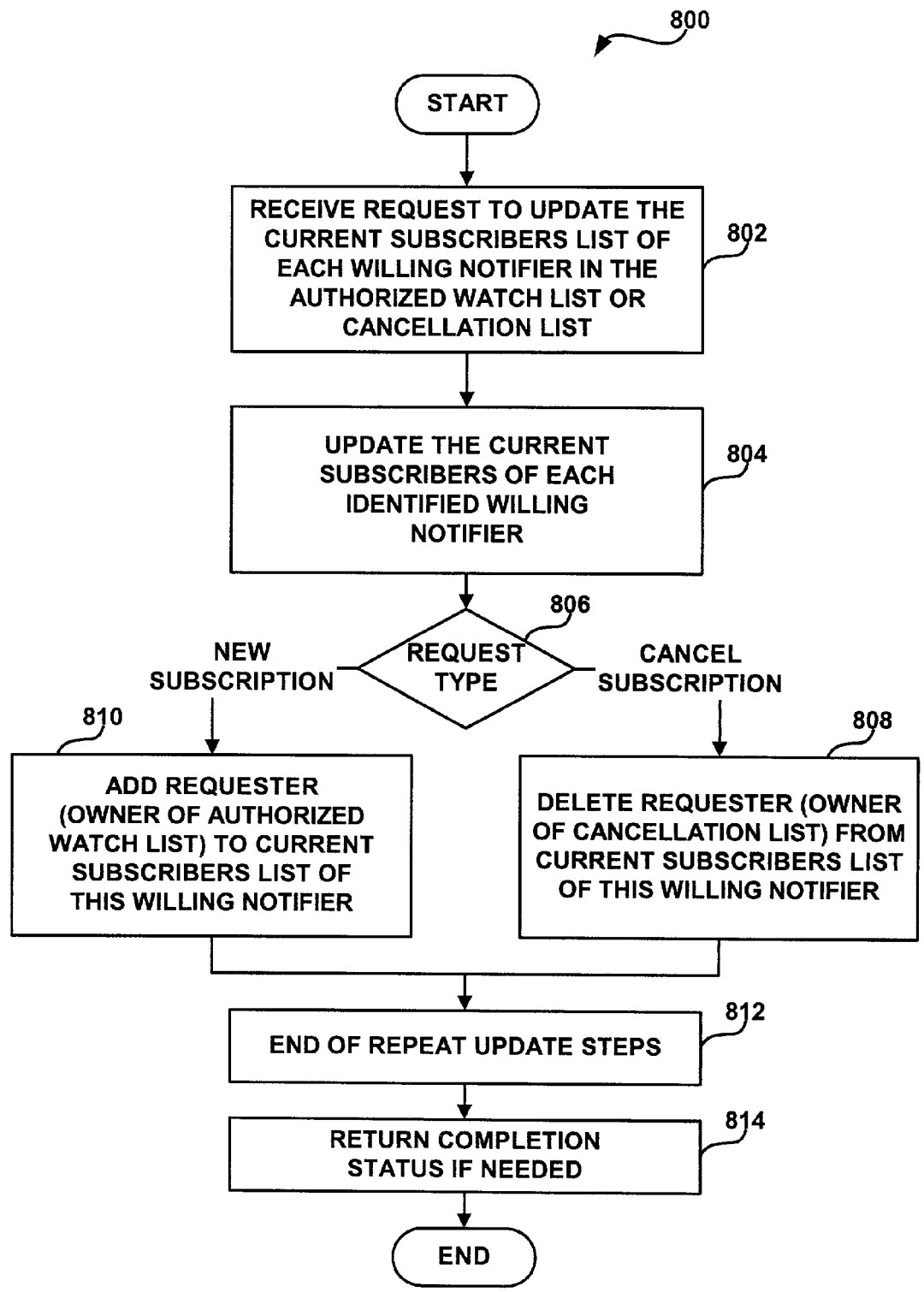
FIG. 8 is a flow chart illustrating a method for updating current subscriber list of willing notifiers according to an exemplary embodiment.

FIG. 8 is a flow chart illustrating a method 800 for updating current subscriber lists of willing notifiers. Specifically, the method 800 illustrates a detailed description for the step 612 in FIG. 6. According to one embodiment, the update actions may include adding a subscriber to a list or deleting a subscriber from a list. The list owner's corresponding authorized subscribers list may include conditions and restrictions that apply to specific subscribers.

At step 802, the centralized component of the presence services receives a request to update the current subscriber list of each willing notifier in the authorized watch list or a cancellation list. In one embodiment, the request may specify whether it is an addition request or a cancellation request. Further, the request may include an authorized watch list or a cancellation list of the requesting user. At step 804, the centralized presence component updates the current subscribers of each identified willing notifier. According to an exemplary embodiment, the update step is repeated for each willing notifier in the authorized watch list or the cancellation list.

At step 806, the centralized presence component determines a request type. If the request includes a cancellation subscription request, at step 808, the centralized presence component deletes the requester (an owner of the cancellation list) from current subscribers list of this willing notifier. Alternatively, if the centralized presence component determines that the request is an addition request to add the requester (an owner of the authorized watch list) to the current subscriber list of this willing notifier, at step 810, the centralized component adds the requester to the current subscriber list of this willing notifier. At step 812, the centralized presence component ends the update process, and, at step 814, it may return a completion status to the SIP proxy server of the user.

FIG. 9 is a flow chart illustrating a method 900 for updating local authorized dispatcher lists. According to an exemplary embodiment, this function is performed on the distributed component of the presence services. Specifically, the method 800 illustrates a detailed description of the step 516 in FIG. 5.

At step 902, the distributed component of the presence services, such as a SIP proxy server, receives a request to update authorized dispatcher lists. In one embodiment, the request may include a Presence ID, an update request type, the presence service requested, an authorized watch list, or a cancellation list. At step 904, the distributed component determines the request type. If the request is from a willing notifier, at step 906, the distributed presence component updates an authorized dispatchers list of the willing notifier, and the update step depends on the specific request. In one embodiment, the willing notifier may request removal or modification of privileges of a specified authorized dispatcher. Alternatively, the distributed component may delete the list because the willing notifier has gone offline. Different embodiments are possible as well.

At step 908, if the request is from a dispatcher, the distributed component of the presence services updates an authorized dispatcher list of each willing notifier in the authorized watch list or in the cancellation list of the requesting user. It should be understood that this step may be repeated for each willing notifier in the specified authorized watch list or the cancellation list. At step 910, the distributed component determines if the request is a cancellation request. If the request is not a cancellation request, at step 912, the distributed component determines if an authorized dispatchers list exists. If the authorized dispatchers list does not exist, at step 914, the distributed component creates a new authorized dispatchers list for this willing notifier including contact information of the notifier.

If the authorized dispatcher list exists (step 912), or if the request is the cancellation request (step 910), at step 916, the distributed component for presence services may add or delete user's Presence ID in this willing notifier's authorized dispatchers list. The Presence ID may be added for a new subscription or deleted for a cancelled subscription. If the Presence ID is added, the distributed component may include any service-related information and/or restrictions/conditions for adding. At step 918, the distributed component sends a completion status, and the method 900 terminates.

FIG. 10 is a flow chart illustrating a method 1000 for completing state change request on a centralized component of the presence services. Specifically, the method 1000 illustrates a detailed description for the step 520 in FIG. 5. At step 1002, the centralized component of the presence services receives an indication message that local actions associated with a state change have been completed. The indication message includes the Presence ID, presence service-related information, and an indicator that the state change has been completed. At step 1004, the centralized component updates user presence state data resources to indicate that the state has been change to a new state. In one embodiment, the centralized component may access an authorization server for a centrally-located copy of the data resource, and may change the state variable to a new state. At step 1006, the centralized component may return a completion status.

Figure 11A:
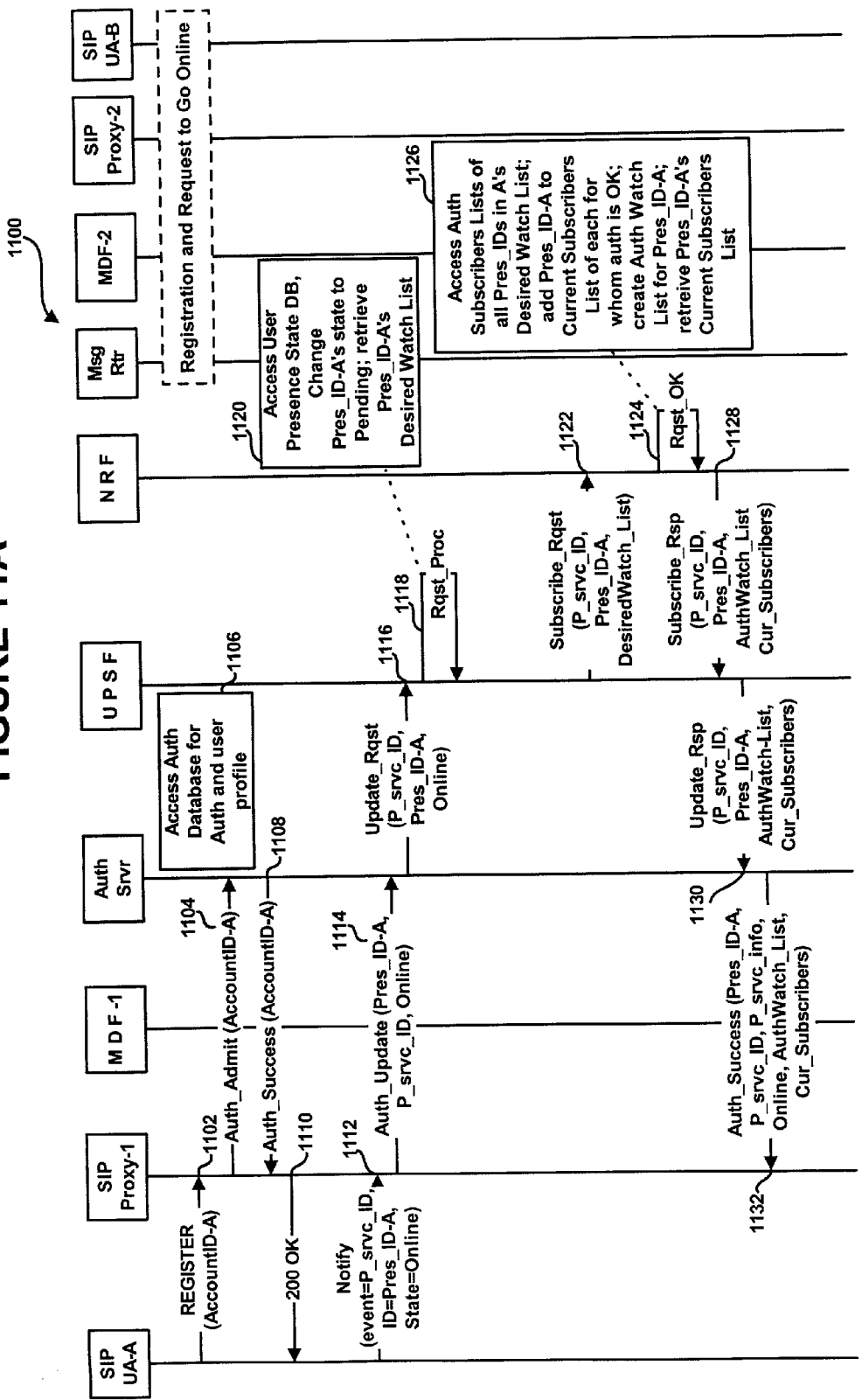
FIGS. 11A and 11B are a message flow illustrating a method for processing a user's request to register and go online according to an exemplary embodiment.
Figure 11B:
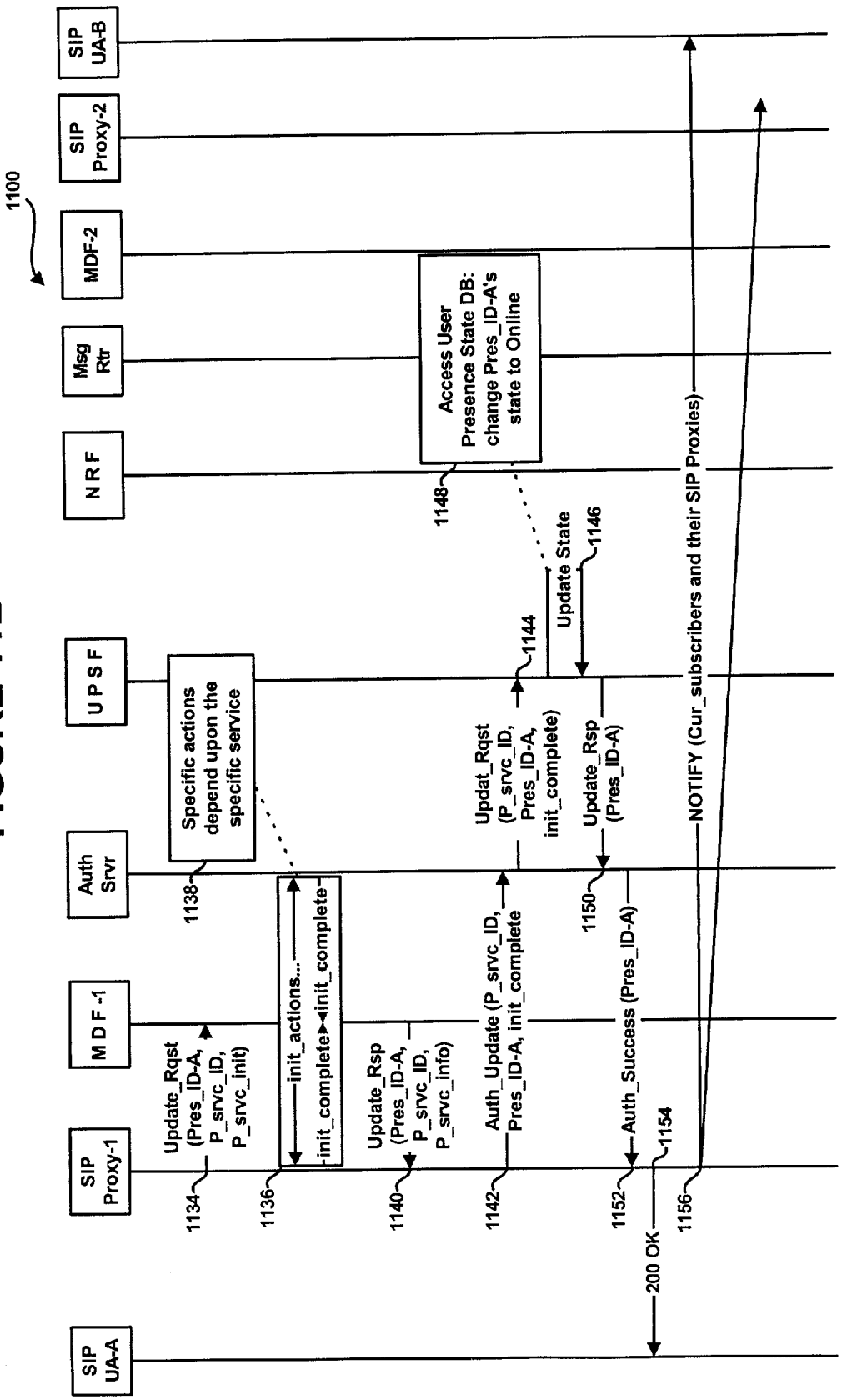

FIGS. 11A and 11B are a call flow 1100 illustrating a method for processing a user's request to register and go online. FIGS. 11A and 11B illustrate functional entities involved in the process. Specifically, FIGS. 11A and 11B illustrate a SIP user agent A ("SIP UA-A"), a SIP Proxy-1 server, a message dispatch facility-1 ("MDF-1") that may be located at the SIP Proxy-1, an authorization server ("Auth Srvr"), a user presence state facility ("UPSF"), and a notification request facility ("NRF").

Referring to FIG. 11A, as illustrated at 1102, the SIP UA-A sends to the SIP Proxy-1 a REGISTER request message including an Account ID-A associated with a user at a client device including the SIP UA-A. The SIP Proxy-1 then sends an Authorization Admit Request 1104 including the AccountID-A to the authorization server. The authorization server, as illustrated at 1106, may access a user profile in its authorization database to determine whether the user is authorized to access the presence services. At step 1108, the authorization server sends an Authorization Success message to the SIP Proxy-1 and specifies the Account ID-A in the response message. When the SIP Proxy-1 receives the authorization success message, the SIP Proxy-1 replies to the SIP UA-A with a 200 OK message 1110.

Next, the SIP UA-A sends a notification message (NOTIFY) 1112 to the SIP Proxy-1. It should be understood that before receiving any notification messages from the SIP UA-A, the SIP Proxy-1 has subscribed to the SIP UA-A so that it can recognize and process requests, such as NOTIFY, from the SIP UA-A. The notification message may specify an event, such as a presence service identifier (P_srvc_ID), a presence identifier of the user, such as a Pres_ID_A, and a state of the user, such as Online. When the SIP Proxy-1 receives the notification message, the SIP Proxy-1 sends to the authorization server an authorization update message 1114 (Auth_Update) including the Pres_ID_A, P_srvc_ID, and the online state. When the authorization server receives the request 1114, the authorization server may rely the update request to the UPSF, as illustrated at 1116. When the UPSF receives the request, the UPSF processes the request, as illustrated at 1118. In one embodiment illustrated at 1120, the UPSF may access a user presence state database, change the presence state identifier of the user to a pending state, and retrieve the Pres_ID_A's desired watch list. It should be understood that the desired watch list may be provided from the user.

Next, the UPSF sends a subscribe request message (Subscribe_Rqst) 1122 to the NRF. The subscribe request message includes the P_srvc_ID, Pres_ID-A, and the desired watch list. When the NRF receives the subscribe request, the NRF processes the request, as illustrated at 1124. Specifically, as illustrated at 1126, the NRF may access authorized subscriber lists of all Pres_ID-A's desired watch list, and may add Pres_ID-A to current subscribers list of each notifier for which the authorization is successful. Further, the NRF may create an authorized watch list for Pres_ID-A and may retrieve a Pres_ID-A's current subscriber list.

The NRF may then generate and send to the UPSF a subscribe response message ("Subscribe_Rsp) 1128. The subscribe response message includes the P_srvc_ID, the Pres_ID-A, the authorized watch list, and the Cur_Subscribers list. At step 1130, the UPSF provides an Update response message ("Update_Rsp") 1130 to the authorization server. The Update_Rsp message 1130 includes parameters provided in the Subscribe_Rsp message 1128. When the authorization server receives the Update_Rsp 1130, the authorization server sends an authorization success message 1132 ("Auth_Success") to the SIP Proxy-1. The Auth_Success message 1132 includes Pres_ID_A, P_srvc_ID, P_srvc_info, the online status, the authorization watch list, and identifies current subscribers. Next, the SIP Proxy-1 provides to the MDF an update request ("Update_Rqst") 1134 including the Pres_ID_A, the P_srvc_ID, the P_srvc_init parameters. At step 1136, the MDF may perform initialization actions that may depend upon a specific service.

Upon completion of the initialization process, the MDF provides to the SIP Proxy-1 an update response message 1140 ("Update_Rsp") including the Pres_ID_A, P_srvc_ID, and presence service information ("P_srvc_info"). Responsively, the SIP Proxy-1 sends to the authorization message an authorization update message 1142 ("Auth_Update") including the P_srvc_ID, the Pres_ID_A, and an initialization completion parameter ("init_complete"). When the authorization server receives the message 1142, the authorization server relies the message to the UPSF, as illustrated at 1144, and the UPSF updates the state of the Pres_ID-A at step 1146. The UPSF may access the user presence state database and change the state of the Pres_ID-A to online, as illustrated at 1148. Next, the UPSF may provide to the authorization server an update response message 1150 including the Pres_ID-A.

At step 1152, the authorization server sends to the SIP Proxy-1 an authorization success message including the Pres_ID-A, and the SIP Proxy-1 sends a 200 OK message to the SIP UA-A, as illustrated at 1154. Next, the SIP Proxy-1 sends notification messages ("NOTIFY") to the current subscribers of the Pres_ID-A and their respective SIP Proxies.

User Request to Change a Presence State

The request to change a presence state is a generalization of the request to go online. The request to go online illustrates one case of specific actions, which are part of the request to change the presence state. It should be understood that different specific actions may be associated with different state change requests, and the examples provided below should not be viewed as limiting to any specific embodiment.

Figure 12:
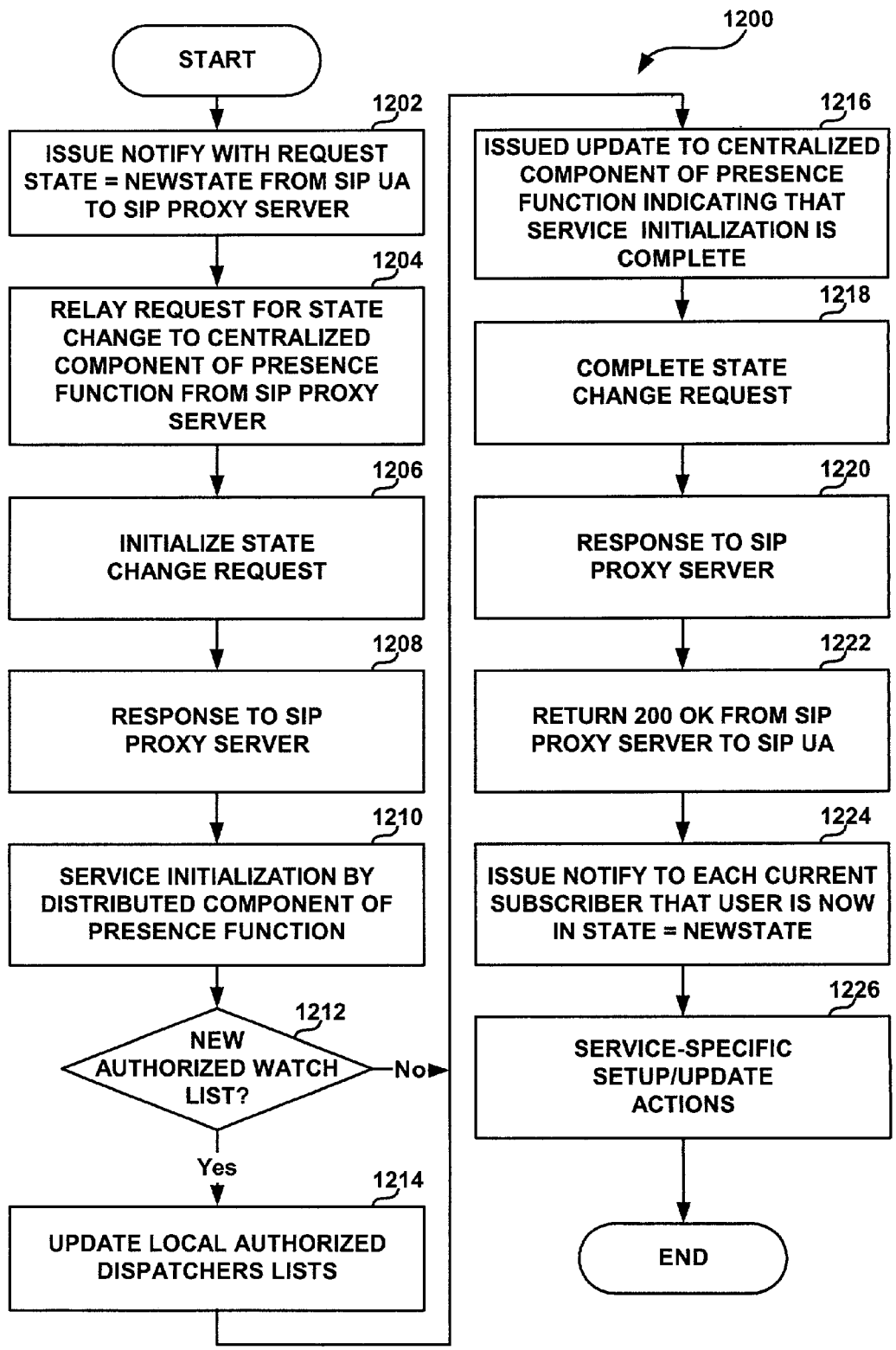
FIG. 12 is a flow chart illustrating a method for changing a presence state of a user according to an exemplary embodiment.

FIG. 12 is a flow chart illustrating a method 1200 for changing a presence state of a user. At step 1202, the SIP UA generates and sends to its SIP proxy server a notification request message ("NOTIFY") including a request to change the state to a new state. For example, the state change request may include a request to change a state from online to offline. The notification request message may define a Presence ID of a user, the presence service requested, and may specify a new state. Additionally, the state change request may include a desired watch list.

At step 1204, when the SIP proxy server receives the request, the SIP proxy server relays the request for state change to the centralized component of the presence services. In one embodiment, the request may be relayed via the authorization server using the 3Q protocol, for instance. At step 1206, the centralized component of the presence service initializes the state change request. The process of initialization the state change request may include methods that have been described in reference to FIGS. 6, 7, and 8. However, it should be understood that different embodiments are possible as well.

At step 1208, the centralized component of the presence services generates and sends a response to the SIP proxy server. In one embodiment, the response may be sent via the authorization server using the 3Q protocol, for instance. Further, the response may include the Presence ID, a current subscriber list for the Presence ID, service related information, and an authorized watch list. At step 1210, a distributed component of the presence services initializes the requested services. Next, at step 1212, the distributed presence function may determine if the response includes a new authorized watch list. If the new authorized list is included, the distributed component of the presence services updates local authorized dispatchers lists associated with the Presence ID, and the method 1200 continues at step 1216.

At step 1216, the SIP proxy server generates and sends to the centralized components of the presence services an update message including a parameter indicating that the service initialization has been completed. The update message may also include the Presence ID and service-related information.

At step 1218, the centralized component of the presence services performs a process of completing the state change request, the embodiment of which has been described in reference to FIG. 10. At step 1220, the centralized component of the presence services sends a response message to the SIP proxy server. The response may be sent via the authorization server using the 3Q protocol and may include the Presence ID. At step 1222, the SIP proxy server sends to the SIP user agent a 200 OK message including the Presence ID and the authorized watch list. Next, at step 1224, the SIP proxy server may generate and send to each current subscriber a notification message specifying the new state of the user. Additionally, the SIP proxy server may send the notification message to SIP proxy servers associated with the current subscribers. The notification messages include the Subscriber ID, the new state, and service related information. At step 1226, the SIP user agent may perform any service-specific setup and update processes, and the method 1200 terminates.

Figure 13A:
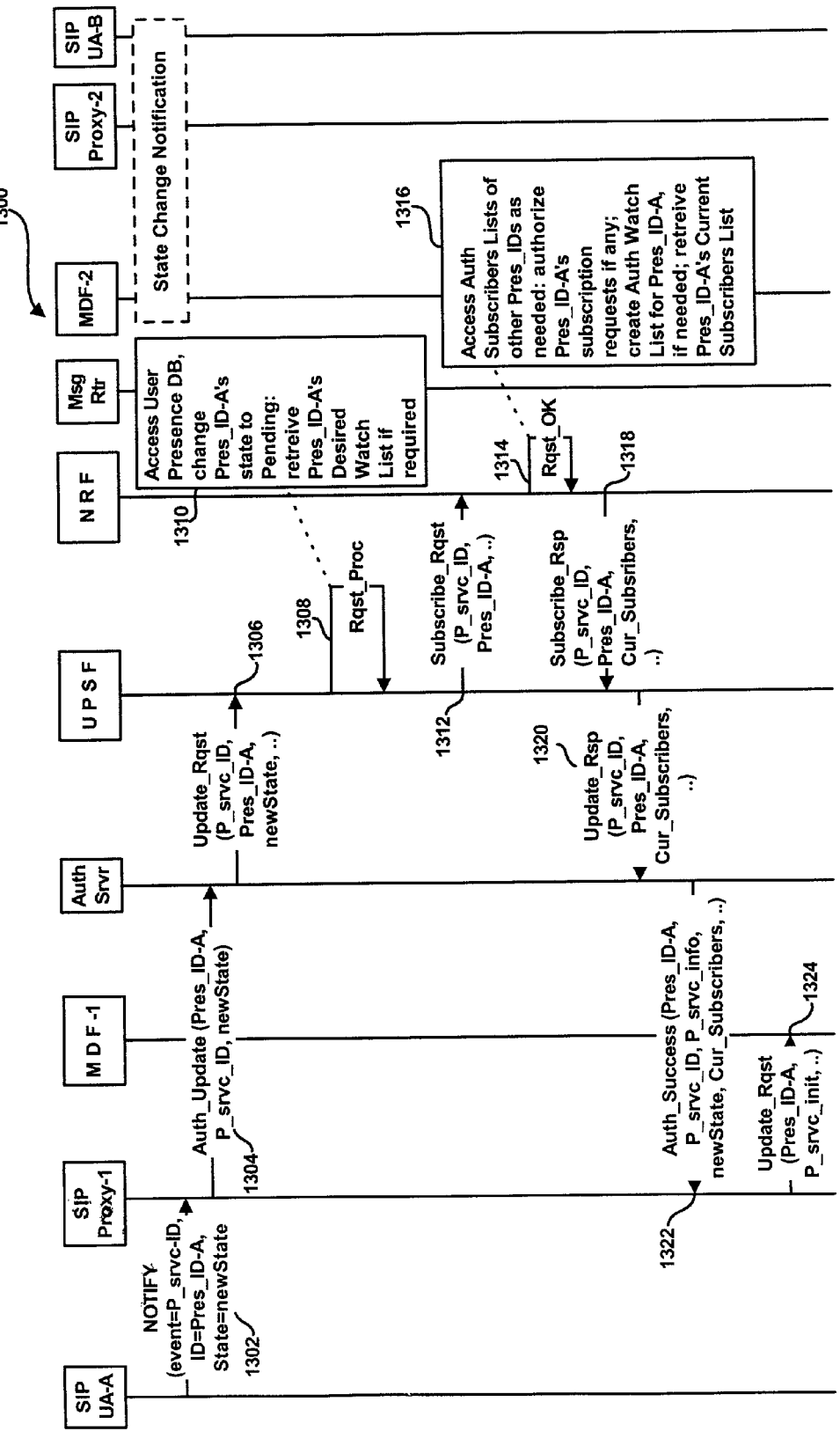
FIGS. 13A, 13B, and 13C are a message flow illustrating a method for processing a user's request to change a user's presence state according to an exemplary embodiment.
Figure 13B:
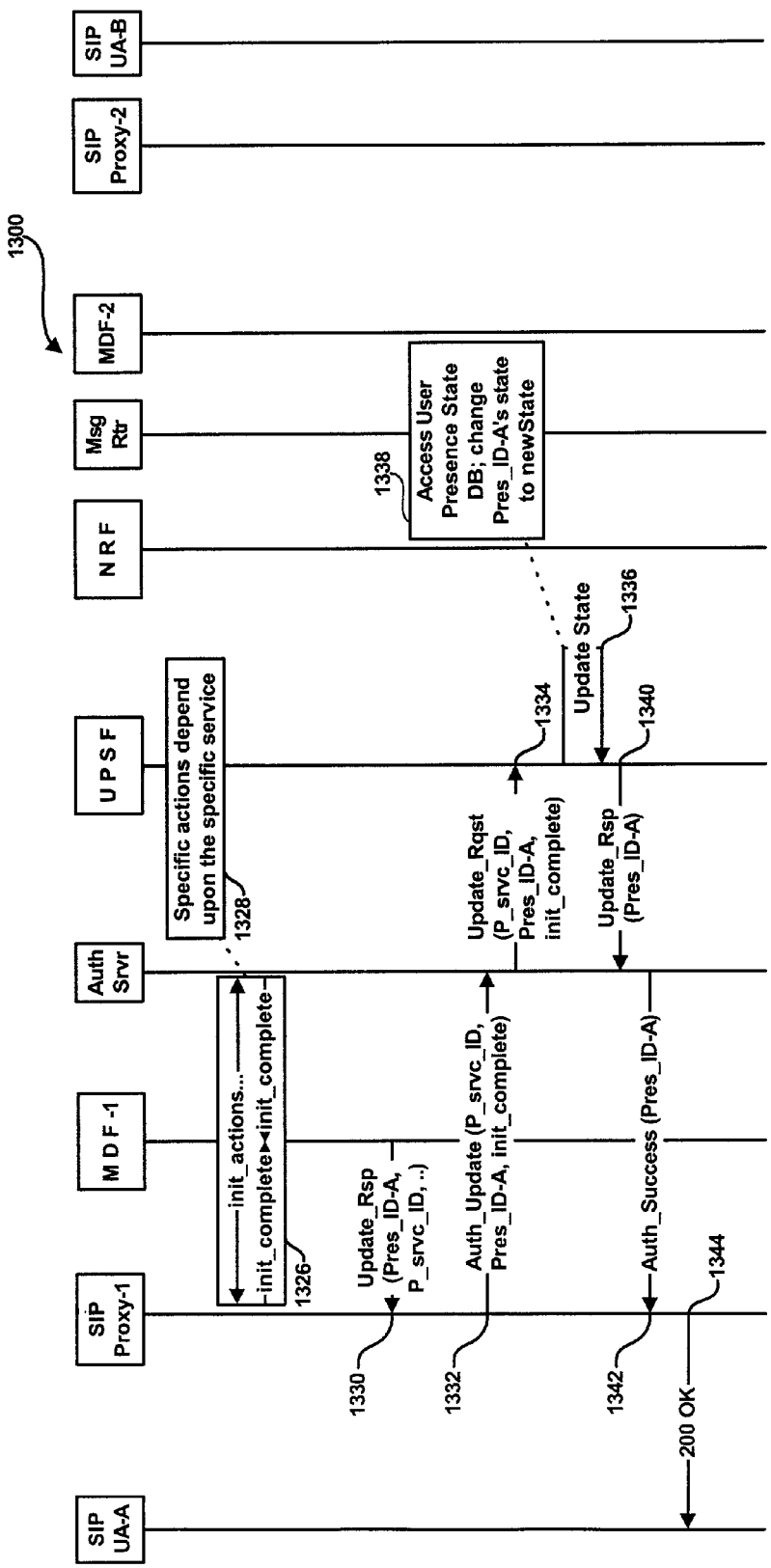

FIGS. 13A and 13B are a message flow 1300 illustrating a method for requesting a state change for a user at a client device. The message flow 1300 will be described in reference to the SIP UA-A, the SIP Proxy-1, the MDF, the authorization server, the UPSF, and the NRF.

The SIP UA-A sends a notification message (NOTIFY) 1302 to the SIP Proxy-1. The notification message may specify an event, such as a presence service identifier (P_srvc_ID), a presence identifier of the user, such as a Pres_ID_A, and a new state. When the SIP Proxy-1 receives the notification message, the SIP Proxy-1 sends to the authorization server an authorization update message 1304 (Auth_Update)

including the Pres_ID_A, P_srvc_ID, and the new state requested from the SIP UA-A. When the authorization server receives the request 1304, the authorization server may rely the update request to the UPSF, as illustrated at 1306. When the UPSF receives the request, the UPSF processes the request, as illustrated at 1308. In one embodiment illustrated at 1310, the UPSF may access a user presence state database, change the presence state identifier of the user to a pending state, and retrieve the Pres_ID_A's desired watch list.

Next, the UPSF sends a subscribe request message (Subscribe_Rqst) 1312 to the NRF. The subscribe request message includes the P_srvc_ID, Pres_ID-A, and the desired watch list. When the NRF receives the subscribe request, the NRF processes the request, as illustrated at 1314. Specifically, as illustrated at 1316, the NRF may access authorized subscriber lists of all notifiers in the Pres_ID-A's desired watch list, and may add Pres_ID-A to current subscribers list of each notifier for which the authorization is successful. Further, the NRF may create an authorized watch list for Pres_ID-A and may retrieve a Pres_ID-A's current subscriber list.

The NRF may then generate and send to the UPSF a subscribe response message ("Subscribe_Rsp") 1318. The subscribe response message includes P_srvc_ID, the Pres_ID-A, the authorized watch list, and the Cur_Subscribers list. At step 1320, the UPSF provides an Update response message ("Update_Rsp") to the authorization server. The Update_Rsp message 1320 includes parameters provided in the Subscribe_Rsp message 1318. When the authorization server receives the Update_Rsp 1320, the authorization server sends an authorization success message 1322 ("Auth_Success") to the SIP Proxy-1. The Auth_Success message 1322 includes Pres_ID_A, P_srvc_ID, P_srvc_info, the online status, the authorization watch list, and identifies current subscribers. Next, the SIP Proxy-1 provides to the MDF an update request ("Update_Rqst") 1324 including the Pres_ID_A, the P_srvc_ID, the P_srvc_init parameters. At step 1326, the MDF may perform initialization actions that may depend upon the specific service, and the specific actions may depend upon a specific service, as illustrated at 1328.

Upon completion of the initialization process, the MDF provides to the SIP Proxy-1 an update response message 1330 ("Update_Rsp") including the Pres_ID_A, P_srvc_ID, and presence service information ("P_srvc_info"). Responsively, the SIP Proxy-1 sends to the authorization message an authorization update message 1332 ("Auth_Update") including the P_srvc_ID, the Pres_ID_A, and an initialization completion parameter ("init_complete"). When the authorization server receives the message 1332, the authorization server relies the message to the UPSF, as illustrated at 1334, and the UPSF updates the state of the Pres_ID-A at step 1336. The UPSF may access the user presence state database and change the state of the Pres_ID-A to the new state, as illustrated at 1338. Next, the UPSF may provide to the authorization server an update response message 1340 including the Pres_ID-A.

Figure 13C:
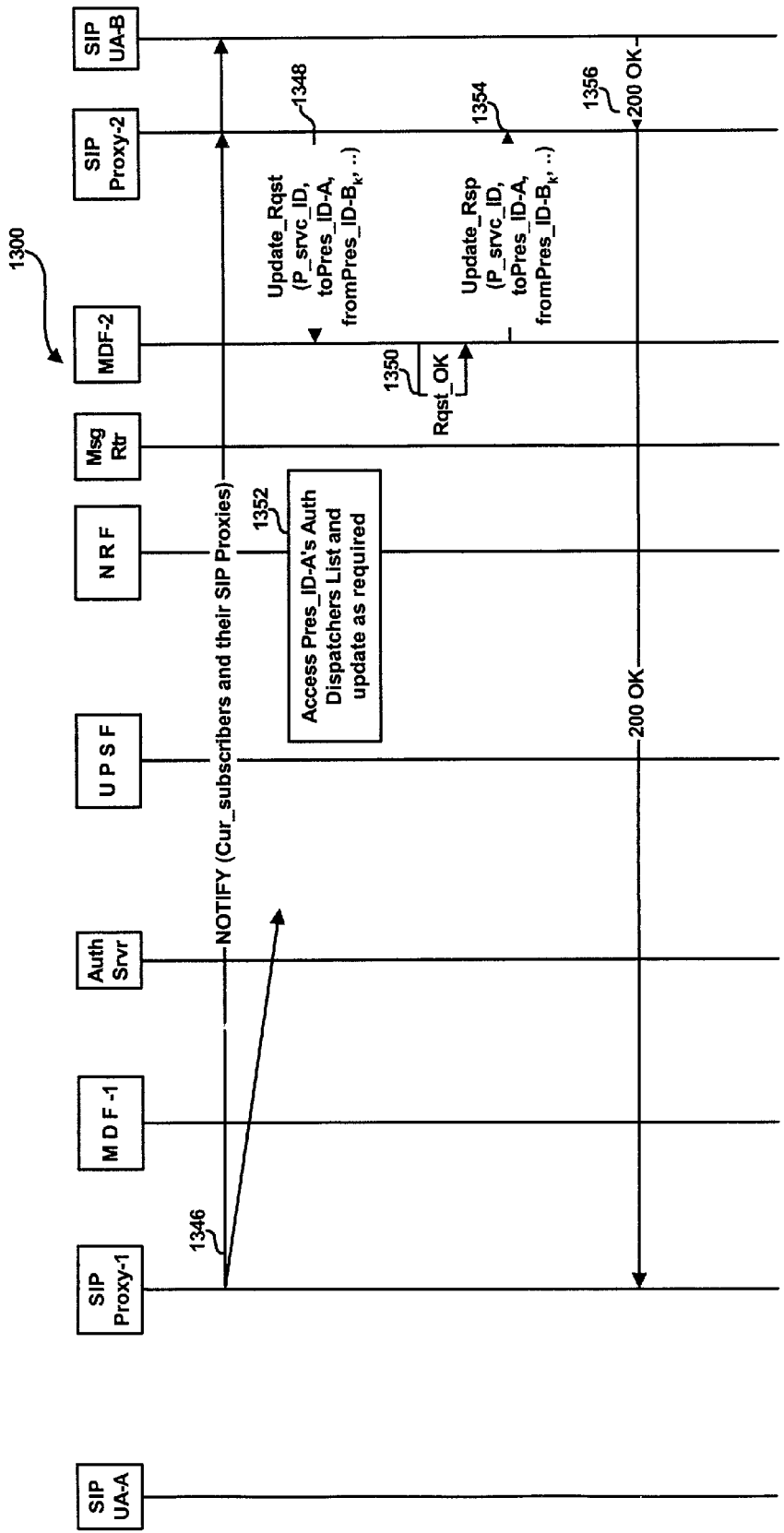

At step 1342, the authorization server sends to the SIP Proxy-1 an authorization success message including the Pres_ID-A, and the SIP Proxy-1 sends a 200 OK message to the SIP UA-A, as illustrated at 1344. Next, the SIP Proxy-1 sends notification messages ("NOTIFY") to the current subscribers of the Pres_ID-A and their respective SIP Proxies, as illustrated at 1346. When one of the current subscriber's SIP proxies such as a SIP Proxy 2 illustrated in FIG. 13 receives the notification message from the SIP Proxy 1, the SIP Proxy 2 sends an update request message 1348 to its MDF, such as an MDF 2 illustrated in FIG. 13. The update request message, among other parameters, includes P_srv_ID, Pres_ID-A, and an indication that the update request is from the Pres_ID-B.

At step 1350, the MDF-2 processes the request, and, specifically, as illustrated at 1352, accesses the Pres_ID-A's authorized dispatcher's list and updates the list as required. At step 1354, the MDF 2 sends an update response to the SIP Proxy 2 including the Pres_srvc_ID, the Pres_ID-A, and the Pres_ID-B. The message flow 1300 may terminate with the SIP UA-B sending a 200 OK message to the SIP Proxy 2 and to the SIP Proxy 1.

Figure 14:
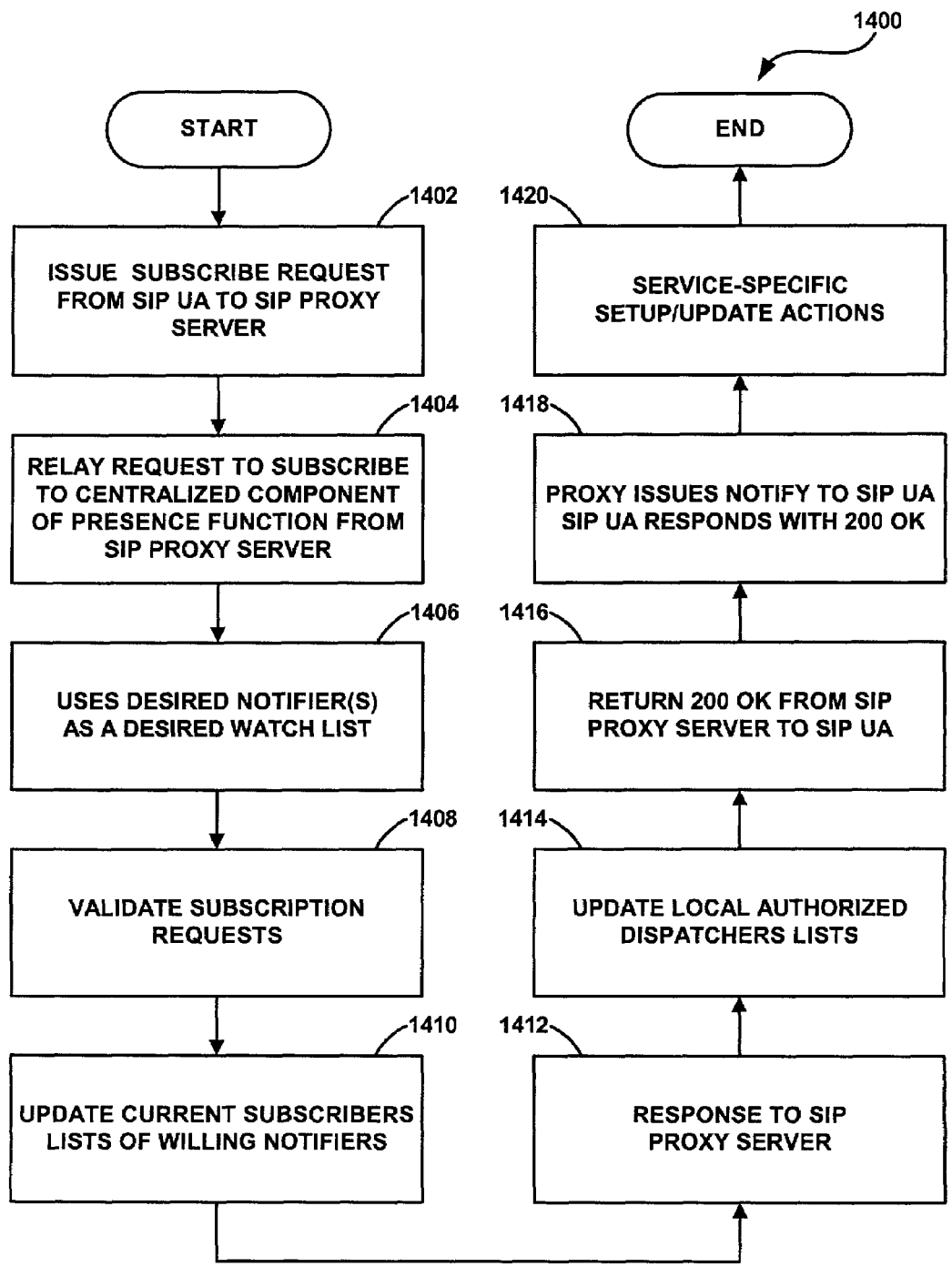
FIG. 14 is a flow chart illustrating a method for subscribing to a presence entity as a watcher according to an exemplary embodiment.

FIG. 14 is a flow chart illustrating a method 1400 for subscribing to a presence entity as a watcher.

At step 1402, a SIP UA generates and sends to a SIP proxy server a subscription request including a requester's Presence ID, a desired notifier's Presence ID (or notifiers' IDs), and a requested presence service. At step 1404, the SIP proxy server relays the request to a centralized component of presence services. In one embodiment, the SIP proxy server may relay the request via an authorization server using the 3Q protocol, for instance. The relayed request includes the data received in the original request. At step 1406, the centralized component of the presence services uses the received desired notifier's Presence IDs to generate a desired watch list. It should be understood the SIP UA or the SIP proxy server may also create a desired watch list using the desired notifiers' information provided by the user.

At step 1408, the centralized component of the presence services validates the subscription request, the method of which has been described in reference to FIG. 7. At step 1410, the centralized component of the presence services updates current subscribers lists of willing notifiers, the method of which has been described in reference to FIG. 8. At step 1412, the centralized component of the presence services generates and sends to the SIP proxy server a response message including the Presence ID of the requester, an authorized watch list, and service-related information.

At step 1414, a distributed component of the presence services updates authorized local dispatchers lists, the method of which has been described in reference to FIG. 9. At step 1416, the SIP proxy server sends to the SIP UA a 200 OK message including the Presence ID of the requester, and the authorized watch list. At step 1418, the SIP proxy server sends a notification message (NOTIFY) to the SIP UA, and the SIP UA responds with a 200 OK message. At step 1420, the SIP UA may perform service-specific setup/update actions, and the method 1400 terminates.

Figure 15:
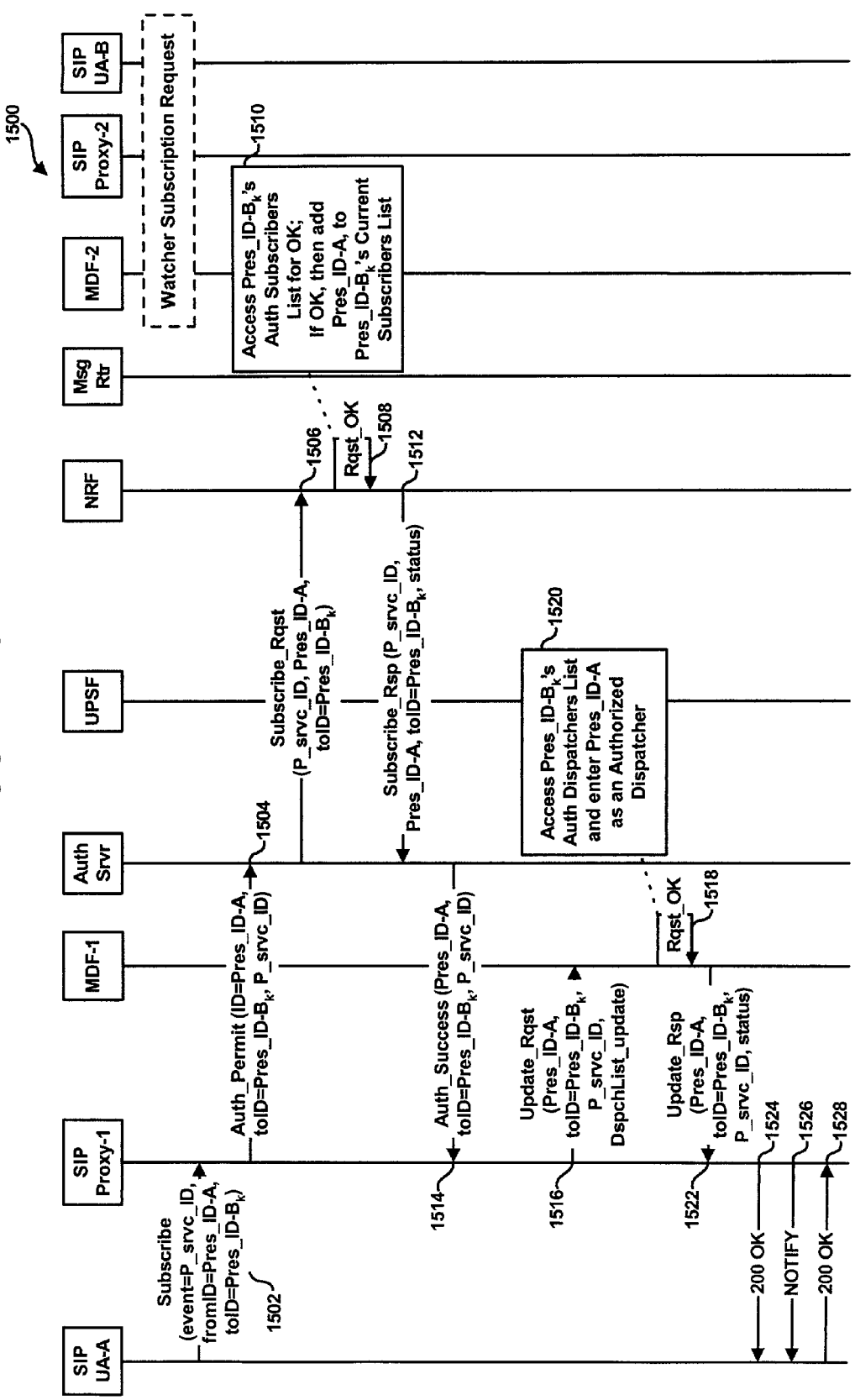
FIG. 15 is message flow illustrating a method for subscribing to a presence entity as a watcher according to an exemplary embodiment.

FIG. 15 is a message flow 1500 illustrating a method for subscribing to a presence entity as a watcher. The message flow 1500 will be described in reference to the SIP UA-A, the SIP Proxy-1, MDF-1, the authorization server ("Auth srvr"), the UPSF, and the NRF.

The SIP UA-A sends a subscription request message 1502 ("SUBSCRIBE") to the SIP Proxy-1. The subscription request message 1502 identifies the requested service, and a desired notifier's ID (Pres_ID-B). The SIP Proxy-1 sends an authorization permission request message 1504 ("Auth_Permit") to the authorization server. The authorization message 1504 includes the presence identifier of the requester (Pres_ID-A), the presence identifier of the desired notifier (Pres_ID-B), and the presence service identifier ("P_srvc_ID").

When the authorization server receives the request, the authorization server sends a subscription request message 1506 ("Subscribe_Rqst") to the NRF. The subscription request message 1506 includes the presence service ID, the Pres_ID-A, and the Pres_ID-B. At step 1508, the NRF processes the request. Specifically, as illustrated in 1510, the NRF may access the Pres_ID-B's authorized subscribers list to determine if the Pres_ID-A is specified in that list. If so, the NRF adds the Pres_ID-A to the Pres_ID-B's current subscribers list.

At step 1512, the NRF generates and communicates to the authorization server a subscription response message 1512 ("Subscribe_Rsp") including the P_srvc_ID, the Pres_ID-A, the Pres_ID-B, and a status of the request. In this example, the status may specify that the Pres_ID-A has been added to the current subscriber's list of the Pres_ID-B. The authorization server then sends an authorization response message 1514 ("Auth_Success") to the SIP Proxy-1. When the SIP Proxy 1 receives the successful authorization response message, the SIP Proxy-1 sends to the MDF-1 an update request message 1516 ("Update_Rqst") including the Pres_ID-A, the Pres_ID-B, and a dispatch list update request. When the MDF-1 receives the request, the MDF processes the request at step 1518. Specifically, as illustrated at 1520, the MDF-1 may first determine if an authorized dispatchers list exists for the Pres_ID-B, and, if so, the MDF-1 adds the Pres_ID-A to the Pres_ID-B's authorized dispatchers list. The MDF-1 then sends to the SIP Proxy-1 an update response message 1522 ("Update_Rsp") including the Pres_ID-A, the Pres_ID-B, and an update status. In this example, the update status may include a successful update parameter. Next, the SIP Proxy-1 sends a 200 OK message 1524 to the SIP UA-A. Additionally, the SIP Proxy-1 sends a notification message 1526 ("NOTIFY") to the SIP UA-A, and the SIP UA-A replies with a 200 OK message 1528.

User Request to Subscribe as a Solicitor

According to an exemplary embodiment, a user may request to subscribe as a solicitor in order to be immediately notified by the presence system of the current state of a presence entity specified by the user requesting that type of subscription. It should be understood that a watcher request may be part of a solicitor request; however, such a request will be authorized by a desired notifier. As described above, the authorization may be either maintained in the desired notifier's authorized subscribers list or obtained dynamically by querying a desired notifier at the time when the subscription request is made.

Figure 16:
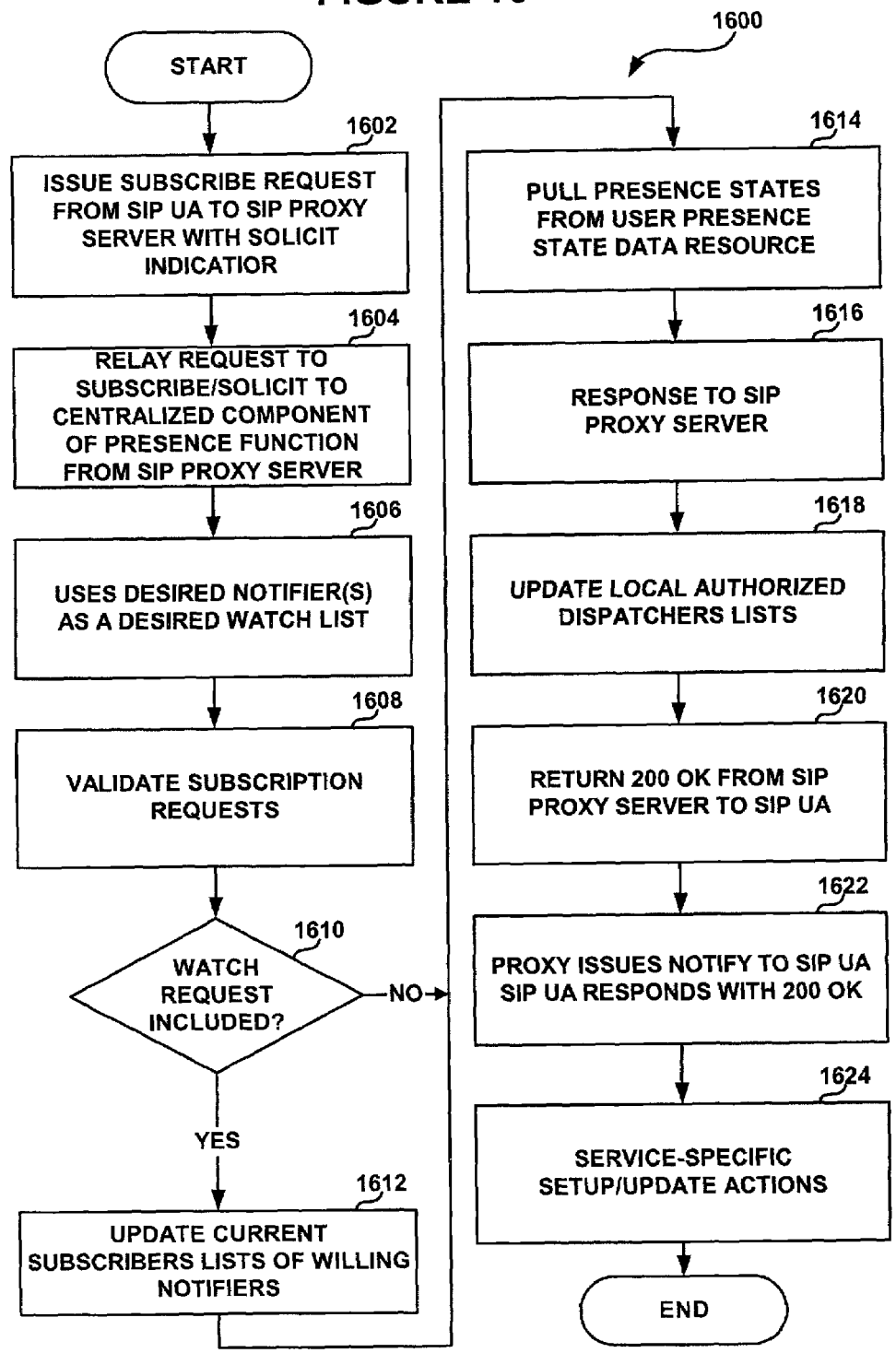
FIG. 16 is a flow chart illustrating a method for subscribing to a presence entity as a solicitor according to an exemplary embodiment.

FIG. 16 is a flow chart illustrating a method 1600 for subscribing to a presence entity as a solicitor.

At step 1602, a SIP UA generates and sends to a SIP Proxy server a subscription request including the requester's Presence ID, a desired notifier's Presence ID (or multiple notifiers' Presence IDs), and a request type indicating a solicitation request. Additionally, the subscription request may include a watch request. At step 1604, the SIP proxy server relays the request to the centralized component of the presence services. According to an exemplary embodiment, the request may be relayed via an authorization server using the 3Q protocol, for example, and the relayed request includes all parameters specified in the original subscription request.

At step 1606, when the centralized component of the presence services receives the request, the centralized component uses desired notifiers as a desired watch list. It should be understood that formatting of desired notifiers as a desired watch list may be also done on the SIP UA or the SIP Proxy. Next, at step 1608, the centralized component of the presence services validates subscription requests, the method of which has been described in reference to FIG. 7. At step 1610, the centralized component determines if the received request includes a watch request. If the request includes the watch request, at step 1612, the centralized component updates current subscribers lists of willing notifiers, the method of which has been described in reference to FIG. 8.

At step 1614, the centralized component of the presence services retrieves presence states from user presence data resources associated with the desired notifiers, the method of which will be described in greater detail below in reference to a flow chart in FIG. 17. At step 1616, the centralized component of the presence services sends a response message to the SIP proxy server. In one embodiment, the response may be sent via the authorization server using the 3Q protocol, for instance. Further, the response may include the Presence ID, the requested presence states, an authorized watch list, and service-related information.

At step 1618, a distributed component of the presence services updates local authorized dispatchers lists, the method of which has been described in reference to FIG. 9. At step 1620, the SIP proxy server sends a 200 OK message to the SIP UA, and the 200 OK message includes the Presence ID of the requester, the requested presence states, and the authorized watch list (if requested). At step 1622, the SIP proxy server sends a notification message ("NOTIFY") to the SIP UA, and the SIP UA responds with a 200 OK message. At step 1624, the SIP UA may perform service-specific setup and update actions, and the method 1600 terminates.

Figure 17:
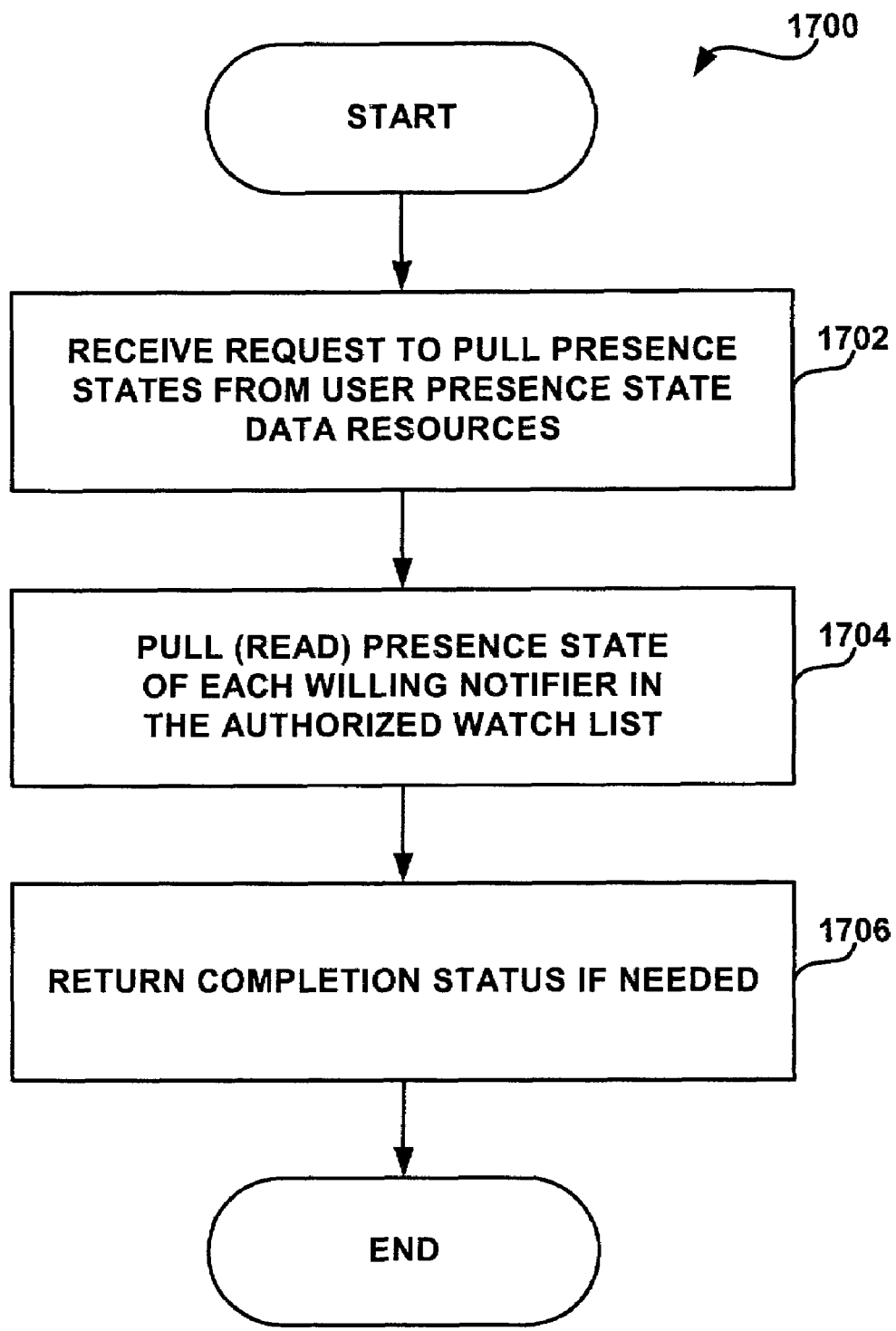
FIG. 17 is a flow chart illustrating a method for retrieving presence state information from user presence state resources according to an exemplary embodiment.

FIG. 17 is a flow chart illustrating a method 1700 for retrieving presence states from user presence state data resources by a centralized component of the presence services. Specifically, the method 1700 illustrates a detailed description for the step 1614 in FIG. 16.

At step 1702, the centralized component of the presence services receives a request to retrieve presence states form user presence state data resources, and the request includes an authorized watch list specified by a requesting user. At step 1704, the centralized component retrieves presence state of each willing notifier in the authorized watch list. Further, the centralized component may repeat update steps for each willing notifier in the authorized watch list. At step 1706, the centralized component returns a completion status, if such a status is required, and the method 1700 terminates.

Figure 18A:
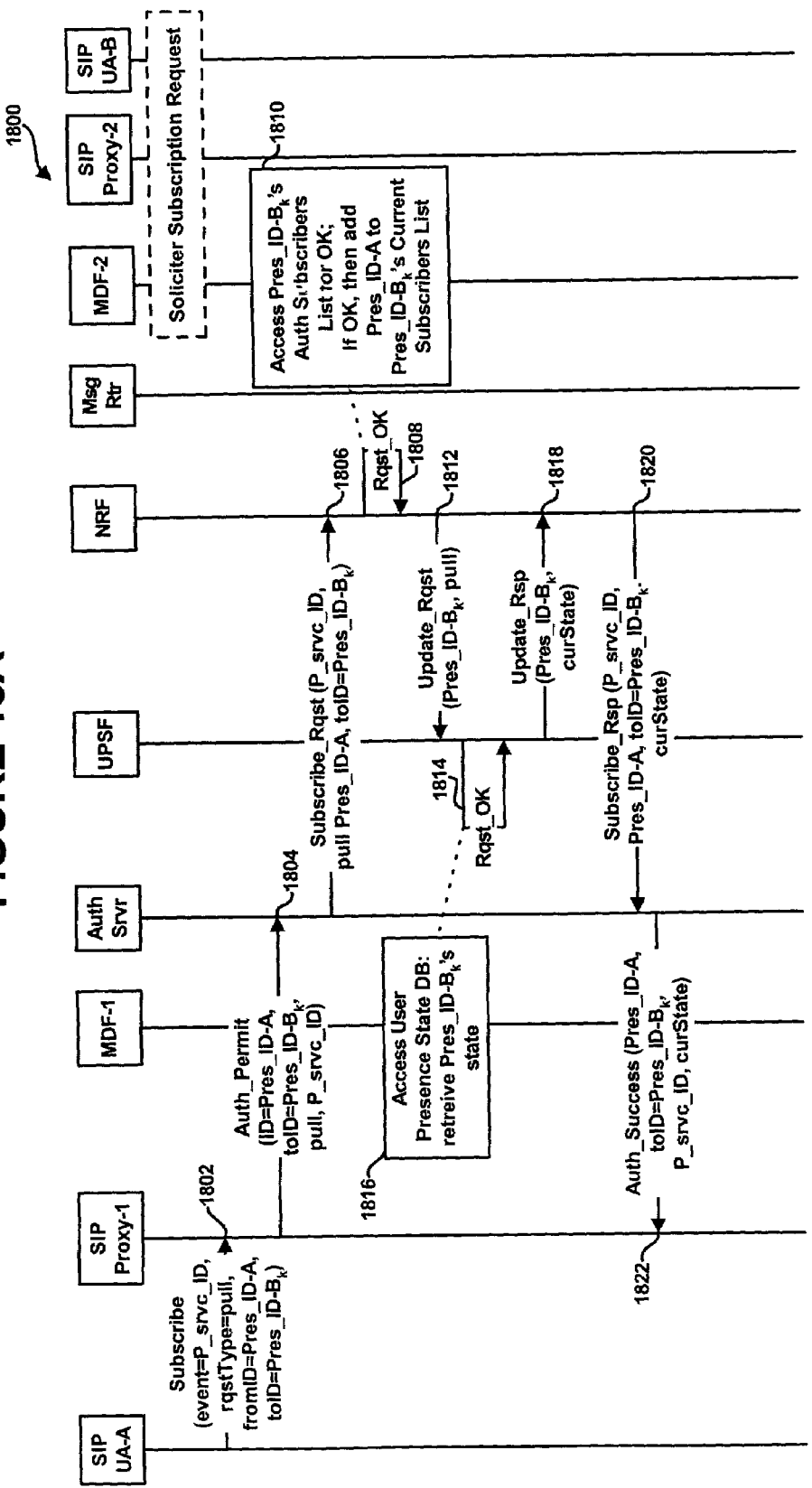
FIGS. 18A and 18B are a message flow illustrating a method for subscribing to a presence service entity as a solicitor according to an exemplary embodiment.
Figure 18B:
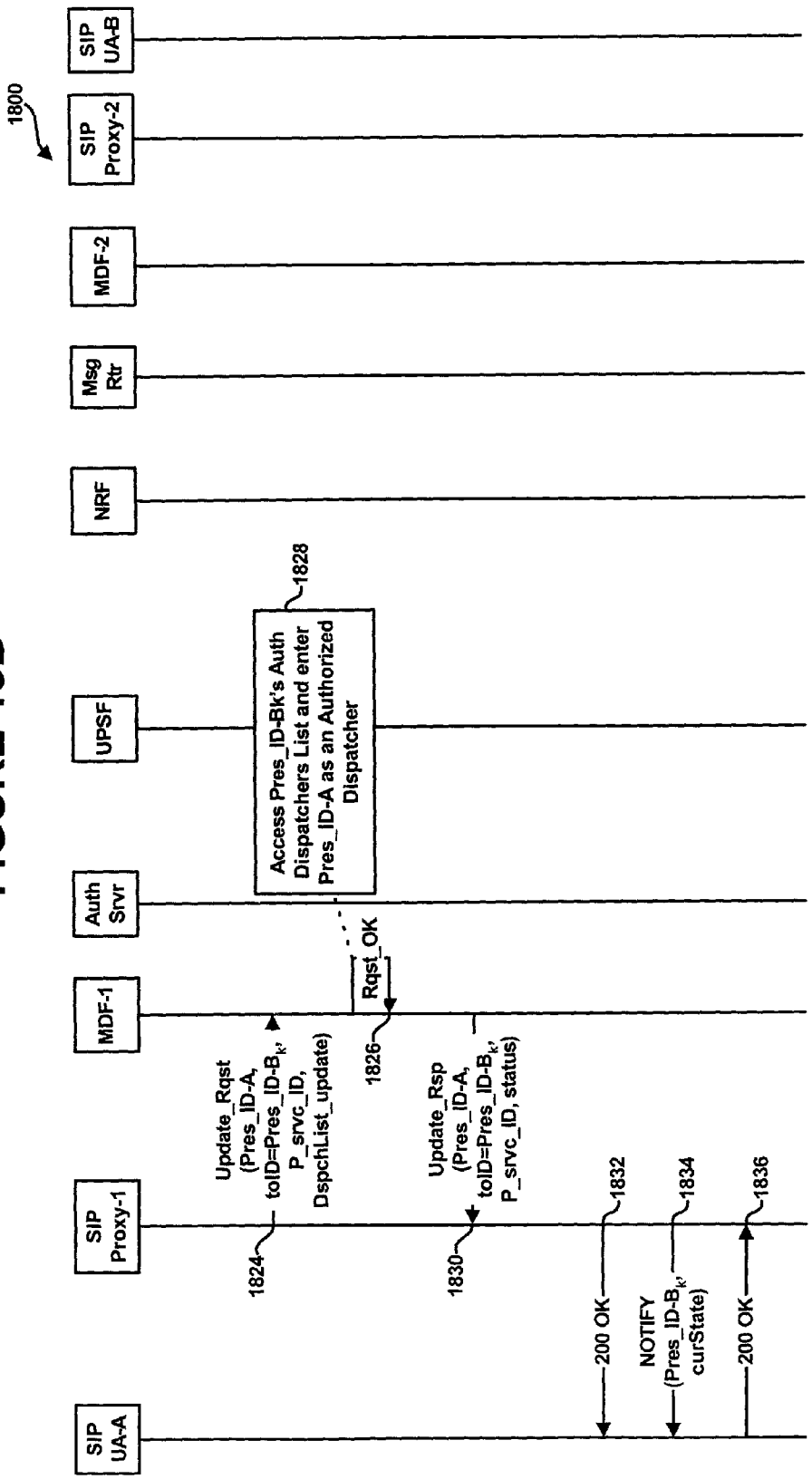

FIGS. 18A and 18B are a message flow 1800 illustrating a method for subscribing to a presence service as a solicitor. The message flow 1800 will be described in reference to the following entities: the SIP UA-A, the SIP Proxy-1, the MDF-1, the authorization server ("Auth Srvr"), the UPSF, and the NRF. However, it should be understood that the exemplary message flow is not limited to these entities, and it could also be used in reference to different or equivalent entities.

Referring to the message flow 1800, the SIP UA-A sends a subscription request message 1802 ("SUBSCRIBE") to the SIP Proxy-1, and the subscription request message includes a presence service identifier ("P_srvc_ID"), a request type set to pull presence state, the requester's presence identifier ("Pres_ID-A"), and an identifier of one or more desired notifiers' identifiers ("Pres_ID-B", in this example). When the SIP Proxy-1 receives the request, the SIP Proxy-1 generates and sends to the authorization server an authorization permission request message 1804 ("Auth_Permit") including the information received in the subscription request 1802.

Next, the authorization server relies the request to the NRF in a subscription request message 1806 ("Subscribe_Rqst"). When the NRF receives the request, the NRF processes the request, as illustrated in 1808. Specifically, as illustrated at 1810, the NRF may first access Pres_ID-B's authorized subscribers list to determine if the Pres_ID-A is specified in the list. If the Pres_ID-A is specified in the list, the NRF may add the Pres_ID-A to the Pres_ID-B's current subscribers list. Next, the NRF sends an update request message 1812 ("Update_Rqst") to the UPSF. The update request message 1812 includes the Pres_ID-B and the request type, which in this example is a pull request type. When the UPSF receives the request, the UPSF processes the request, as illustrated at 1814. Specifically, the UPSF accesses user presence state data resources and retrieves the state of the Pres_ID-B, as illustrated at 1816. Next, the UPSF generates and sends to the NRF an update response message 1818 ("Update_Rsp") including the Pres_ID-B and the current state of the Pres_ID-B.

Responsive to receiving the update response message 1818, the NRF sends to the authorization server a subscribe response message 1820 ("Subscribe_Rsp") including the P_srvc_ID, Pres_ID-A, Pres_ID-B, and the current state of the Pres_ID-B. The authorization server then sends an authorization success message 1822 ("Auth_Success") to the SIP Proxy-1. The authorization success message 1822, among other parameters, includes the Pres_ID-A, the Pres_ID-B, P_srvc_ID, and the current state information for the Pres_ID-B. When the SIP Proxy-1 receives the message 1822, the SIP Proxy-1 sends an update request message 1824 to the MDF-1. The update request message 1824 includes the Pres_ID-A, the Pres_ID-B, P_srvc_ID, and an update dispatch list request. The MDF-1 may then process the request as illustrated at 1826. To do that, the MDF-1 may access the Pres_ID-B's authorized dispatchers list and enter the Pres_ID-A as an authorized dispatcher. Next, the MDF-1 sends an update response message 1830 ("Update_Rsp") to the SIP Proxy-1. The update response message 1830 includes the Pres_ID-A, the Pres_ID-B, the P_srvc_ID, and the status of the update.

When the SIP Proxy-1 receives the update response 1830, the SIP Proxy-1 sends a 200 OK message 1832 to the SIP UA-A. Additionally, the SIP Proxy-1 sends a notification message 1834 ("NOTIFY") including the Pres_ID-B and its current state information. The SIP UA-A may respond with a 200 OK message 1836 upon receipt of the notification message 1834, and the message flow 1800 terminates.

User Request to Dispatch a Message

According to an exemplary embodiment, a user request to dispatch a message is made through a user's SIP Proxy, and is carried out by a distributed component of the presence services associated with that SIP Proxy.

Figure 19:
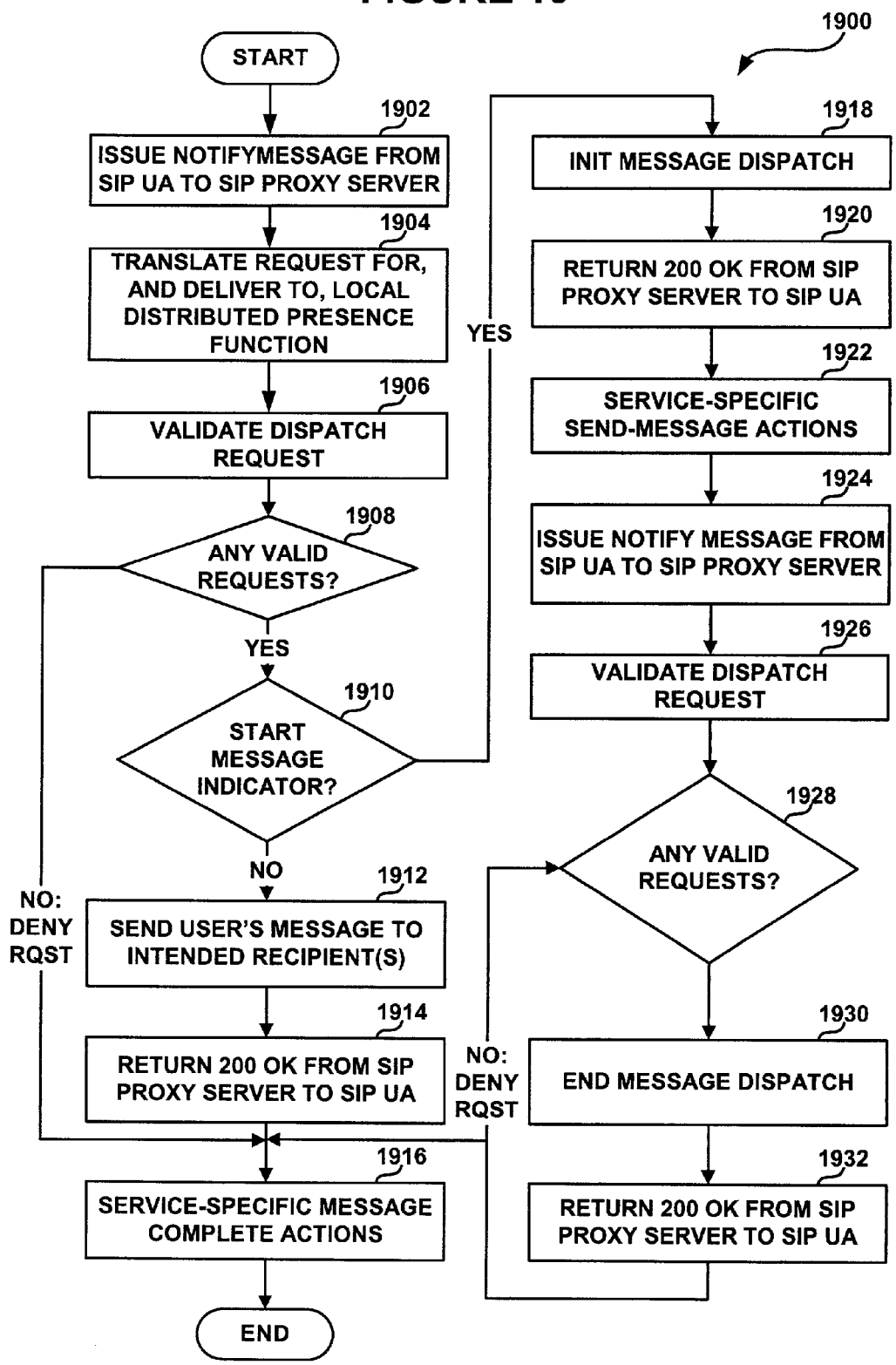
FIG. 19 is a flow chart illustrating a method for dispatching a message according to an exemplary embodiment.

FIG. 19 is a flow chart illustrating a method 1900 for dispatching a message. At step 1902, a SIP UA generates and sends a notification message to a SIP proxy server. According to an exemplary embodiment, the notification message includes a requester's Presence ID, an intended recipient's Presence ID (or Presence IDs), a presence service type, and an event type, such as dispatch a message. Additionally, the notification message may include a start message indicator.

When the SIP Proxy server receives the request, at step 1904, the SIP Proxy server may identify the message as a message dispatch request and may deliver the request to its local distributed component of the presence services. Specifically, the distributed component may be an MDF located on the SIP Proxy server. At step 1906, the distributed component of the presence services validates the dispatch request, the method of which will be described in greater detail in reference to a flow chart in FIG. 20.

At step 1908, the distributed component determines if there are any valid requests. If there are no valid requests, the distributed component denies the request, and the method continues at step 1916. If there is at least one valid request, at step 1910, the distributed component determines if a start message indicator is included in the request. For example, the start message indicator may be used to indicate that a media path should be established. In such an embodiment, a stop message indicator may be used to disable the same media path. However, different embodiments are possible as well. If a start message indicator is not included in the request, at step 1912, the SIP proxy server sends a user's message to the intended recipients. When the message is sent, at step 1914, the SIP proxy server also sends a 200 OK message to the SIP UA. At step 1916, the SIP UA may perform service-specific message complete actions that terminate the message dispatch method. For example, this step may involve updating the user interface display.

Referring back to step 1910, if the request includes a start message indicator, at step 1918, the SIP proxy server initializes a message dispatch function. According to an exemplary embodiment, the SIP proxy server may carry out any actions that are required to prepare for sending of a separate message stream. For example, in the case of IP Intercom, the SIP proxy may instruct the conference server to bridge the send and receive ports for the voice message stream (media stream) that has been established during the registration of the user.

At step 1920, the SIP Proxy server sends a 200 OK message to the SIP UA. The 200 OK message includes the Presence ID of the requester, and an indicator that the message path has been enabled. At step 1922, the SIP UA carries out service-specific send-message actions. This subtask may be invoked to activate and carry out the sending of a separate message stream by the SIP UA in the case where the message dispatch involves the start and stop phases. The service-specific send-message actions may depend upon the type of messages being sent. This subtask may be executed to send the user data that form a separate message stream. For example, this subtask might be used to activate the media stream from the client device and cause data to be transmitted to a predetermined network entity.

At step 1924, the SIP UA sends a notification message ("NOTIFY") to the SIP proxy server. According to an exemplary embodiment, the notification message includes the requester's Presence ID, and an intended recipient's Presence ID (or Presence IDs associated with more than one recipient). Additionally, the notification message includes an event type indicator, i.e., a dispatch indicator, in this example, and a stop message indicator. At step 1926, the distributed entity of the presence services validates the dispatch request, the method of which will be described in greater detail in reference to FIG. 20.

At step 1928, the distributed entity of the presence services determines if there are any valid requests. If there are no valid requests, the method continues at step 1916. If there are any valid requests, at step 1930, the SIP Proxy server terminates sending of a separate message stream. Specific actions of terminating the message stream may depend upon the type of messages being sent. For example, the step of terminating the message stream may include deactivation of a media stream that has been established from the client device. In the case of the IP intercom described in the U.S. patent application Ser. No. 10/021,171, this step may deactivate the media stream from the client device and cause the conference server's ports between the sender and receiver(s) to be unbridged. It should be understood that different embodiments are possible as well. At step 1932, the SIP Proxy server generates and sends to the SIP UA a 200 OK message. The 200 OK message may include the Presence ID of the requester, and a message path disabled indicator, and the method continues at step 1916.

Figure 20:
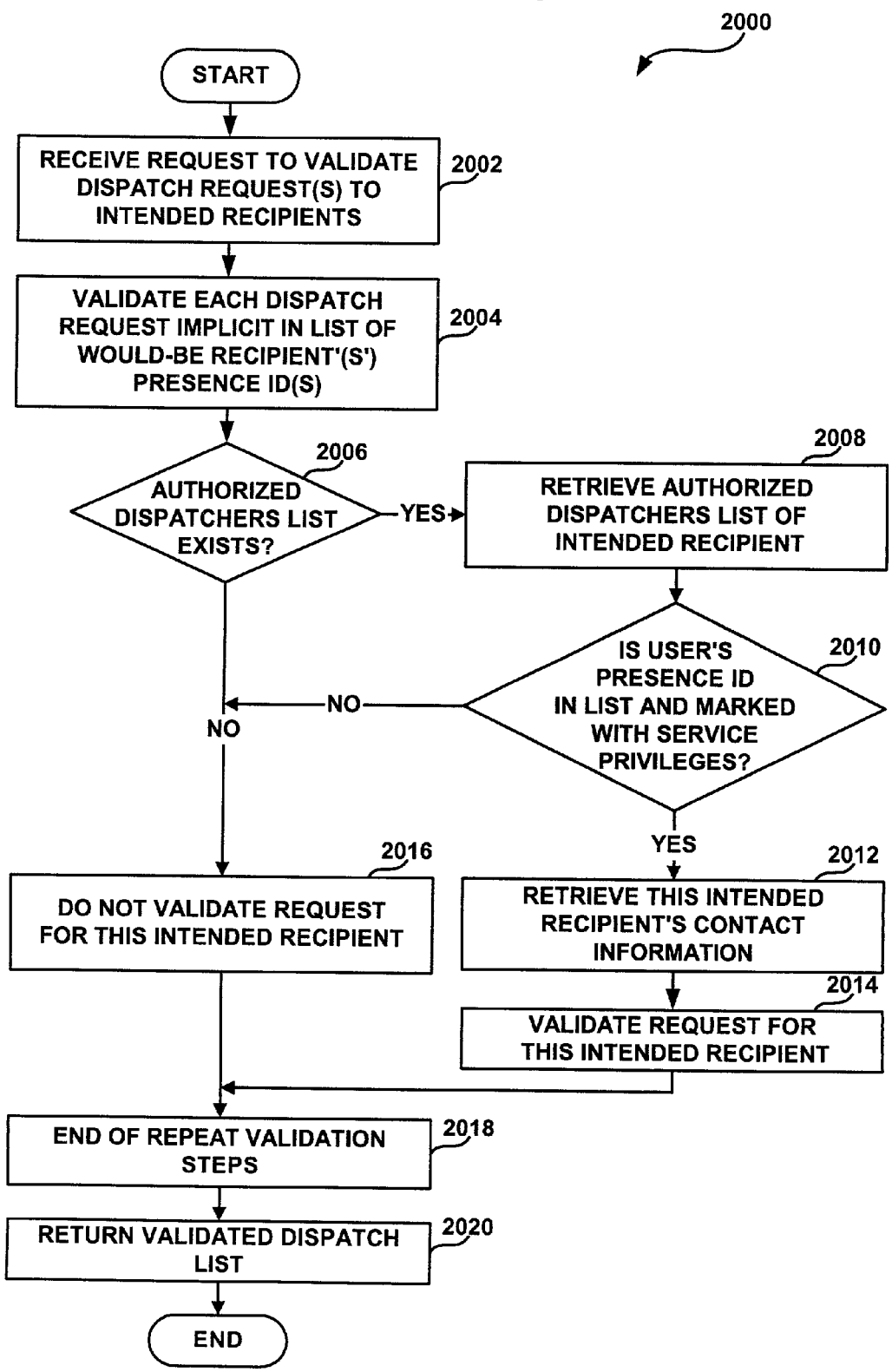
FIG. 20 is a flow chart illustrating a method for validating dispatcher requests according to an exemplary embodiment.

FIG. 20 is a flow chart illustrating a method 2000 for validating dispatch requests. Specifically, the method 2000 illustrates a detailed flow chart for the step 1926 in FIG. 19. At step 2002, the distributed element of the presence services receives a request to validate a dispatch request to an intended recipient. According to an exemplary embodiment, the request may include the Presence ID of the sender, the Presence ID(s) of intended recipient(s), and the presence service type.

At step 2004, the distributed element of the presence services validates each dispatch request in the list of would-be recipients' Presence IDs. The validation steps are repeated for each intended recipient. At step 2006, the distributed element of the presence services determines if an authorized dispatcher list exist for each intended recipient. If an authorized dispatcher list exists, at step 2008, the distributed element retrieves an authorized dispatcher list of each intended recipient. At step 2010, the distributed element determines if the user's Presence ID is in the retrieved list, and if any privileges or restrictions are specified for the Presence ID. If so, at step 2012, the distributed element retrieves the intended recipient's contact information, and, at step 2014, validates the request for this intended recipient. For example, the distributed element adds this intended recipient's Presence ID and contact information to the validated list for return, and the method continues at step 2018.

Referring back to step 2006, if the authorized dispatchers list does not exist for a predetermined recipient, at step 2016, the distributed element does not validate the request for that recipient. If any authorized dispatchers lists exist and the user's Presence ID is in one or more of those lists, and further, if the distributed element validated each dispatcher request, at step 2018, the validation process is completed. Further, at step 2020, the distributed element returns the validated dispatch list to the SIP Proxy server associated with the user (requester), and the method 2000 terminates.

Figure 21A:
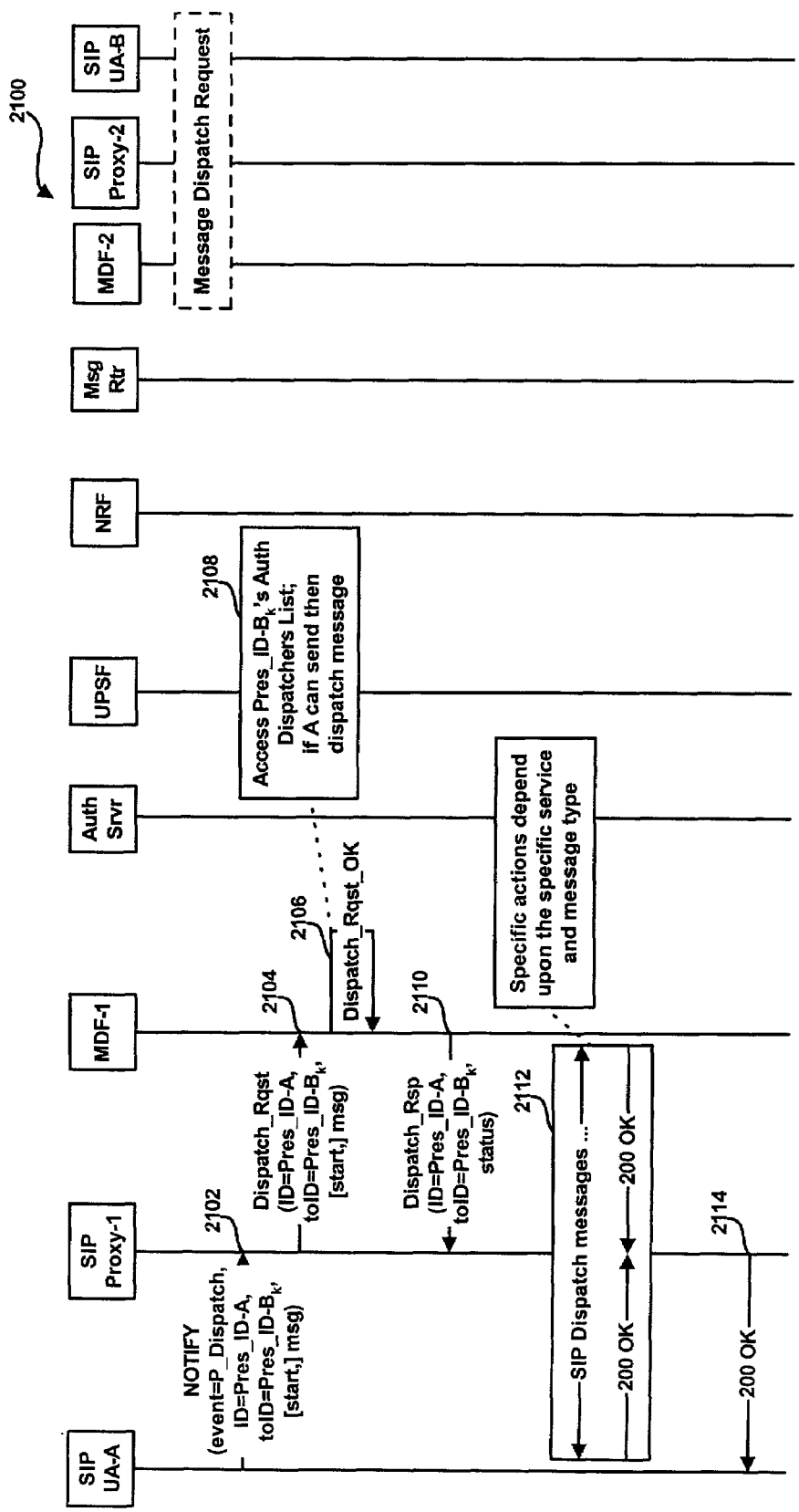
FIGS. 21A and 21B are a message flow illustrating a method for requesting a message dispatch according to an exemplary embodiment.
Figure 21B:
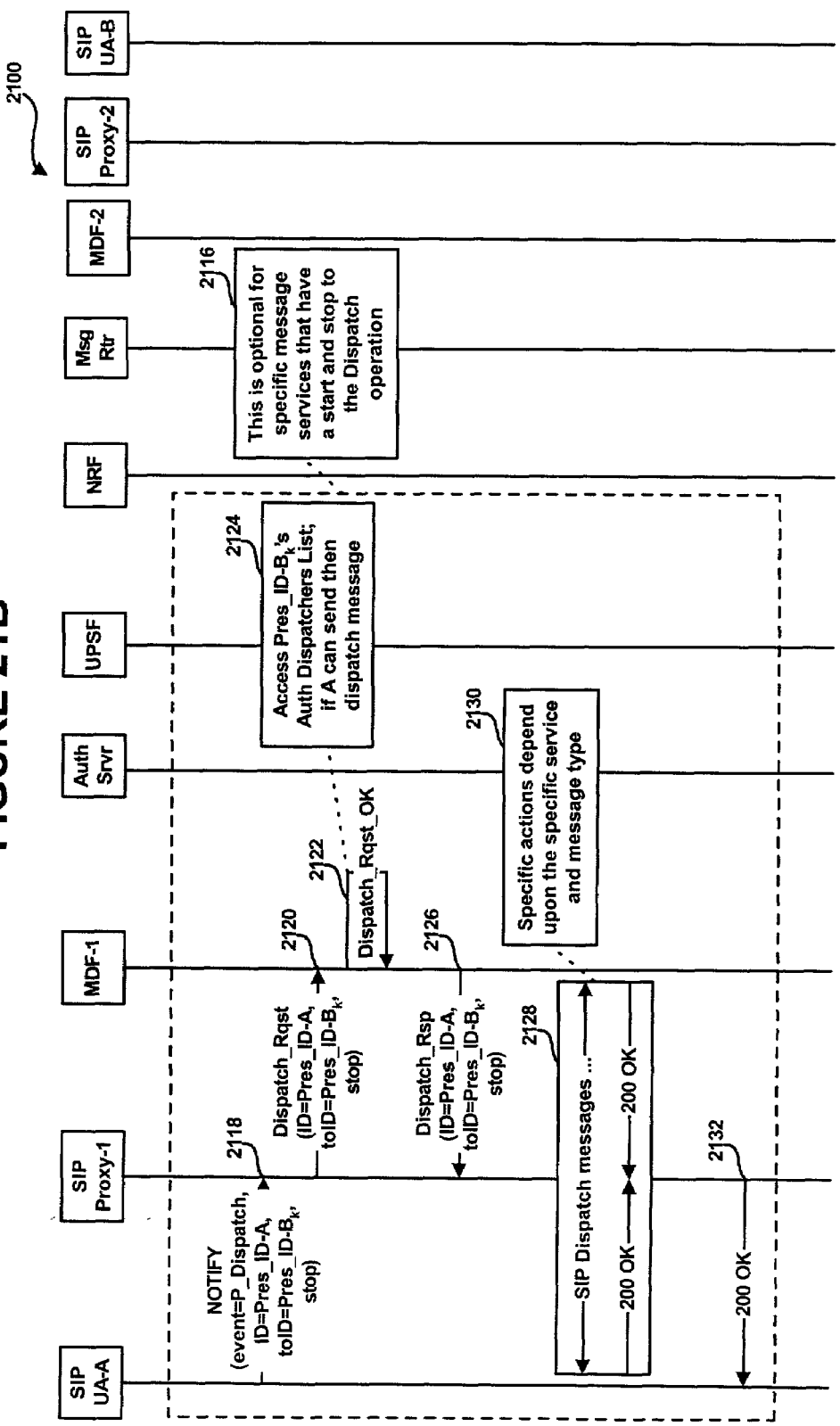

FIGS. 21A and 21B are a message flow 2100 illustrating a method for requesting a message dispatch. The message flow 2100 will be described in reference to the following entities: the SIP UA-A, the SIP Proxy-1, the MDF-1, the authorization server ("Auth Srvr"), the UPSF, and the NRF. However, it should be understood that different entities could also be used.

The SIP UA-A sends a notification message 2102 ("NOTIFY") to its SIP Proxy-1. The notification message 2102 specifies a request type, i.e., a dispatch request, the Presence ID of the requester (the Presence ID-A), and the Presence ID of the intended recipient (Presence ID-B). Further, the notification message may specify a start operation request. The SIP Proxy-1 generates and provides to its MDF-1 a dispatch request message 2104 including the data specified in the notification message 2102. When the MDF-1 receives the dispatch request, the MDF-1 processes the request, as illustrated at step 2106. Specifically, as illustrated at 2108, the MDF-1 may access the Pres_ID-B's authorized dispatchers list and determines if Pres_ID-A is in the Pres_ID-B's authorized dispatchers list.

The MDF-1 then sends a dispatch response message 2110 ("Dispatch_Rsp") including the Pres_ID-A, the Pres_ID-B, and a status of the request. For example, the status may indicate that the Pres_ID-A is authorized to dispatch a message to the Pres_ID-B. When the SIP Proxy-1 receives the dispatch response message 2110, and the status of the request indicates that the Pres_ID-A is authorized to dispatch a message to the Pres_ID-B, at step 2112, the SIP Proxy-1 dispatches a message from the SIP UA-A. As illustrated in FIGS. 21A and 21B, specific actions to dispatch a message may depend on a specific service and a message type, and, thus, are not illustrated in FIGS. 21A and 21B. Upon a successful dispatch of the message, the SIP Proxy-1 sends a 200 OK message 2114 to the SIP UA-A.

FIGS. 21A and 21B further illustrate a message flow that may be optionally performed for specific message services that use start and stop operations. The illustrated message flow is intended to invoke the stop operation. In one embodiment, a stop indicator may be used to disable a message path that has been established based on a start message indicator specified in the notification message 2102. In such an embodiment, the SIP UA-A sends to the SIP Proxy-1 a notification message 2118 ("NOTIFY") including the dispatch service type, the Pres_ID-A (sender), the Pres_ID-B (recipient), and the stop message indicator. According to an exemplary embodiment, the SIP Proxy-1 sends a dispatch request message 2120 ("Dispatch_Rqst") to the MDF-1, and the dispatch request message 2120 includes the data specified in the message 2118. When the MDF-1 receives the request 2120, the MDF-1 processes the request, as illustrated at 2122. Specifically, the MDF-1 determines if the Pres_ID-A is in the authorized dispatcher list of the Pres_ID-B. If the Pres_ID-A is in the authorized dispatcher list of the Pres_ID-B, the MDF-1 sends to the SIP Proxy-1 a dispatch response message 2126 ("Dispatch_Rsp") including the Pres_ID-A, the Pres_ID-B, and the stop indicator specifying that the Pres_ID-A is authorized to disable the message path, for example. At step 2128, the SIP Proxy-1 may perform stop dispatch operations that may depend upon a specific service and a message type. Once the stop operations conclude, the SIP Proxy-1 sends a 200 OK message to the SIP UA-A, and the message flow 2100 terminates.

User Request to Cancel Subscription

Figure 22:
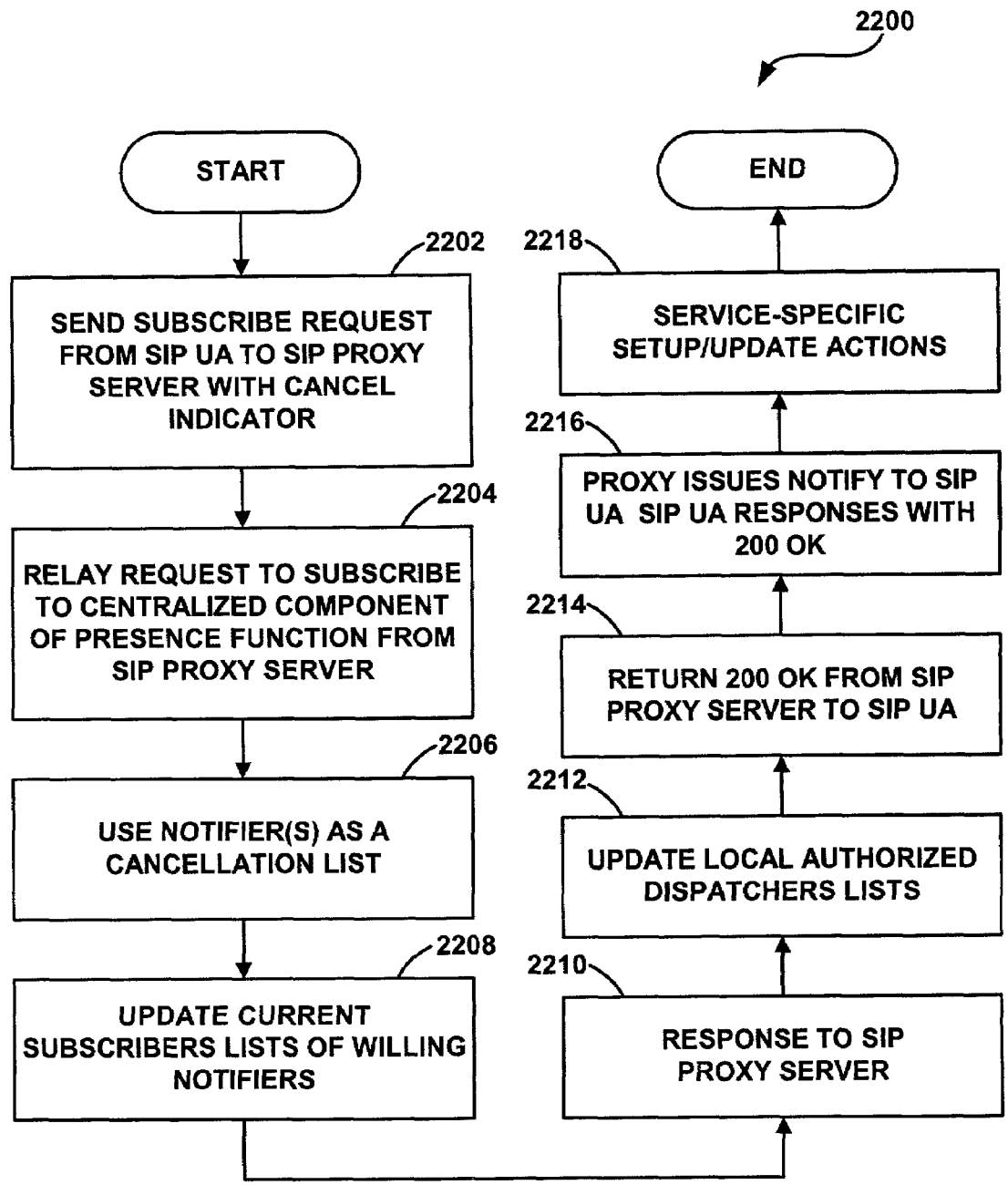
FIG. 22 is a flow chart illustrating a method for canceling subscriptions according to an exemplary embodiment.

FIG. 22 is a flow chart illustrating a method 2200 for canceling a subscription according to one exemplary embodiment. At step 2202, the SIP UA sends to the SIP Proxy server a subscription request message including a subscription cancellation indicator. The subscription request message further includes the requester's Presence ID, Presence ID(s) of one or more notifiers, and an identifier of the requested presence service. At step 2204, the SIP Proxy server relays the request to the centralized component of the presence services. According to an exemplary embodiment, the request may be relayed via the authorization server using the 3Q protocol, for instance.

At step 2206, the centralized component uses the specified notifiers to generate a cancellation list. It should be understood that the method of generating the cancellation list is not limited to being generated at the centralized component, and it could also be generated at the SIP UA, or the SIP Proxy, for example. At step 2208, the centralized component updates the current list of willing notifiers, the embodiment of which has been described in reference to FIG. 8, and the parts describing the subscription cancellation are pertinent here. At step 2210, the centralized element of the presence services responds to the SIP proxy server. According to an exemplary embodiment, the response may be sent via the authorization server, and includes the Presence ID, and the return status.

At step 2212, the distributed element of the presence services updates local authorized dispatchers lists, the method of which has been described in reference to FIG. 9. At step 2214, the SIP proxy server sends a 200 OK message to the SIP UA, and the 200 OK message includes the Presence ID of the requester. At step 2216, the SIP Proxy server sends to the SIP UA a notification message ("NOTIFY"), and the SIP UA responds with a 200 OK message. At step 2218, the SIP UA may perform service-specific setup/update actions. For example, the SIP UA may display to the user that the subscription has been cancelled.

Figure 23:
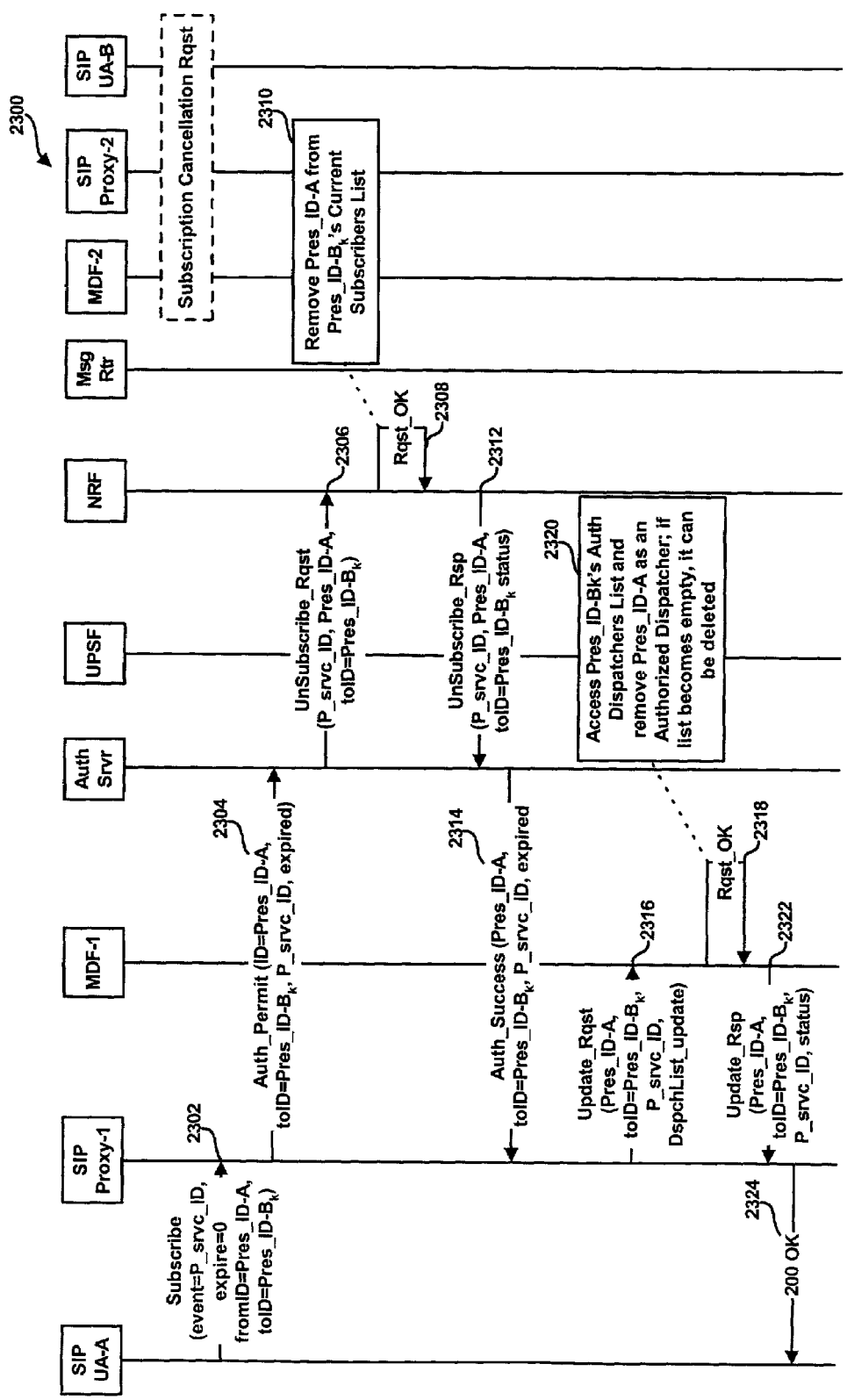
FIG. 23 is a message flow illustrating a method for canceling a subscription to one or more presence entities according to an exemplary embodiment.

FIG. 23 is a message flow 2300 illustrating a method for subscription cancellation. The message flow 2300 will be described in reference to the following entities: the SIP UA-A, the SIP Proxy-1, the MDF-1, the authorization server ("Auth Srvr"), the UPSF, and the NRF. However, it should be understood that different entities could also be used.

The SIP UA-A sends a subscription request message 2302 ("SUBSCRIBE") to the SIP Proxy-1. The subscription request message 2302 includes P_srvc_ID, a subscription cancellation request identified with "expire=0," the Pres_ID-A of the requester, and the request to cancel the subscription to the Pres_ID-B.

The SIP Proxy-1 then sends an authorization permission request message 2304 ("Auth_Perm") including a request to cancel the subscription of the Pres_ID-A to the Pres_ID-B. The authorization server then sends to the NRF an unsubscribe request message 2306 ("UnSubscribe_Rqst") including the P_srvc_ID, the Pres_ID-A, and the Pres_ID-B. At step 2308, the NRF processes the request. Specifically, at step 2310, the NRF removes the Pres_ID-A from the Pres_ID-B's current subscribers list. Responsively, the NRF sends an unsubscribe response message 2312 ("UnSubscribe_Rsp") to the authorization server. The unsubscribe response message 2312 includes the P_srvc_ID, the Pres_ID-A, and the Pres_ID-B.

The authorization server then sends an authorization success message 2314 ("Auth_Success") to the SIP Proxy-1. The authorization success message 2314 includes the Pres_ID-A, the Pres_ID-B, the P_srvc_ID, and the indicator that the subscription has been cancelled (indicated in FIG. 23 using an "expired" parameter). When the SIP Proxy-1 receives the message 2314, the SIP Proxy-1 sends an update request message 2316 ("Update_Rqst") to its MDF-1. The update request message 2316 includes the Pres_ID-A, the PresID-B, the P_srvc_ID, and a status indicating the subscription cancellation. When the MDF-1 receives the message 2316, at step 2318, the MDF-1 processes the request. Specifically, as illustrated at 2320, the MDF-1 accesses the Pres_ID-B's authorized dispatchers list and removes the Pres_ID-A from the Pres_ID-B's authorized dispatchers list. If the list of the Pres_ID-B's becomes empty, the list may be deleted. The MDF-1 then sends an update response message 2322 ("Update_Rsp") to the SIP Proxy-1, and the update response 2322 includes the Pres_ID-A, the Pres_ID-B, the P_srvc_ID, and a status indicating that the Pres_ID-A has been removed from the Pres_ID-B's list. The SIP Proxy-1 may then send a 200 OK message 2324 to the SIP UA-A indicating the completion of the cancellation process.

It should be understood that the programs, processes, methods and systems described herein are not related or limited to any particular type of computer or network system (hardware or software), unless indicated otherwise. Various types of general purpose or specialized computer systems supporting the IP networking may be used with or perform operations in accordance with the teachings described herein.

In view of the wide variety of embodiments to which the principles of the present invention can be applied, it should be understood that the illustrated embodiments are examples only, and should not be taken as limiting the scope of the present invention. For example, the steps of the flow diagrams may be taken in sequences other than those described, more or fewer steps may be used, and more or fewer elements may be used in the block diagrams. While various elements of the preferred embodiments have been described as being implemented in software, in other embodiments in hardware or firmware implementations may alternatively be used, and vice-versa.

Further, it will be apparent to those of ordinary skill in the art that methods involved in the system for instant voice messaging may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system for providing presence state services in an Internet Protocol network, the system comprising:

a central presence server configured to authenticate, track, store, and provide user presence information specific to each of a plurality of users, the user presence information being stored in a database at the central presence server; and a local presence server in communication with the central presence server and communicatively coupled with a signaling server, the local presence server configured to store local presence authorization data in a local database, the local presence authorization data being specific to each of a subset of the plurality of users and generated from information obtained from the user presence information at the central presence server, and being generated at the local presence server in response to one or more requests from the signaling server on behalf of a user to enable communications between the user and each user of the subset of the plurality of users, wherein the user is not one of the subset of the plurality of users, the local presence server is configured to receive a service authorization request from the signaling server on behalf of the user, the service authorization request comprising a request to initiate communication with at least one of the subset of the plurality of users, and, the local presence server is configured to responsively authorize the service authorization request using the local presence authorization data.

2. The system of claim 1, wherein the local presence authorization data comprises authorized dispatcher data, and the local presence server comprises a message dispatch facility configured to receive a message dispatch request from a first presence entity via the signaling server, and, responsively, determine using the authorized dispatcher data if the first presence entity is authorized to dispatch a message to a second presence entity specified in the message dispatch request.

3. The system of claim 2, wherein the message dispatch facility is further configured to receive a request to establish a media path between the first presence entity and the second presence entity via a predetermined network entity, the message dispatch facility configured to determine if the first presence entity is authorized access to the media path, and, if so, the message dispatch facility is configured to start a process of establishing the media path.

4. The system of claim 2, wherein the authorized dispatcher data comprises an authorized dispatcher list of the second presence entity, and the message dispatch facility is configured to determine if the first presence entity is specified in the authorized dispatcher list of the second presence entity to determine if the first presence entity is authorized to access the requested service.

5. The system of claim 4, wherein the message dispatch facility is configured to create the authorized dispatcher list of the second presence entity based on presence authorization data received from the central presence server for the first presence entity.

6. The system of claim 5, wherein the presence authorization data received from the central presence server comprises an authorized watch list for the first presence entity.

7. The system of claim 2, wherein the central presence server is configured to detect a state change associated with the first presence entity or the second presence entity and, responsively, provide state change information to the message dispatch facility that, responsively, updates the local authorized dispatcher data.

8. The system of claim 7, wherein the local authorized dispatcher data comprises a local authorized dispatcher list associated with the second presence entity, and wherein the state change information comprises an offline status for the second presence entity, and the message dispatch facility is configured to delete the authorized dispatcher list of the second presence entity.

9. The system of claim 2, wherein the message dispatch facility is configured to receive a request to update the authorized dispatcher data, wherein the request comprises an authorized watch list for the first presence entity comprising a presence identifier of the second presence entity, wherein the request comprises a request to add, and wherein, responsively, the message dispatch facility is configured to create an authorized dispatcher list for each presence entity specified in the authorized watch list, wherein each authorized dispatcher list comprises a presence identifier of the first presence entity.

10. The system of claim 9, wherein the request comprises a cancellation request and a cancellation list comprising a presence identifier of at least one presence entity, and the message dispatch facility is configured to access the authorized dispatch data and cancel dispatch authorization for the at least one presence entity specified in the received cancellation list.

11. The system of claim 2, wherein the message dispatch facility is integrated with the signaling server.

12. A method for providing presence state services in an Internet Protocol network, the method comprising:
  storing in a database at a central presence server user presence information for a plurality of users, the user presence information comprising presence state for the plurality of users;
  authenticating at the central presence server a user to access a specific service;
  storing in a local database at a local presence server local presence authorization data, the local presence server being in communication with the central presence server, and the local presence authorization data comprising data specific to each of a subset of the plurality of users and being generated from information obtained from the user presence information at the central presence server, and being generated at the local presence server in response to requests (i) from a signaling server that is communicatively coupled with the local presence server, and (ii) made by the signaling server on behalf of a user to enable communications between the user and each user of the subset of the plurality of users, wherein the user is not one of the subset of the plurality of users;
  receiving at the signaling server a signaling message from a presence entity, wherein the signaling message comprises a request to establish a media pathway with at least one user of the subset of the plurality of users;
  authorizing the request based upon information specified in the request in conjunction with the local presence authorization data; and
  signaling a media proxy to establish the media pathway if the request is authorized.

13. The method of claim 12, wherein receiving at the signaling server communicatively coupled with the local presence element the signaling message comprises receiving the signaling message at a SIP proxy server, and wherein the local presence server comprises a message dispatch facility in communication with the SIP proxy server, the message dispatch facility being configured to authorize requests based upon information specified in the requests in conjunction with the local presence authorization data, and the method further comprising:
  accessing the message dispatch facility to authorize the request before the signaling server provides access to a service specified in the request; and
  authorizing the request at the message dispatch facility.

14. The method of claim 12, wherein the request to establish a media pathway comprises a request to interconnect a plurality of pre-established data paths between a plurality of presence entities and a media proxy, and the method further comprises interconnecting the plurality of pre-established data paths between the plurality of presence entities.

15. The method of claim 12, wherein the local presence server comprises a message dispatch facility in communication with the signaling server, and the method further comprising:
  receiving at the message dispatch facility user presence state information from a central presence server;
  creating the local presence authorization data based on the user presence state information received from the central presence server; and
  using the message dispatch facility to authorize requests using the local presence authorization data.

16. The method of claim 15, wherein the user presence state information comprises at least one authorized watch list for at least one presence entity, the method further comprising using the at least one authorized watch list to create at least one authorized dispatcher list for at least one presence entity specified in the authorized watch list.

17. The method of claim 15, further comprising:
  receiving presence state change information from the central presence server; and
  updating the local presence authorization data based on the presence state change information.

* * * * *